(12) United States Patent
Iwase et al.

(10) Patent No.: US 6,245,453 B1
(45) Date of Patent: Jun. 12, 2001

(54) FUEL CELL AND SEPARATOR FOR THE SAME

(75) Inventors: Masayoshi Iwase, Anjo; Hitoshi Hamada, Susono; Shigeyuki Kawatsu, Nishikamo-gun; Seiji Mizuno; Joji Yoshimura, both of Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/216,778

(22) Filed: Dec. 18, 1998

(30) Foreign Application Priority Data

Dec. 18, 1997 (JP) .................................................. 9-365129
Mar. 27, 1998 (JP) ................................................ 10-100453
Jun. 18, 1998 (JP) ................................................ 10-189926

(51) Int. Cl.$^7$ ........................................................ H01M 2/00
(52) U.S. Cl. .................................. 429/34; 429/26; 429/38
(58) Field of Search .............................. 429/34, 38, 129, 429/143, 297, 26

(56) References Cited

U.S. PATENT DOCUMENTS

| | | | | |
|---|---|---|---|---|
| 4,910,100 | * | 3/1990 | Nakanishi et al. | 429/32 |
| 5,541,015 | * | 7/1996 | Tajima et al. | 429/26 |
| 5,686,199 | | 11/1997 | Cavalca et al. | 429/30 |
| 5,998,055 | | 12/1999 | Kurita et al. | 429/34 |

FOREIGN PATENT DOCUMENTS

| | | |
|---|---|---|
| 88103298 | 3/1988 | (EP) . |
| 56-134473 | 10/1981 | (JP) . |
| 58-030074 | 2/1983 | (JP) . |
| 58-166658 | 10/1983 | (JP) . |
| 60-243974 | 12/1985 | (JP) . |
| 61-256568 | 11/1986 | (JP) . |
| 62-076260 | 4/1987 | (JP) . |
| 1-63271 | 3/1989 | (JP) . |
| 2-155171 | 6/1990 | (JP) . |
| 03266365 | 11/1991 | (JP) . |
| 03289057 | 12/1991 | (JP) . |
| 05021076 | 1/1993 | (JP) . |
| 7-263003 | 10/1995 | (JP) . |
| 8-138692 | 5/1996 | (JP) . |
| 08203546 | 8/1996 | (JP) . |
| 10-106594 | 4/1998 | (JP) . |

* cited by examiner

Primary Examiner—Stephen Kalafut
Assistant Examiner—Julian A. Mercado
(74) Attorney, Agent, or Firm—Kenyon & Kenyon

(57) ABSTRACT

An improved fuel cell makes uniform partial gas pressure of a fuel gas flowing through a gas passage formed between an electrode and a separator of a fuel cell, activating an electrode reaction in a whole region of the electrode surface along the gas passage. The inlet and outlet for the fuel gas are disposed on a diagonal line of the separator to define a gas passage such that fuel gas smoothly flows even though portions of the passage away from the diagonal line. This may reduce the separator size and improve the volumetric efficiency of the fuel cell and the diffusibility of fuel gas as well as the drainage of water produced by the electrode reaction.

15 Claims, 32 Drawing Sheets

COOLING WATER

CONCAVE PORTION OF PASSAGE GROOVE

# FUEL CELL AND SEPARATOR FOR THE SAME

INCORPORATION BY REFERENCE

The disclosure of Japanese Patent Application Nos. HEI 9-365129 filed on Dec. 18, 1997, HEI 10-100453 filed on Mar. 27, 1998, and HEI 10-189926 filed on Jun. 18, 1998 are incorporated herein by reference in their entirety.

BACKGROUND OF THE INVENTION

1. Field of the Invention

The present invention relates to a separator for a fuel cell in contact with a pair of electrodes interposing an electrolyte film and a fuel cell using the aforementioned separator.

2. Description of the Related Art

A fuel cell is known as an apparatus for converting fuel energy directly to electric energy. The fuel cell is generally designed to be provided with a pair of electrodes with an electrolyte film interposed therebetween and to generate energy from the space between the pair of electrodes by an electrochemical reaction of fuel gas, e.g. hydrogen, and oxygen-containing gas. In this reaction, fuel gas is supplied to contact the surface of one of the electrodes and oxygen-containing gas is supplied to contact the surface of another electrode. Energy can be drawn from the fuel cell in a highly efficient manner as long as fuel gas and oxygen-containing gas are supplied.

FIG. 41 is a perspective view showing the configuration of a stack structure 5 constituting a general fuel cell and FIG. 42 is an exploded perspective view showing the structure of a unit cell 10 as a basic unit of the stack structure 5 shown in FIG. 41. In general, the fuel cell, for example, of a polymer electrolyte type is constituted of the stack structure 5 as shown in FIG. 41. This stack structure 5 is produced by laminating a prescribed number of unit cells 10, then disposing collector plates 26, 27, insulating plates 28, 29 and end plates 40, 45 sequentially at both ends of the unit cells and then fastening these ends using, for example, bolts and nuts such that it is maintained in the state where a given pressure is applied in the direction (the direction indicated by the arrow) of the lamination of the unit cell. The collector plates 26, 27 are provided with output terminals 26A, 27A respectively which enable it to output the electromotive force generated in the fuel cell structured by the stack structure 5.

In such a fuel cell, a member called a separator is provided which serves as a gas passage and a collector electrode to supply fuel gas and oxygen-containing gas to the electrode surface. A straight type separator provided with a plurality of linear passage grooves has been conventionally used. Serpentine type separator in which one passage groove is bent (disclosed in Japanese Patent Application Laid-Open (JP-A) No. HEI 7-263003) and lattice type separators in which plural projections are arranged and a passage is formed by a gap between these projections have also been known.

The unit cell 10 as a basic unit of the stack structure 5 of FIG. 41, as shown in FIG. 42, includes a joint body (reaction electrode layer) 15 produced by sandwiching an electrolyte film 11 between a cathode 12 and an anode (not shown), and separators 20A, 20B (the lattice type is shown as example) disposed on both sides of the reaction electrode layer 15. Among these parts, the separators 20A, 20B are formed from a gas-impermeable electroconductive member. Plural ribs 22 formed of small projecting pieces are arranged on both surfaces 31 of the separators.

When these separators 20A, 20B are assembled in the fuel cell, the rib (not shown) formed on the surface of the separators 20A at the cathode side constitutes a passage for oxidizing gas supplied to the cathode 12. While the rib 22 formed on the surface 21 of the separator 20B at the anode side constitutes a passage for fuel gas supplied to the anode (not shown). Meanwhile the rib 22 formed on the surface 21 opposite to the above surface of the separator 20A constitutes a passage for fuel gas supplied to the anode (not shown) of another adjacent unit cell (not shown) and a rib (not shown) formed on the surface opposite to the above surface of the separator 20B constitutes a passage for oxidizing gas supplied to a still another adjacent unit cell (not shown). One separator, therefore, supplies both types of gas to adjacent reaction electrodes and prevents mixture of both gases.

Oxidizing gas flowing through the oxidizing gas passage is distributed into the reaction electrode layer exposed to the oxidizing gas passage, and is supplied to the cathode of the reaction electrode layer. Likewise, fuel gas flowing through the fuel gas passage is distributed into the reaction electrode layer exposed to the fuel gas passage, and is supplied to the anode of the reaction electrode layer. As a consequence the respective gas is used in the reaction electrode layer 15 for the electrochemical reaction to produce electromotive force.

Specifically, in the reaction electrode layer 15, the reactions indicated by the formula (1) and the formula (2) proceed at the anode and cathode sides respectively and, on the whole, the reaction indicated by the formula (3) proceeds.

$$H_2 \rightarrow 2H^+ + 2e^- \tag{1}$$

$$\tfrac{1}{2}O_2 + 2H^+ + 2e^- \rightarrow H_2O \tag{2}$$

$$H_2 + \tfrac{1}{2}O_2 \rightarrow H_2O \tag{3}$$

The serpentine type separator has a narrow gas inlet and a long gas pass age, resulting in excellent gas diffusibility.

However, in the known serpentine type separator, a partial pressure of gas in the gas passage is not constantly uniform. Accordingly there is the possibility that the performance of the fuel cell as a battery may be deteriorated.

In the lattice type separator, even if one passage is clogged due to, for example, flooding or the like, specifically, condensation of water, gas and produced water can flow into other passages. So this type has excellent drainage as well as high diffusibility of gas. However, in the known lattice type separator, the passages are distributed in forward and backward directions leading to the possibility of insufficient gas flow rate. A deficiency in gas flow rate interrupts diffusion of gas, which causes concentration polarization, resulting in deteriorated performance of the fuel cell as a battery.

In the case of using dry gas at a low humidity as the supply gas (fuel gas and oxygen-containing gas), drainage at the electrode side to which oxygen-containing gas is supplied is excessive. Hence there is the case where an electrolyte film is dried up. This gives rise to the possibility of deteriorating characteristics of the cell.

SUMMARY OF THE INVENTION

An object of the present invention is to attain improved performance of the cell by equalizing partial pressure in a gas passage.

Another object of the present invention is to attain improved performance of the cell by eliminating the drawbacks of prior cells, for example, interruption of gas diffusion and dry-up of the electrolyte film.

A further object of the present invention is to provide a separator which does not require high processing accuracy and can increase the amount of electrochemical reaction that can take place in a reaction electrode layer and also to provide a fuel cell using the separator.

The above object is attained by a separator for a fuel cell, as an aspect of the present invention, which is produced by bringing an electrolyte film into contact with the surface of a first electrode so that the electrolyte film is interposed between the first electrode and an adjacent electrode and by defining a gas passage for supplying gas to the fuel cell, including a first manifold for supplying gas, which is formed at the corner of the separator; a second manifold for exhausting supply gas, which is formed at a position on a diagonal line of the first manifold; and a gas passage formed between the first manifold and the second manifold. The width of the gas passage is wider at an intermediate position between the first manifold and the second manifold than widths at neighbor positions of the first manifold and the second manifold. The gas passage has a branched portion.

According to the aforementioned structure, a gas supply inlet and a gas exhausting outlet formed in the separator are disposed at positions corresponding to the corners on the diagonal line in an electrode. Hence the separator can be small-sized. Also, since the width of the passage is made wider at an intermediate position between the first manifold and the second manifold, the diffusibility of gas and the drainage of water produced by an electrode reaction are improved.

A fuel cell using the above embodiment has a high volumetric effect and activates an electrode reaction in the entire electrode face along the gas passage, exhibiting excellent performance of the cell.

Another aspect of the present invention is a separator for a fuel cell, which is produced by bringing an electrolyte film into contact with the surface of a first electrode of a joint body interposed between the first electrode and an adjacent electrode and by forming a gas passage for supply gas to the fuel cell, including a passage bottom of opposing the surface of the electrode, a plurality of projections projecting from the passage bottom to reach the surface of the electrode, thereby defining the gas passage, and a gas inlet and a gas outlet for supplying gas to and exhausting gas from the gas passage, the inlet and the outlet being formed at positions corresponding to corners on a diagonal line of the electrode. The plurality of projections are designed such that the interval between adjacent projections increases as a distance from the diagonal line increases.

According to the aforementioned structure, a gas supply inlet and a gas exhausting outlet formed in the separator are disposed at the positions corresponding to the corners on the diagonal line in an electrode.

Hence the separator can be small-seized. Also, since the width of the passage defined by the projections is made larger in the area far away from the diagonal lines connected to the gas supply inlet and the gas exhausting outlet, gas is allowed to flow easily even in the outside area away from the diagonal line. This improves the diffusibility of gas and the volumetric efficiency of the fuel gas.

Another aspect of the present invention is a fuel cell including a joint body produced by interposing an electrolyte film between a pair of electrodes; and a separator which is in contact with the surfaces of the electrodes of the joint body and forms a gas passage of supply gas by the surface of the electrode. The total gas amount, which is the sum of the supply gas and vapor produced by the joint body and diffused in the gas passage, sequentially changes to increase to a maximal value and further decreases in a range from the inlet to the outlet of the gas passage; and the sectional area of the gas passage defined by the separator varies in accordance with the total gas amount at each position in the gas passage.

In a gas passage of a fuel cell, generally, because supply gas is gradually consumed as it travels along the surface of an electrode, the partial pressure of the gas decreases as it approaches to the outlet. However, depending on the type of fuel cell, the partial pressure does not necessarily decrease monotonously but sometimes reaches a maximum on the way from the inlet to outlet of the passage in relation to its temperature. This is because, in the case where the fuel cell is, for instance, a polymer electrolyte type, the operation temperature is relatively low, for example, about 80° C. which is lower than the boiling point of water and hence water produced on the surface of the cathode electrode neither vaporizes immediately as vapor nor is externally drained from the fuel cell. In this case, the vapor is contained in the supply gas and vapor in the supply gas is saturated in the course of the passage.

In the fuel cell of the aforementioned aspect, the sectional area of the passage has a shape with a size corresponding to the total gas amount at each position in the gas passage. Because of this, even if the total gas amount at each position of the passage varies, the partial pressure in the gas passage may be uniform since the sectional area of the passage is designed corresponding to the total gas volume. Accordingly, an electrochemical reaction can be promoted in the entire electrode surface along the gas passage thereby increasing the performance of the cell.

A further aspect of the present invention is a fuel cell including a joint body produced by interposing an electrolyte film between a pair of electrodes; and a separator which is in contact with the surface of the electrode of the joint body and forms a gas passage of supply gas by the surface of the electrode. The total gas amount, which is the sum of the supply gas and vapor produced by the joint body and diffused in the gas passage, sequentially changes to increase to a maximal value and further decreases in a region from the inlet to outlet of the gas passage; and a hydrophilic treatment is applied to the surface of the gas passage closer to the outlet than the position where the total gas amount reaches a maximal value.

Generally, in a passage of oxygen-containing gas, water is produced downstream of the position at which the total gas amount reaches a maximal. In this aspect, hydrophilic treatment is performed on the surface downstream of the position where the total gas amount reaches a maximum and hence the produced water can be efficiently drained using a small amount of a hydrophilic material.

A still further aspect of the present invention is a fuel cell including a joint body produced by interposing an electrolyte film between a pair of electrodes; a separator in which plural projections are formed; and a gas passage for supply gas, which is formed by bringing the electrode surface of the joint body into contact with a plurality of projections formed in the separator. The projections are arranged such that the sectional area of the gas passage in the vicinity of the inlet of the gas passage reaches a maximum value.

In the fuel cell of this aspect, the total amount of supply gas and the vapor produced by the joint body and emitted in the gas passage reaches a maximum at the inlet of the gas passage. Also, the sectional area of the passage between the projections which is produced by the separator reaches a maximum at the inlet.

Therefore, even if the total gas amount is a maximum at the inlet, the partial pressure of gas in the gas passage is not uniform because the sectional area of the passage is maximized at the inlet.

A still further aspect of the present invention is a fuel cell including a joint body produced by interposing an electrolyte film between a pair of electrodes; a gas passage of supply gas, which is formed as a linear groove, at least a portion of which is bent into a semicircular shape; and an inwardly curved portion which is formed on an inside wall surface of the semicircular bent portion in the gas passage and extends to the inside of the gas passage. The size of the curved portion formed in the gas passage varies in accordance with a variation in the total amount of supply gas and the vapor produced by the joint body and diffused in the gas passage.

In the fuel cell of this aspect, the size of the curved section varies corresponding to the flow rate of the supply gas in the gas passage. Generally, the size of a dead water region varies according to the flow rate of gas in a gas passage. However, according to the above structure of the embodiment, the size of the curved section can be varied according to a variation in the size of the inside dead water region. This ensures that even if the total amount of the supply gas including the vapor from the produced water makes any change, the inside dead water region can be reduced.

DESCRIPTION OF THE PREFERRED EMBODIMENTS

Embodiments of the present invention will be explained with reference to the drawings.

Figure 1:
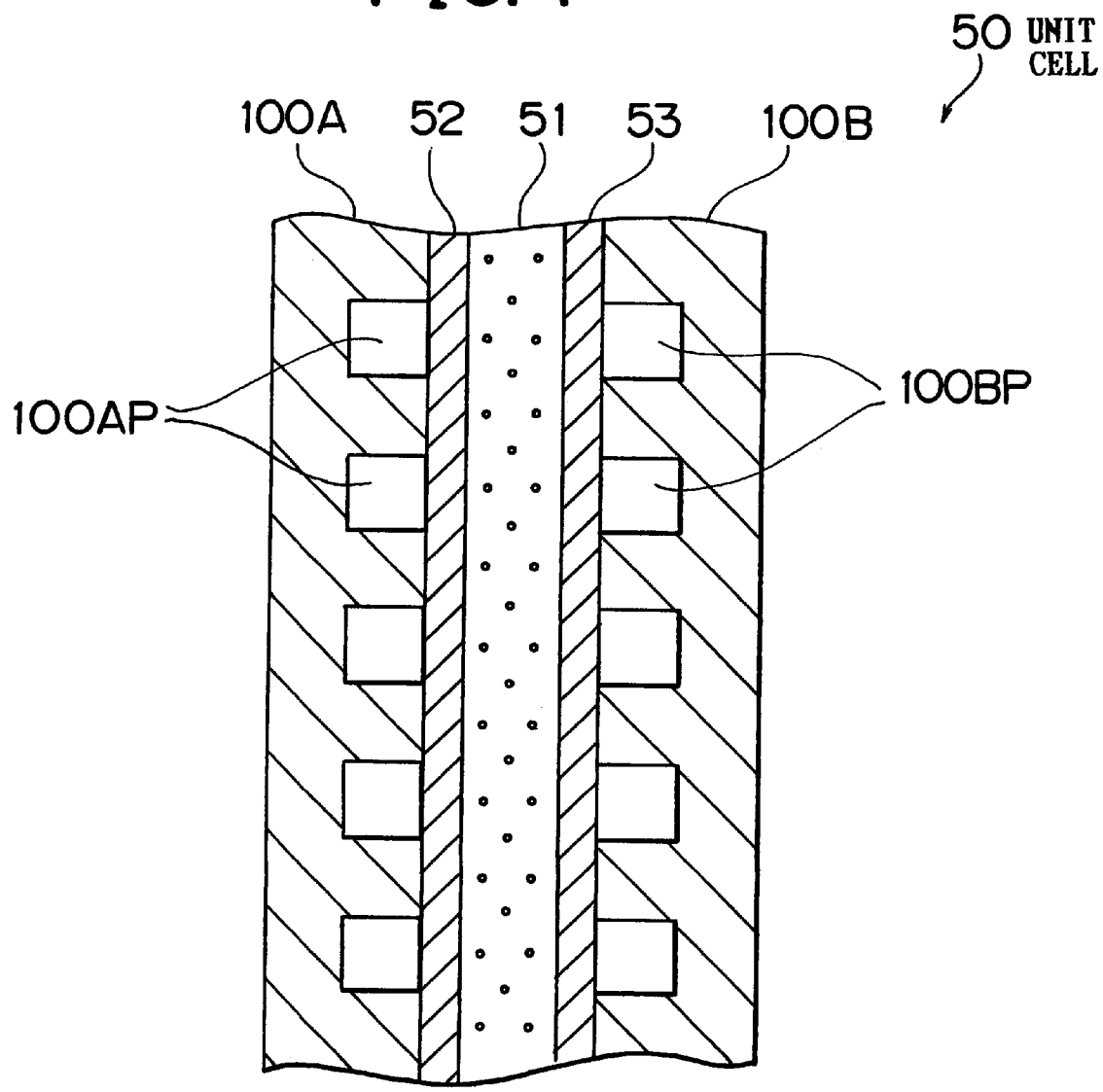
FIG. 1 is a sectional view typically showing the structure of a unit cell constituting a fuel cell of an embodiment of the present invention.

A polymer electrolyte fuel cell (hereinafter simply called "fuel cell") of the present invention has a stack structure using a unit cell as a basic unit. FIG. 1 is an explanatory view typically showing the section of a unit cell 50. The unit cell 50 of the fuel cell is formed of an electrolyte film 51, an anode 52, a cathode 53 and separators 100A, 100B.

The anode 52 and the cathode 53 constitute gas diffusion electrodes for interposing the electrolyte film 51 between both sides to form a sandwich structure. This sandwich structure is further interposed between the separators 100A, 100B which constitute passages of fuel gas and oxygen-containing gas between themselves and the anode 52 and the cathode 53 respectively. A fuel gas passage 100AP is formed between the anode 52 and the separator 100A and an oxygen-containing gas passage 100BP is formed between the cathode 53 and the separator 100B.

FIG. 1 shows that each of separators 100A, 100B has a passage only on one surface thereof. Actually passages are formed on both surfaces and these separators respectively serve as the separator for an adjacent unit cell. Specifically, these separators 100A, 100B form the fuel gas passage 100AP between each one face of them and the anode 52 and form 100BP between each other face of them and a cathode of an adjacent unit cell. In this manner, the separators 100A, 100B form a gas passage between themselves and the gas diffusion electrode and serves to separate the streams of fuel gas and oxygen-containing gas in combination with an adjacent unit cell. When the unit cells 50 are laminated to form a stack structure, a passage is formed on each one face only, which is in contact with the gas diffusion electrode, of two separators positioned at both sides of the stuck structure to form a passage.

Here, the electrolyte film 51 is a proton-conductive ion exchange film formed of a solid polymer material, e.g. a fluororesin, and exhibits high electroconductivity in a moistened condition. In this embodiment, a Nafion film (manufactured by Du Pont) is used. Platinum or an alloy composed of platinum and other metals is applied as a catalyst to the surface of the electrolyte film 51. In order to apply the catalyst, the following method is adopted by preparing carbon powder carrying platinum or an alloy composed of platinum and other metal, dispersing the carbon powder carrying this catalyst in a proper organic solvent, adding an electrolyte solution in an appropriate amount to the solvent to form a paste and performing screen-printing on the electrolyte film 51.

The carbon powder carrying a platinum catalyst is prepared by the following method. First, a platinic acid solution is mixed with sodium thiosulfate to produce a solution of a platinum sulfite complex. A hydrogen peroxide solution is added dropwise while stirring the solution to precipitate colloidal platinum particles in the solution. Next, the resulting solution is stirred while to this solution is added carbon black (for example, Vulcan XC-72™ (CABOT in USA) or Denka Black™ (Denki Kagaku Kogyo K. K) to allow a platinum powder to adhere to the surface of carbon black. Then, carbon black to which platinum particles adhere is separated from the solution by filtration either under reduced pressure or under pressure and the separated carbon black is washed in demineralized water repeatedly, and then thoroughly dried at a room temperature. Then the carbon black coagulated through the drying process is crushed using a crusher and heated at 250 to 350° C. for about 2 hours in a hydrogen reducing atmosphere to reduce platinum adsorbed to carbon black and to remove chlorine remaining unremoved thereby producing a carbon powder carrying a platinum catalyst.

The carrier density of platinum on carbon black (the ratio of the amount of platinum on carbon to the amount of carbon) can be controlled by changing the ratio of the amount of platinic acid chloride to the amount of carbon black and hence a platinum catalyst having an optional carrier density can be obtained. The method for the production of the platinum catalyst is not limited to the above method. A platinum catalyst produced by other methods may be used as far as sufficient catalytic activity is obtained in these methods.

The foregoing explanations are given for the case of using platinum as a catalyst. Apart from platinum, an alloy catalyst comprising an alloy composed of platinum as a first component and one or more components selected from ruthenium, nickel, cobalt, indium, iron, chromium, manganese, and the like as a second component may be used.

Both the anode 52 and cathode 53 are formed of carbon cloth woven from carbon fibers. It is also preferable to make these electrodes by using carbon paper or carbon felt instead of the carbon cloth.

The electrolyte film 51, the anode 52 and the cathode 53 are integrated by thermocompression. Specifically, the electrolyte film 51 coated with a catalyst such as platinum is interposed between the anode 52 and the cathode 53 and these materials are thermocompressed in the heat at a temperature ranging form 120 to 130° C. As the method for the integration of the electrolyte film 51, the anode 52 and the cathode 53, other than thermocompression, adhesive method may be used. When the electrolyte film 51 is interposed between the anode 52 and the cathode 53, if the electrode and the electrolyte film 51 are joined using a proton electroconductive solid polymer solution (for example, Nafion solution, manufactured by Aldrich Chemical), the proton electroconductive solid polymer solution acts as an adhesive in the course of its solidification whereby the electrode and the electrolyte film 51 are secured.

The separators 100A, 100B are made from a gas-impermeable electroconductive material, for example, fine carbon which is made gas-impermeable by compressing carbon.

The foregoing descriptions are given to explain the structure of the unit cell 50 which is a base unit. When it is actually fabricated as a fuel cell, the separator 10A, the anode 52, the electrolyte film 51, the cathode 53, and the separator 100B are laminated in this order and a set of these materials is laminated plurally (for instance, 100 sets). Then, collector plates composed of fine carbon or a steel plate are disposed on both ends of the above laminated body to form a stack structure.

The shape of the separators 100A, 100B are as follows. These separators 100A, 100B have the same shapes and hence the separator 100A represents a typical separator herein to explain the shape.

Figure 2:
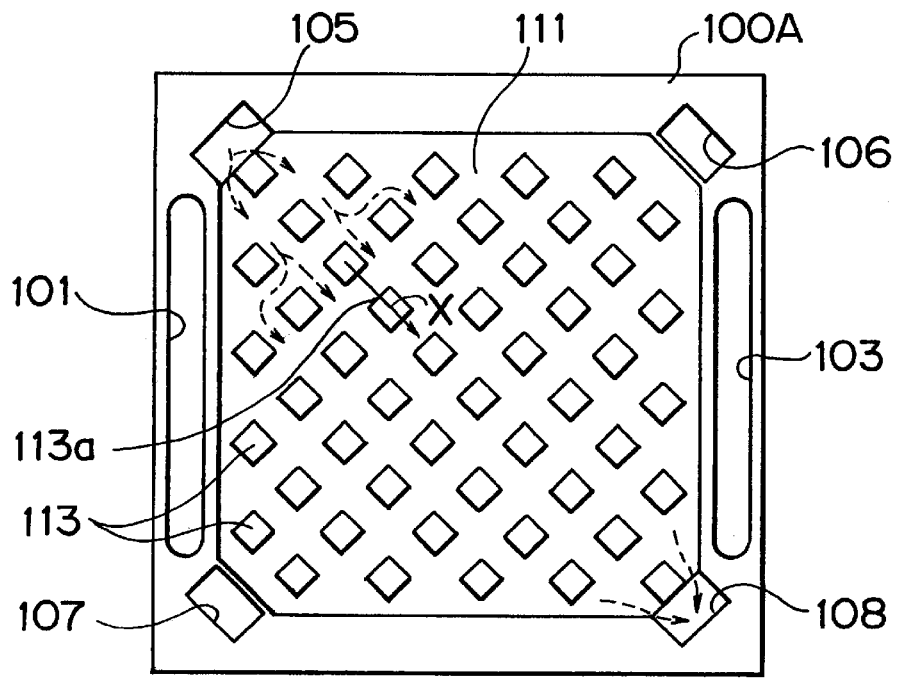
FIG. 2 is a plan view of a separator used in an embodiment of the present invention.
Figure 3:
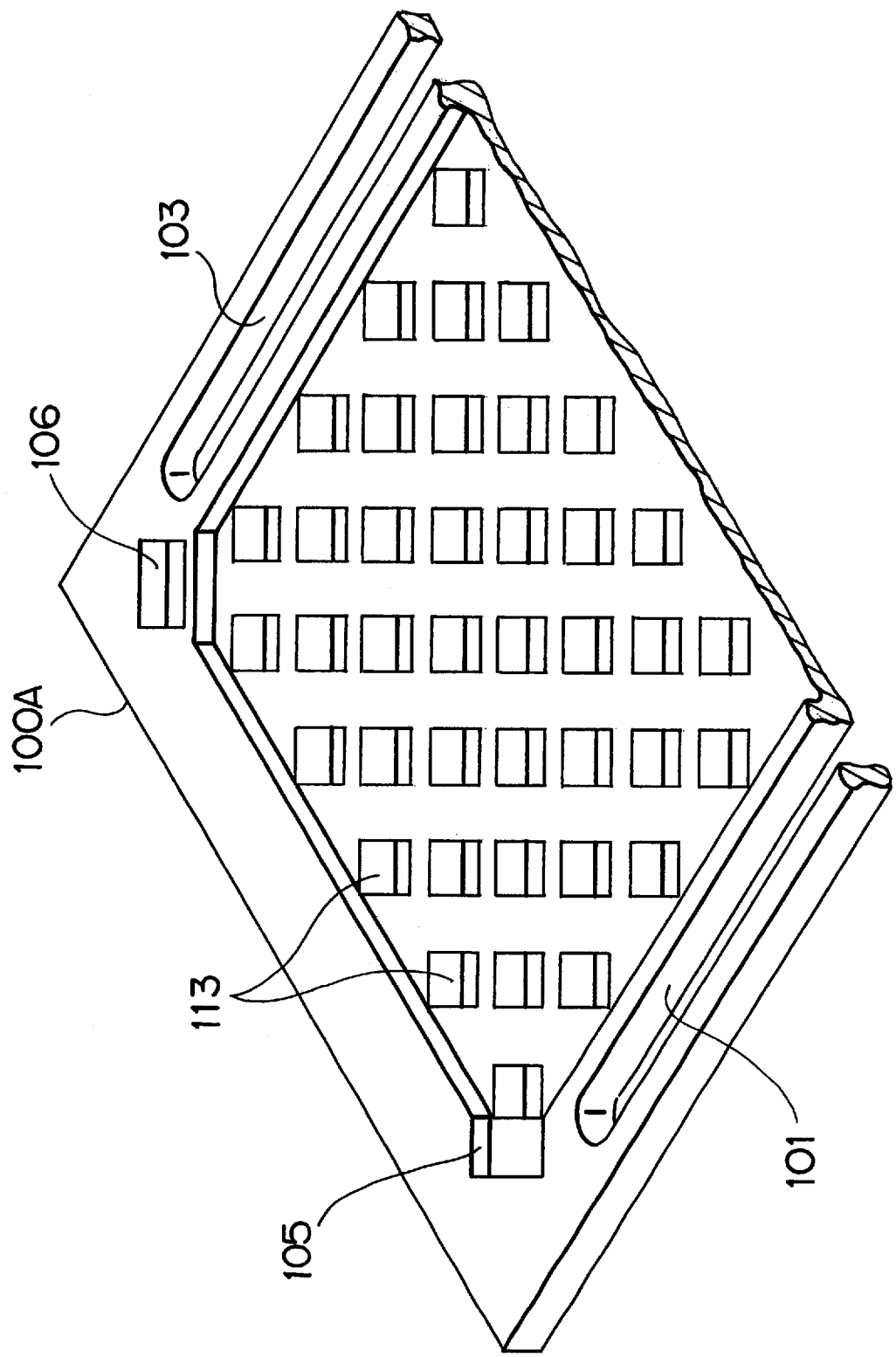
FIG. 3 is a perspective view with a part in section showing the separator of FIG. 2.

FIG. 2 is a plan view of the separator 100A used in the first embodiment of the present invention and FIG. 3 is a perspective view partially in section showing the separator 100A. As shown in these figures, the separator 100A is formed as a regular square plate material in which holes 101, 103 with a large size are formed in the vicinity of the peripheries of two opposite edges respectively and holes 105, 106, 107, 108 with a small size at four corners respectively.

These holes 101, 103 with a large size, when unit cells are laminated, form a passage for supplying and draining water which passage penetrates the fuel cell in the direction of the lamination. The two holes 105, 108 with a small size which are opposed to each other on a diagonal line, when unit cells are laminated, form a passage for supplying and exhausting fuel gas which passage penetrates the fuel cell in the direction of the lamination. The remaining two holes 106, 107 with a small size, when unit cells are laminated, form a passage for supplying and exhausting oxygen-containing gas which passage penetrates the fuel cell in the direction of the lamination.

In more inside section than a peripheral plane of the separator 100A in which plane these holes 101, 103, and 105–108 are formed, a stepped surface 111 one step lower than the above peripheral plane is formed. On the stepped surface 111, projections 113 which are a rectangular parallelepiped with 2 mm width, 2 mm length and 1 mm height and are regularly arranged lattice-like are formed at an equal pitch in plural. Each projection 113 is formed such that one side surface 113a thereof is made perpendicular to the direction X of a diagonal line extending from the hole 105 to the hole 108.

The separator 100A having such a structure is assembled in the fuel cell such that, as aforementioned, it holds the joint body comprising the anode 52, the electrolyte film 51 and the cathode 53 from both sides. At this time, the anode 52 (the same in the case of the cathode 53) is positioned on a line enclosing a range slightly larger than the stepped surface 111 of the separator 100A. In such a structure, the holes 105, 108 used as the passage for supplying and exhausting fuel gas in the separator 100A are arranged at the positions corresponding to the corners on a diagonal line in the anode 52.

Gas passages branched in plural directions are defined by a combination of the projection 113, the stepped surface 111 and the surface of the anode 52, as shown by the dotted arrow in the figure. Each of the holes 105, 108 is on a plane with the same height as that of the stepped surface 111 and fuel gas is introduced from the holes 105, 108 into the aforementioned gas passages These gas passages correspond to the fuel gas passage.

On the other surface (back surface shown in FIG. 2) of the separator 100A, a stepped surface and projections having the same shapes as those of the stepped surface 111 and projection 113 respectively are formed (not shown). A combination of the se stepped surface and projections and the surface of the cathode 53 forms a passage of gas. Oxygen-containing gas from the passage for supplying and exhausting oxygen-containing gas structured by the hole 106, 107 is supplied to and exhausted from the above gas passage. Such a gas passage corresponds to the oxygen-containing gas passage. The holes 106, 107 used as the passages for supplying and exhausting oxygen-containing gas in the separator 100A are arranged at a positions corresponding to the corners on a diagonal line in the cathode 53.

When the separator 100A is arranged in the fuel cell, it is disposed such that the stepped surface 111 is made parallel to a vertical direction. So the holes 105, 106 are disposed on the upper side and the holes 107, 108 on the lower side. Therefore in the fuel cell in which the separator 100A is arranged, fuel gas is supplied in an inclined and downward direction at an angle of 45 degrees to a vertical , downward direction. On the other hand, oxygen-containing gas is supplied in a direction perpendicular to the direction of the flow of fuel gas and in an inclined and downward direction at an angle of 45 degrees to a vertical , downward direction.

In the fuel cell of this embodiment having such a structure, the holes 105, 106 for supplying and exhausting fuel gas which holes are arranged in the separator 100A are formed at positions corresponding to the corners on a diagonal line in the anode 52 whereas the holes 107, 108 for supplying and exhausting oxygen-containing gas which holes are arranged in the separator 100A are formed at positions corresponding to the corners on a diagonal line in the cathode 53. This structure makes it possible to make the separator 100A smaller in size than in the case where a gas supplying and exhausting port is arranged in the position corresponding to a side periphery in an electrode. The volumetric efficiency of the fuel cell can be thereby improved.

Next, a second embodiment of the present invention will be explained.

Figure 4:
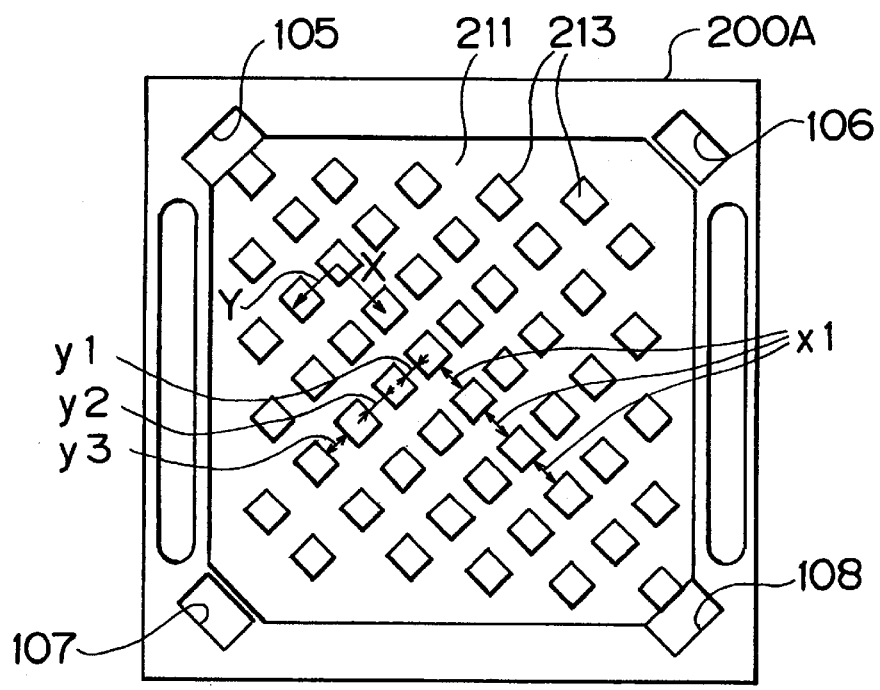
FIG. 4 is a plan view of a separator used in an embodiment of the present invention.

FIG. 4 is a plan view of a separator 200A used in the present invention. As shown in the figure, the separator 200A is a lattice type like the separator 100A of the first embodiment but differs in the arrangement of the projections. As shown in the figure, plural projections 213 on a stepped surface 111 (the same parts as in the first embodiment are represented by the same symbols) are formed in a manner that the projections are arranged at equal intervals in the direction X of a diagonal line between holes 105 and 108, but, in the direction Y perpendicular to the direction X, at intervals increasing as adjacent projections are further from the center.

In the concrete, the interval x1 between projections in the direction X is 2 mm and the intervals y1, y2, y3, . . . (y1 is the interval between adjacent projections positioned closest to the center, indicating an interval between further outside adjacent projection as the attached numeral increase) are, for instance, 0.8 mm, 1.2 mm, 1.6 mm, . . . indicating that the intervals increase by 0.4 mm at every interval. Projections having the same arrangement as the projections 213 are formed on the back surface of the separator 300A.

This embodiment has a structure in which the interval between adjacent projections is designed to be larger at the outside positions far from the diagonal line than in the vicinity of the diagonal line. Gas can easily flow even at the outside positions far away from the diagonal line. This serves to compensate for a reduction in the partial pressure of gas at the outside positions far away from the diagonal line. Therefore, the separator can be small-sized and the diffusibility of gas and the drainage of water can be further improved.

Next, in the fuel cell of this embodiment, an electrode reaction can be promoted on the entire surface of the electrode along the gas passage and hence the fuel cell of this embodiment has an excellent performance of the cell.

Figure 5:
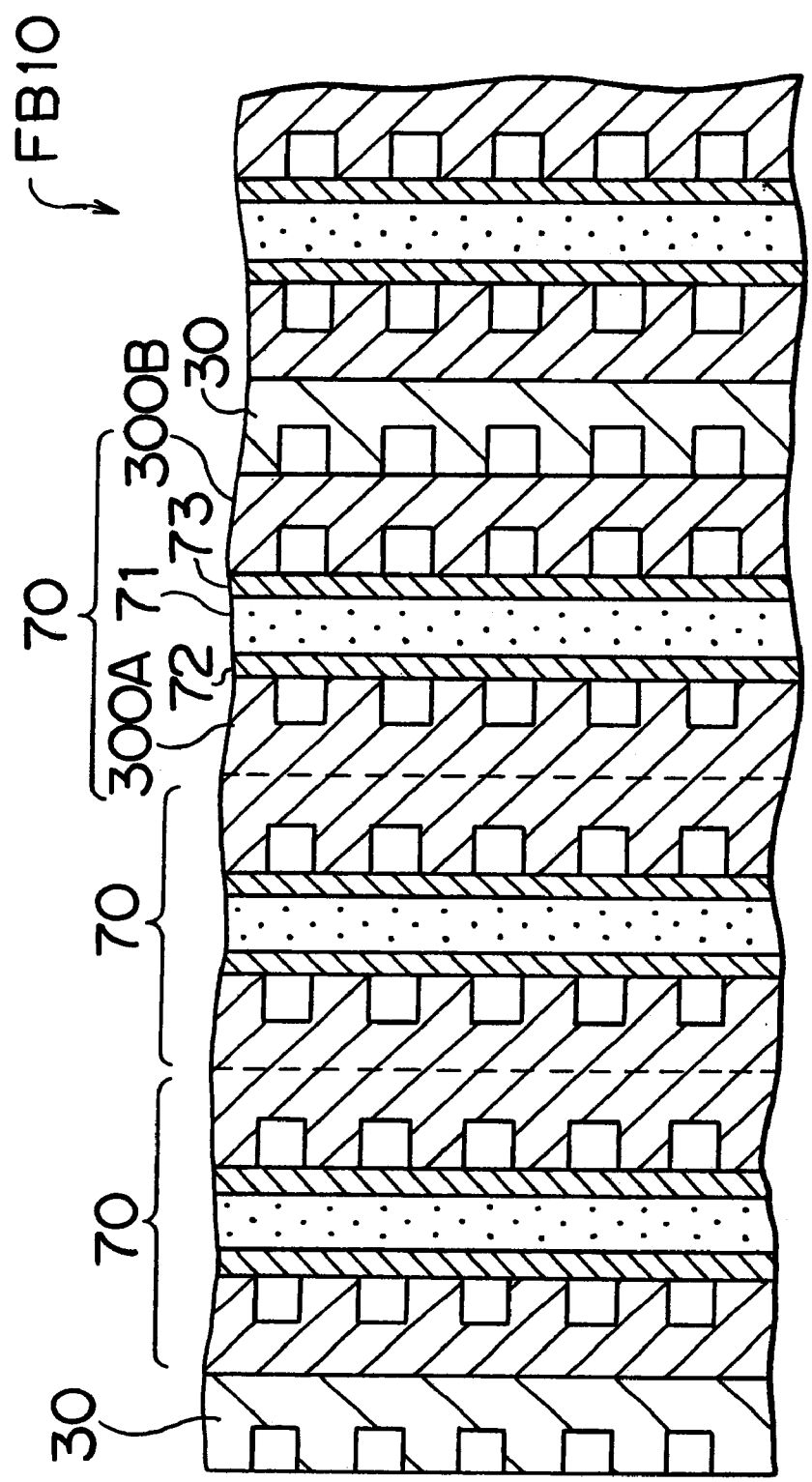
FIG. 5 is a sectional view typically showing a fuel cell of an embodiment of the present invention.

Next, third to fifth embodiments of the present invention will be explained with reference to FIGS. 5 to 17. In the third embodiment, as shown in FIG. 5, a separator 300A, an anode 72, an electrolyte film 71, a cathode 73, and a separator 300B are laminated in this order and a set of these materials is laminated in plural (3 sets in FIG. 5) wherein a cooling plate 30 is inserted every lamination of the set. A combination of three unit cells 70 having such a structure and the cooling plate 30 is laminated in plural, for example, 100 sets. The cooling plate 30 is formed of the same material as those of the separators 300A, 300B and serves to control the temperature of a fuel cell FB10 by supplying and withdrawing external cooling water.

Figure 6:
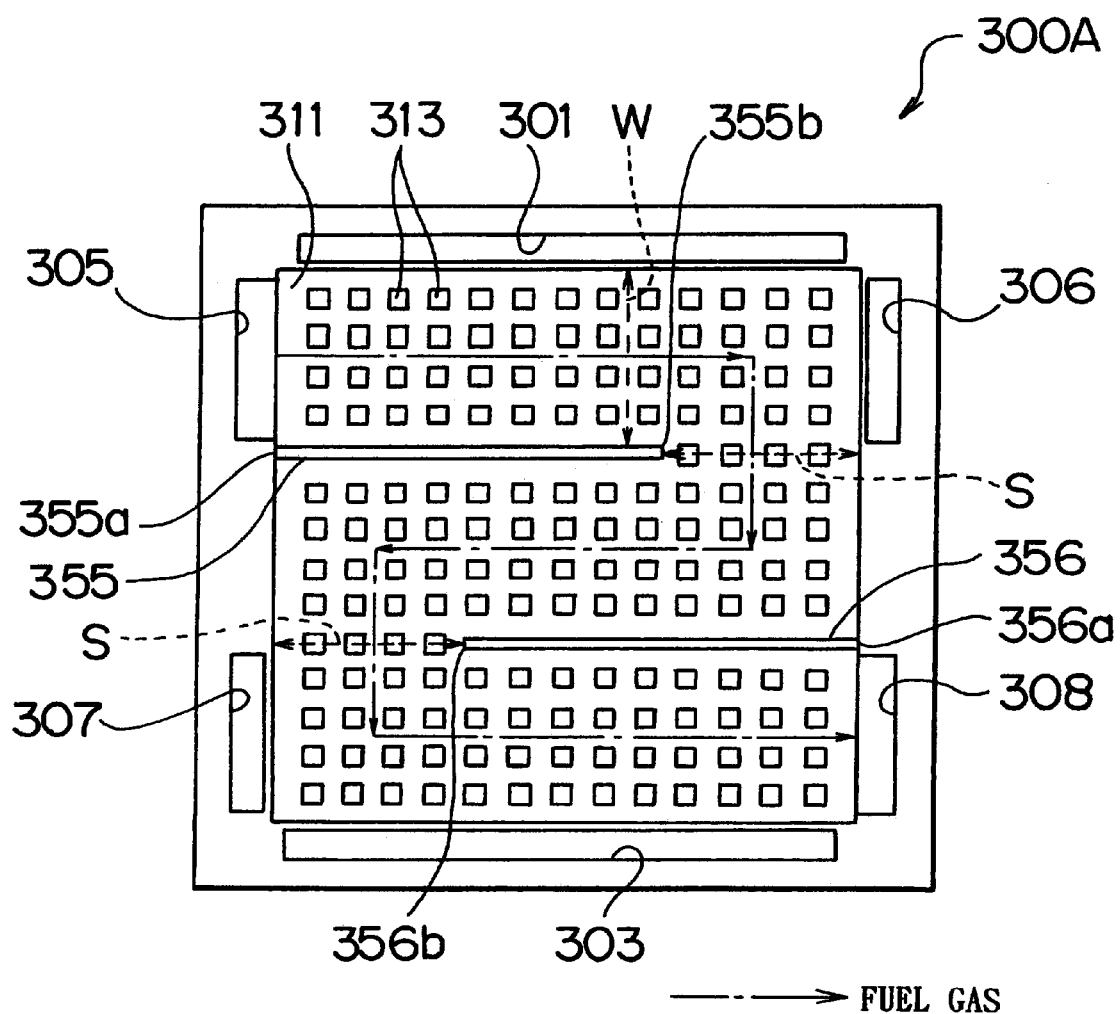
FIG. 6 is a plan view of a separator used in an embodiment of the present invention.
Figure 7:
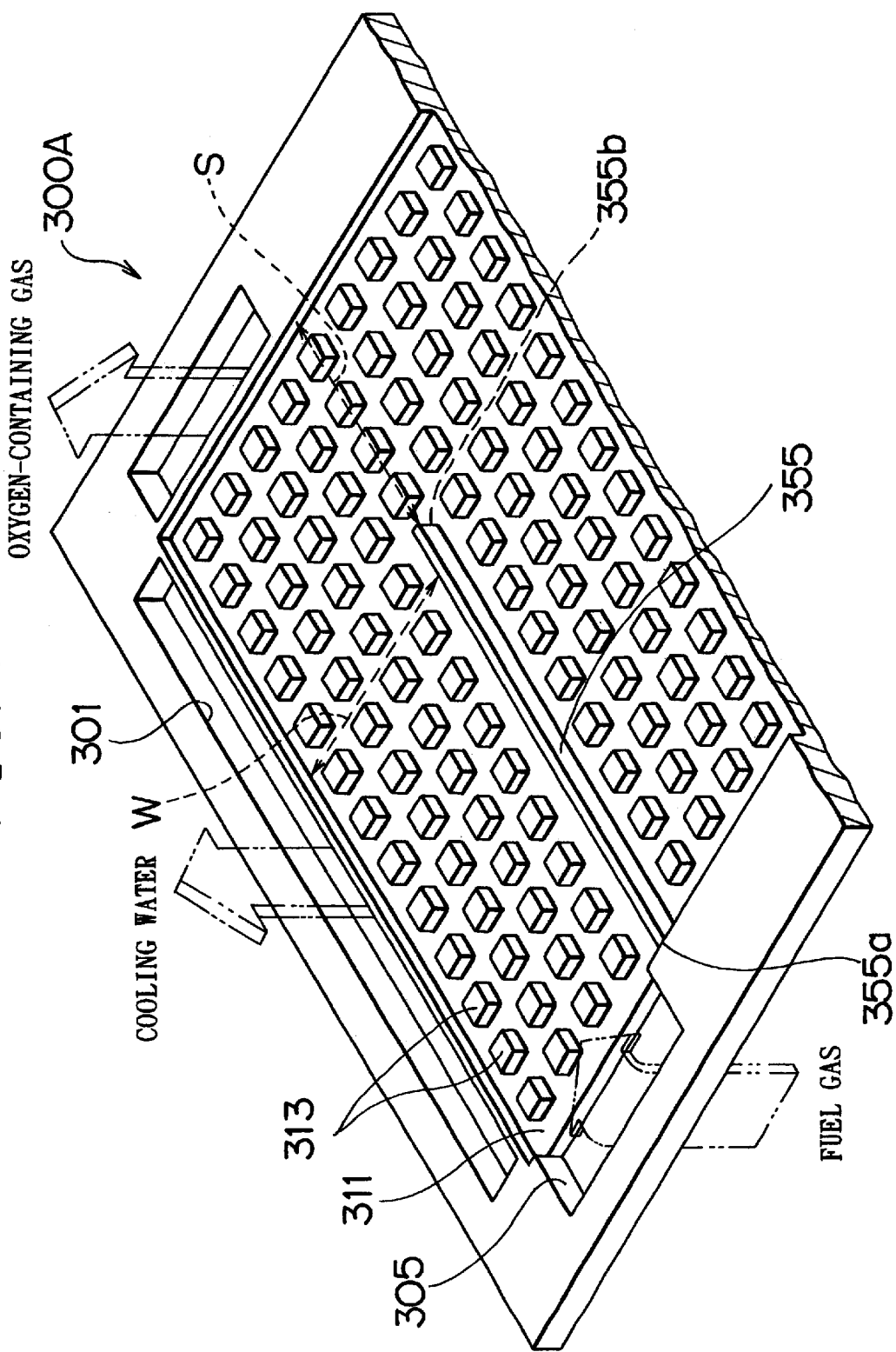
FIG. 7 is a perspective view with a part in section showing the separator of FIG. 6.

FIG. 6 is a plan view of the separator 300A of this embodiment. FIG. 7 is a perspective view of the half part of the separator 300A. As shown in FIGS. 6 and 7, the separator 300A is formed as a square plate material in which square holes 301, 303 with a large size are formed in the vicinity of two opposite side edges respectively and square holes 305, 306, 307, 308 with a small size in the vicinity of other two side edges respectively.

The holes 301, 303 with a large size, when unit cells are laminated, form two passages for supplying and withdrawing cooling water which passages penetrate the fuel cell 310 in the direction of the lamination. The two holes 305, 308 with a small size which are opposed to each other on a diagonal line, when unit cells are laminated, form two passages for supplying and exhausting fuel gas which passages penetrate the fuel cell 310 in the direction of the lamination. The remainder two holes 306, 307 with a small size, when unit cells are laminated, form passages for supplying and exhausting oxygen-containing gas which passages penetrate the fuel cell in the direction of the lamination.

In further inside section than a peripheral plane of the separator 300A in which plane these holes 301, 303, and 305, 306, 307, 308 are formed, a stepped surface 311 one step lower than the above peripheral plane is formed. On the stepped surface 311, projections 313 which are a rectangular parallelepiped with 2 mm wide, 2 mm long and 1 mm high and are regularly arranged lattice-like are formed in plural.

On the stepped surface 311, two linear rib pieces 355, 356 arranged so as to divide the width of the stepped surface 311 into three equal parts are formed. Each of the rib pieces 355, 356 has the same height of 1 mm as that of the projection 313, a width of 1 mm and a length shorter than the side width of the stepped surface 311. The rib pieces 355, 356 are formed such that directionally inverse ends 355a, 356a of the rib pieces 355, 356 respectively are connected to the peripheral plane of the separator 300A and the other ends 355b, 356b of the rib pieces 355, 356 respectively are positioned away from the peripheral plane at the given distance S. The distance S is the same as the width W of a passage formed by the rib pieces 355, 356 in this embodiment.

The stepped surface 311 is divided into three areas by the rib pieces 355, 356. These areas are communicated with each other and, as a consequence, one large wavy (bent form) passage is formed on the stepped surface 311. Both ends of the passage are connected to certain positions of the holes 305 and 308. Since no partitioned wall is not present between the ends of the passage and the holes 305, 308 respectively, the wavy passage is communicated with the holes 305, 308. As a result, fuel gas from the passage for supplying and exhausting fuel gas which passage comprises the holes 305, 308 is supplied to and exhausted from the above passage on the stepped surface 311.

According to the separator 300A having such a structure, in general, a combination of the rib pieces 355, 356, the stepped surface 311 and the surface of the anode 72 forms a wavy passage (large passage) for fuel gas. In details, a combination of the projections 313, the stepped surface 311 and the surface of the anode 72 forms passages (small passages) for fuel gas which are branched in a plurality of directions. These passages of fuel gas correspond to the fuel gas passages 100AP shown in FIG. 1.

Also on the other surface (the back surface in FIG. 6) of the separator 300A, a stepped surface, projections and rib pieces (both not shown) having the same shapes as those of the stepped surface 311, the projections 313 and rib pieces 355, 356 respectively are formed. A combination of these stepped surface, projections, rib pieces and the surface of the cathode 73 forms a passage of oxygen-containing gas. Oxygen-containing gas from the passage for supplying and exhausting oxygen-containing gas which passage has the hole 306, 307 is supplied to and exhausted from the passage of oxygen-containing gas. Such a passage of oxygen-containing gas corresponds to the oxygen-containing gas passage 100BP shown in FIG. 1.

As explained in detail, in the fuel cell 310 of this embodiment, a wavy passage of fuel gas is formed between the holes 305 and 308 and plural projections 313 are formed in the passage. The formation of the rib pieces 355, 356 ensures that the entire width of the passage communicated with the holes 305, 308 as the inlet and outlet of fuel gas is decreased. As the narrow width of the passage increases the flow velocity of fuel gas, concentration polarization can be reduced by enhancing diffusibility of fuel gas. Also in the case of oxygen-containing gas, the same structure is made in which the concentration polarization can be reduced by enhancing diffusibility of fuel gas.

In this fuel cell FB10, the total length of the passage is elongated by forming the gas passage into the wavy shape. It is therefore possible to prevent the dry-up of the electrolyte film even if dry gas is used as the supply gas including the fuel gas and the oxygen-containing gas. In general, on the cathode 323, water is created by an electrode reaction and there is the case where the drainage of the created water is excessive causing the electrolyte film to be dried-up. However in the fuel cell using the separator of this embodiment, if the total length of the passage is long, supply gas is gradually moistened as it goes forward and hence the electrolyte film 321 is prevented from being dried-up. Thus, the actions by which concentration polarization is reduced and the dry-up of the electrolyte film 321 is prevented can improve the performance of the fuel cell FB10.

Next, the fuel cell of the third embodiment will be explained in comparison with fuel cells of related art technologies. Here, as the fuel cells in the related art, two types, a fuel cell using a lattice type separator and a fuel cell (so-called serpentine type) provided with a wavy passage groove were prepared. Also, as operating conditions, two conditions were adopted, specifically, a first condition using wet gas (the humidity of fuel gas and oxygen-containing gas were 100% and 90% respectively) and a second condition using dry gas (humidity of fuel gas and oxygen-containing gas were 100% and 30% respectively).

Figure 8:
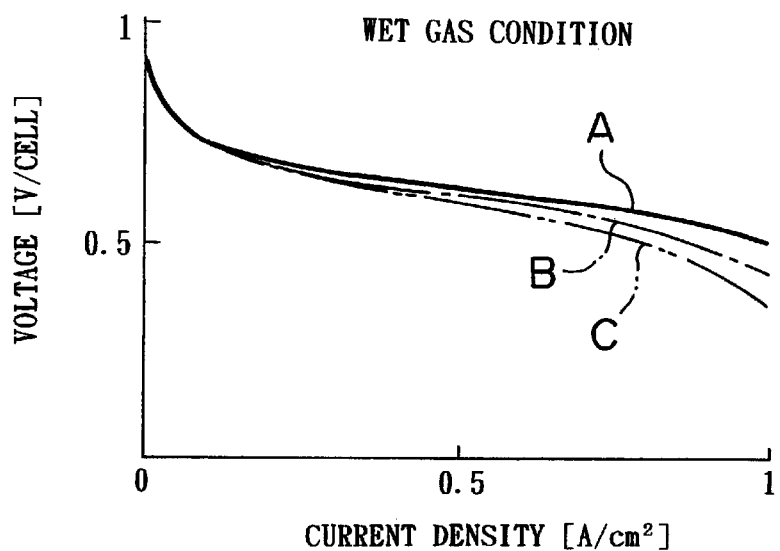
FIGS. 8 and 9 are graphs each showing the relation between voltage and current density of a fuel cell.
Figure 9:
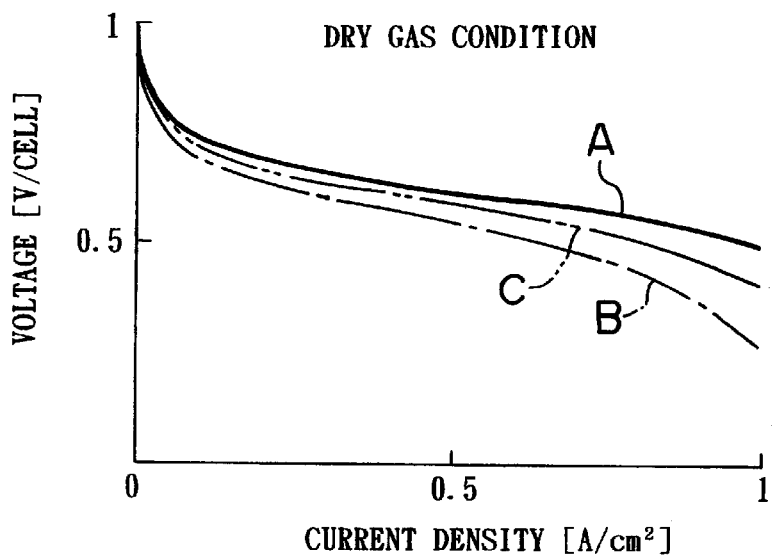
Figure 10:
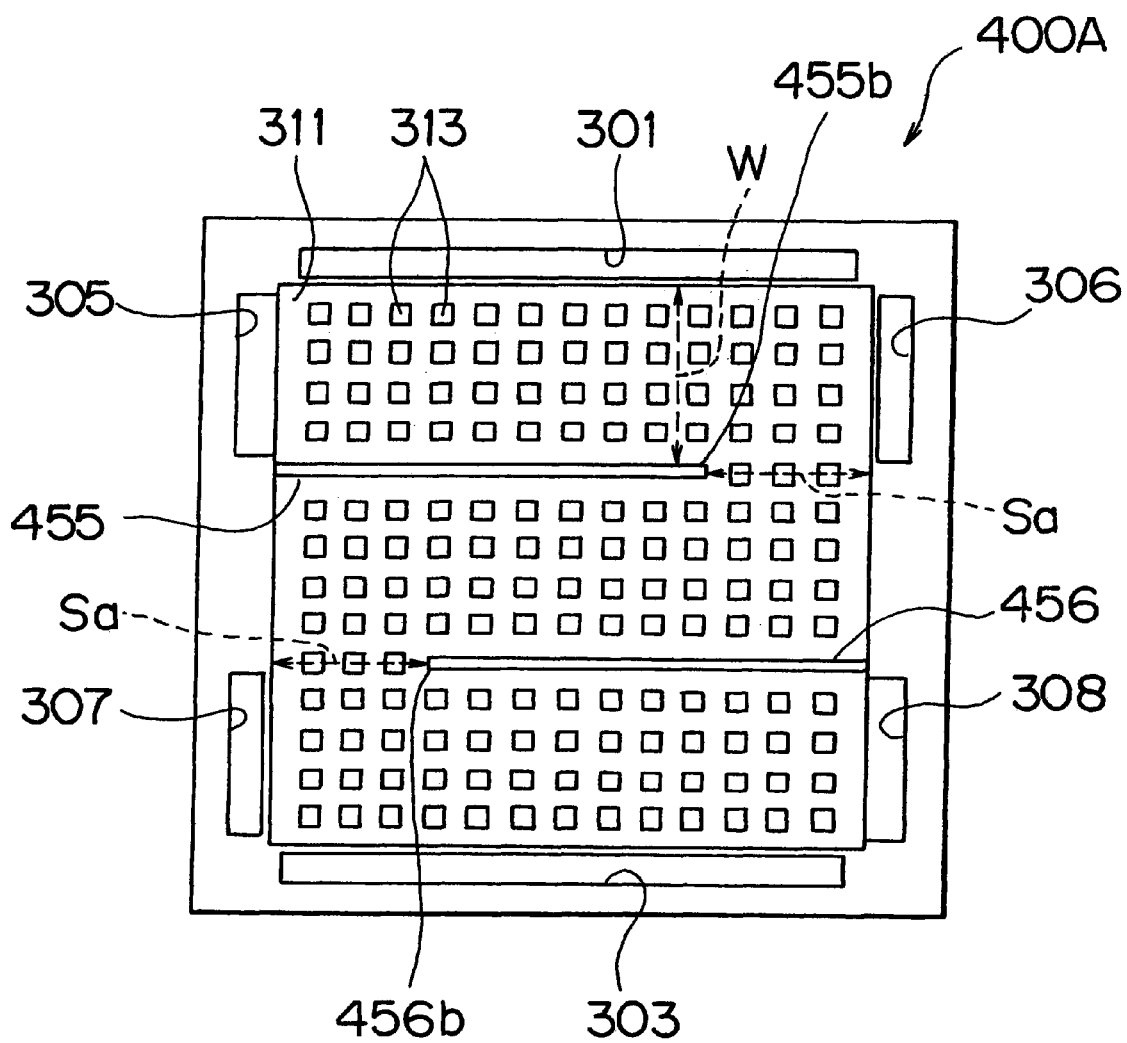
FIGS. 10 and 11 are plan views of a separator used in an embodiment of the present invention.

FIG. 8 is a graph showing the relation between voltage and current density when a fuel cell is operated in the first condition. FIG. 9 is a graph showing the relation between voltage and current density when a fuel cell is operated in the second condition. In FIGS. 8 and 9, the curve A indicates the relation between voltage and current density for the fuel cell, the curve B indicates the relation between voltage and current density for the fuel cell of the lattice type of related art technologies and the curve C indicates the relation between voltage and current density for the fuel cell of the serpentine type of related art technologies.

As shown in FIG. 8, under the condition using the wet supply gas, the fuel cell of the present invention had superior characteristics over all range of current density in contrast with the fuel cells of related art. A voltage reduction particularly at high current densities (above 0.5 A/cm$^2$) is small. An improvement in the gas diffusibility was, thus, confirmed.

As shown in FIG. 9, under the condition using the dry supply gas, the fuel cell of the present invention had superior characteristics over all range of current density in contrast with the fuel cells of related art. In particular, under the condition using dry gas, a voltage reduction is significantly smaller than that of the fuel cell of the lattice type of related art. An improvement in prevention of the dry-up of the electrolyte film 321 was, thus, confirmed.

In the third embodiment, the width (which corresponds to the distance S between the ends 355b, 356b of the rib pieces 355, 356 and the peripheral plane section) of the turning section in the wavy passage which section is formed by the rib pieces 355, 356 is the same as the width W of the passage. Instead of this structure of the separator, the structure of the separator shown in FIG. 10 may be adopted. A separator 400A shown in FIG. 10 has the same shape as that of the separator 300A except that the total length of rib pieces 455, 456 is longer than that of the rib pieces 355, 356 by 1.5 mm (1.5 times the width of the projection). In such a structure, the width of the passage corresponding to the distance Sa between the ends 455b, 456b and the peripheral plane is narrower than the width W of the passage formed by the rib pieces 455, 456.

Accordingly, since the width of the turning section is small, the flow rate of gas at the turning section can be increased. Because of this, the diffusibility of supply gas is further improved, leading to increased flow rate which improves water drainage.

Figure 11:
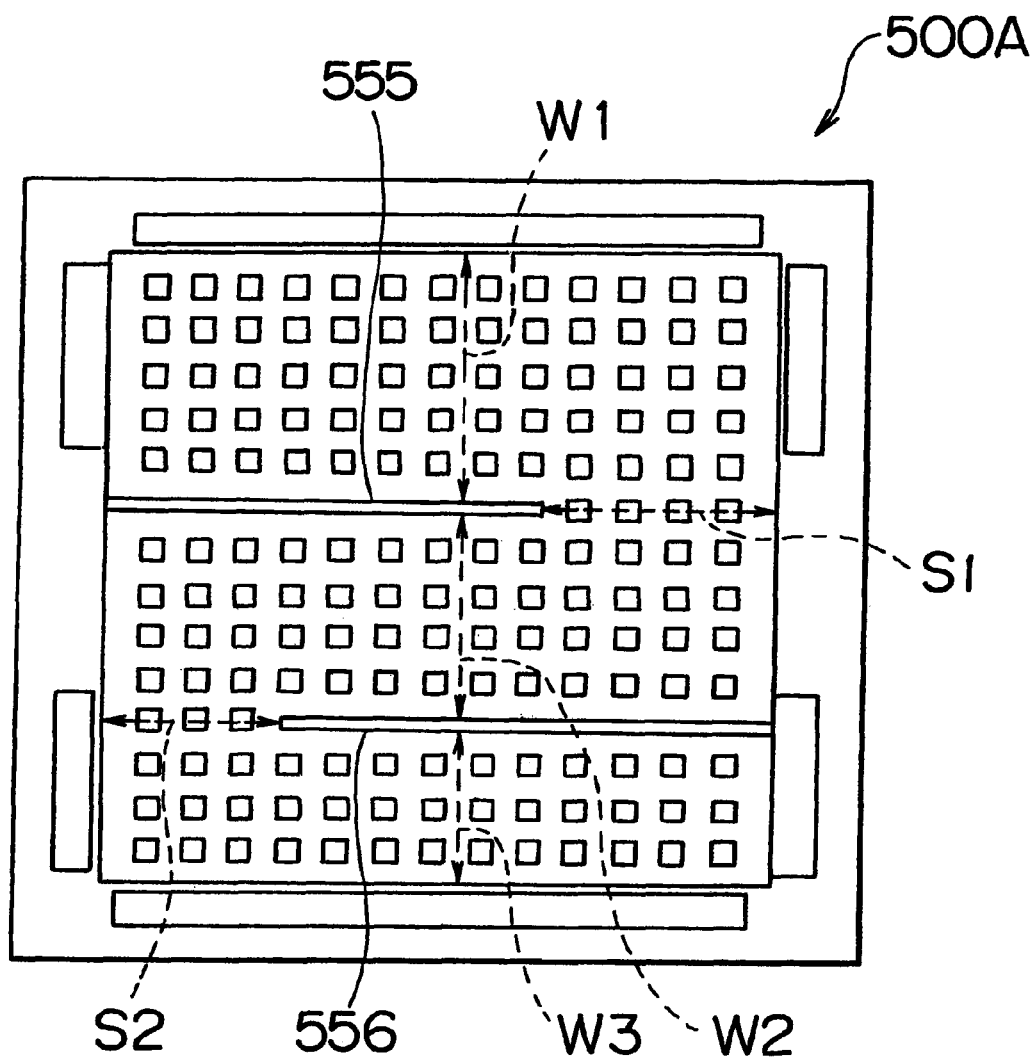

Moreover, the structure shown in FIG. 11 may be adopted in which the widths W1, W2 and W3 structured by the rib pieces 455,456 of a first passage, second passage and third passage respectively decrease every order (that is; these widths have the relation: $W1 \geq W2 \geq W3$). It is noted that, in the separator 500A in FIG. 11, the width S1 of the turning section from the first passage is narrower than the width W1 of the first passage and the width S2 of the turning section from the second passage is narrower than the width W2 of the second passage.

The flow rate can be further increased by the aforementioned two devices that the width of the passage is made narrower with a descent to a downstream side and the width of the turning section is made narrower than the width of the passage just before the turning section. This enhances diffusibility of supply gas whereby the improvement in drainage due to an increase in the flow rate can be more effected.

Next, a fourth embodiment of the present invention will be explained. A fuel cell according to this embodiment is characterized in the shape of a cooling plate.

Figure 12:
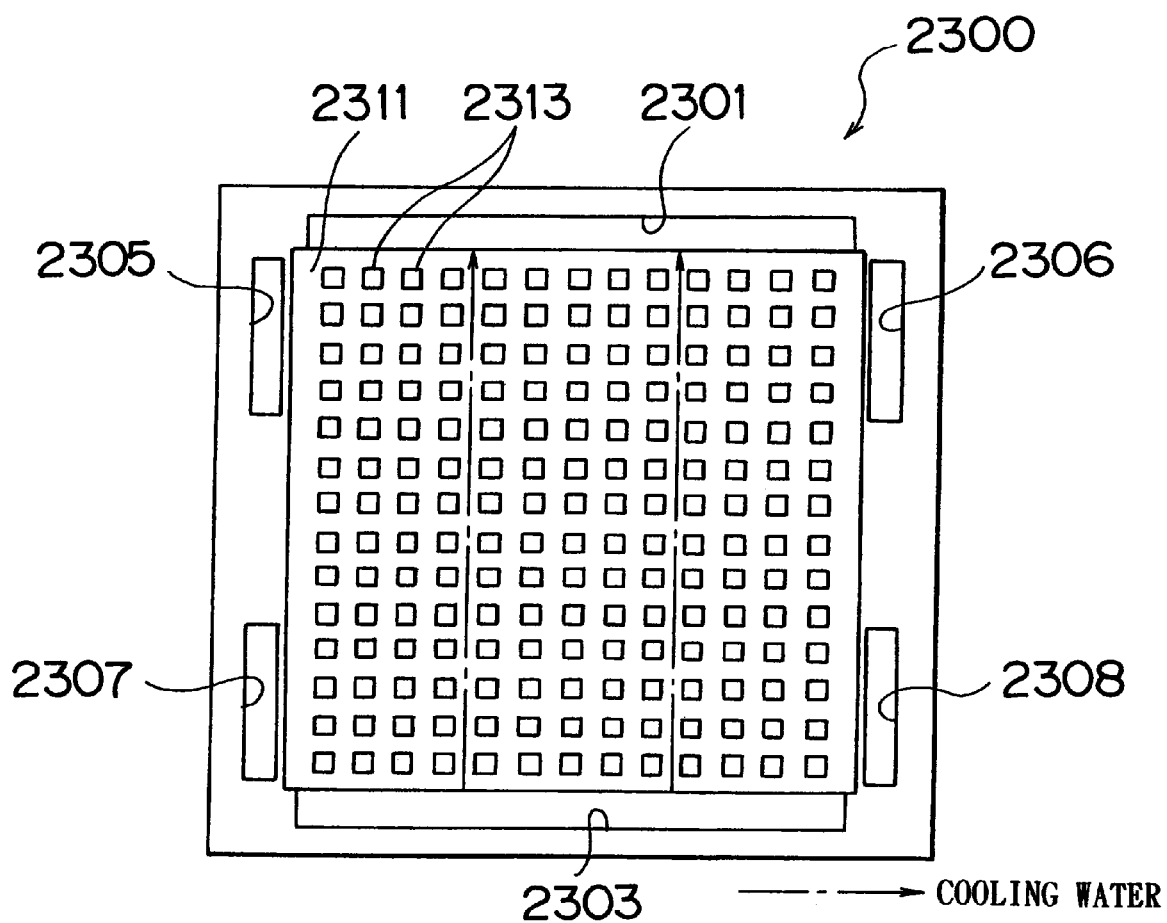
FIG. 12 is a plan view of a cooling plate used in an embodiment of the present invention.

FIG. 12 is a plan view of a cooling plate 2300. The cooling plate 2300 is formed as a square plate material. Like the separators of the above embodiments, square holes 2301, 2303 with a large size are formed in the vicinity of two opposite side edges respectively and square holes 2305, 2306, 2307, 2308 with a small size in the vicinity of other two side edges, respectively.

The holes 2301, 2303 with a large size, when unit cells are laminated, form two passages for supplying and withdrawing cooling water which passages penetrate the fuel cell in the direction of the lamination. The two holes 2305, 2308 with a small size which are opposed to each other on a diagonal line, when unit cells are laminated, form two passages for supplying and exhausting fuel gas which passages penetrate the fuel cell in the direction of the lamination. The remainder two holes 2306, 2307 with a small size, when unit cells are laminated, form passages for supplying and exhausting oxygen-containing gas which passages penetrate the fuel cell in the direction of the lamination.

In more inside section than a peripheral plane of the cooling plate 2300 in which plane these holes 2301, 2303, 2305, 2306, 2307, 2308 are formed, a stepped surface 2311 one step lower than the above peripheral plane is formed. On the stepped surface 2311, projections 2313 which are a rectangular parallelepiped with 2 mm wide, 2 mm long and 1 mm high and are regularly arranged lattice-like are formed in plural. Since no partitioned wall is not present between the stepped surface 2311 and the passage for supplying and draining cooling water and the holes 2301, 2303 with a large size, cooling water from the holes 2301, 2303 is supplied to and drained from the passage formed by the projections 2313 on the stepped surface 2311.

In the fuel cell of this embodiment using the cooling plate constituted in the above manner, the passages of cooling water which passages are branched in plural directions are formed by a plurality of projections 2313 formed on the cooling plate 2300. This improves the diffusibility of cooling water whereby the flow distribution of cooling water can be uniformed. Also, a heating surface area can be increased by the effect of the projections 2313 having such a shape.

Therefore, according to the fuel cell of this embodiment, the cooling performance can be improved. Flooding of a gas diffusion electrode and dry-up of the electrolyte film can be therefore restricted. Hence the performance of the cell can be improved.

Figure 13:
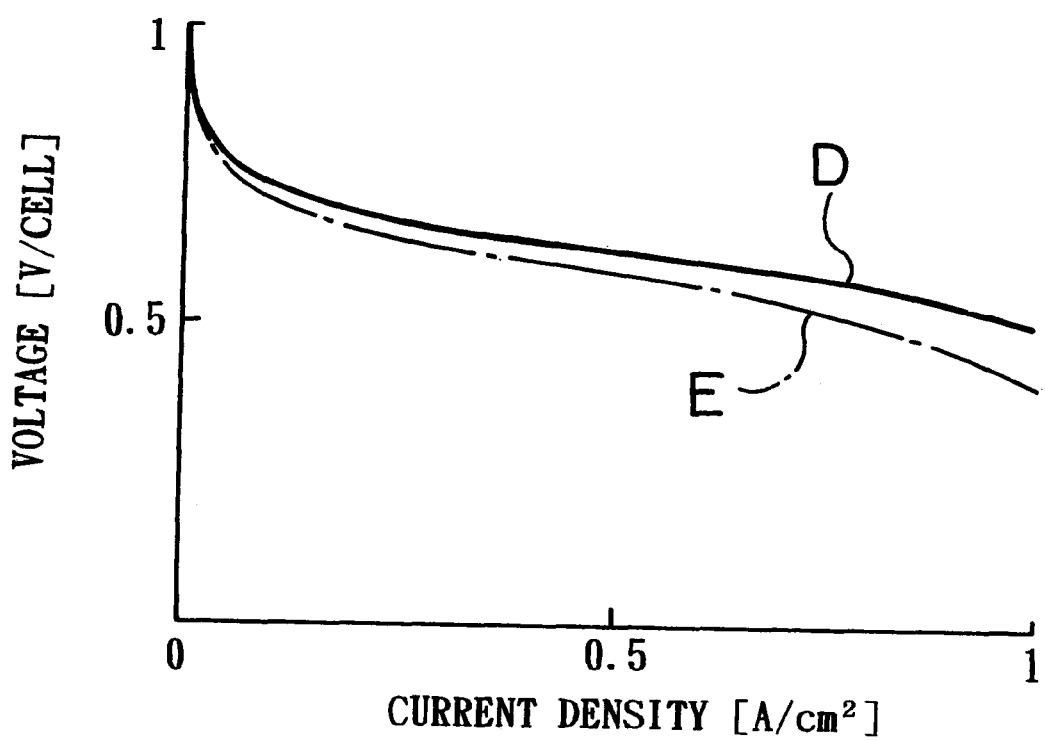
FIG. 13 is a graph showing the relation between voltage and current density of a fuel cell.

FIG. 13 shows the relation between voltage and current density for the fuel cell using the cooling plate according to this embodiment. In the figure, the curve A indicates the relation between voltage and current density for the fuel cell of this embodiment and the curve B indicates the relation between voltage and current density for a fuel cell of related art. The fuel cell of related art is a fuel cell having a straight type cooling plate formed with a plurality of linear passage groove.

As shown in FIG. 13, it was observed that the fuel cell of this embodiment was reduced in voltage drop and improved in the performance of the cell.

Next, a fifth embodiment of the present invention will be explained. Like the fourth embodiment, a fuel cell according to this embodiment is characterized in the shape of a cooling plate. A cooling plate used in this embodiment has almost the same shape as that of the separator 300 explained in the third embodiment. A cooling plate will be explained in detail.

Figure 14:
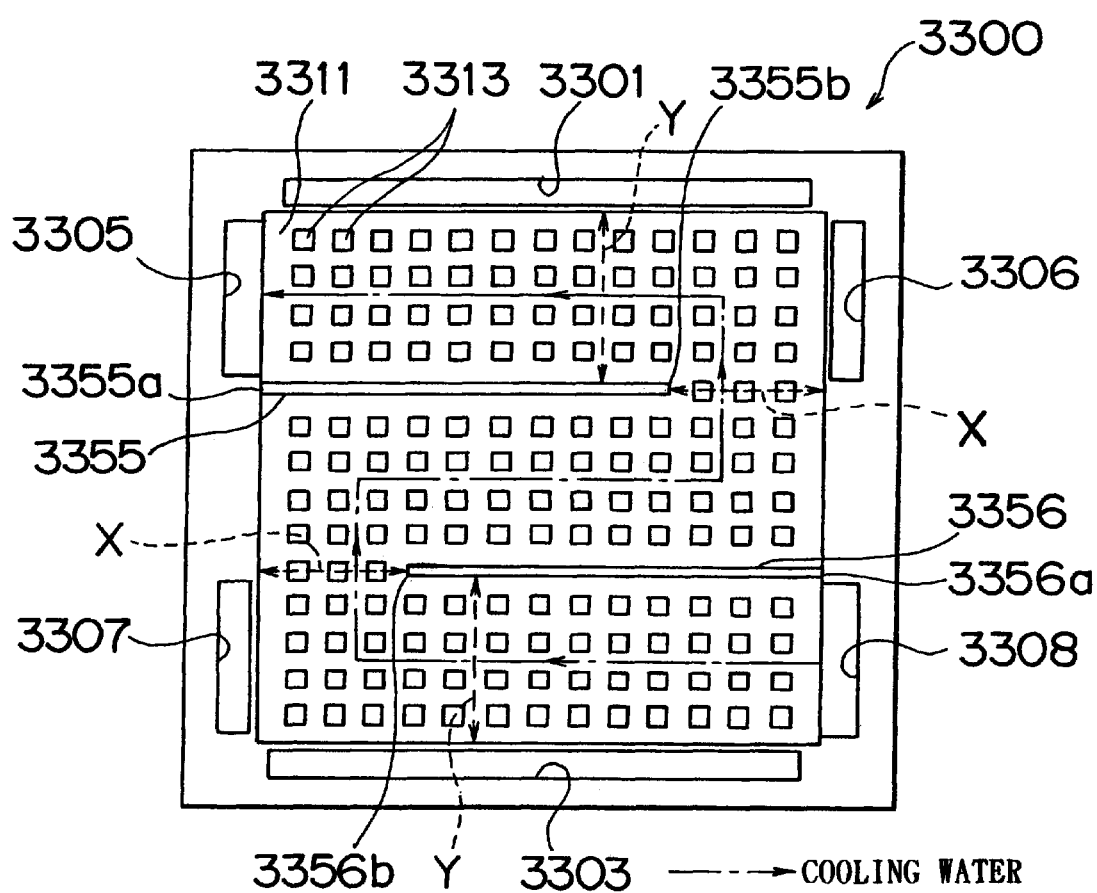
FIG. 14 is a plan view of a cooling plate used in an embodiment of the present invention.

FIG. 14 is a plan view of a cooling plate 3300. As shown in FIG. 14, the cooling plate 3300 is formed as a square plate material. Like the cooling plate 3300 of the fourth embodiment, square holes 3301, 3303 with a large size are formed in the vicinity of two opposite side edges respectively and square holes 3305, 3306, 3307, 3308 with a small size in the vicinity of other two side edges respectively.

In the cooling plate 3300 of this embodiment, the holes 3301, 3303 with a large size, when unit cells are laminated, form two passages for supplying and exhausting oxygen-containing gas which passages penetrate the fuel cell in the direction of the lamination. The opposite two holes 3305, 3308 with a small size on a diagonal line, when unit cells are laminated, form two passages for supplying and draining cooling water which passages penetrate the fuel cell in the direction of the lamination. The remainder two holes 3306, 3307 with a small size, when unit cells are laminated, form passages for supplying and exhausting fuel gas which passages penetrate the fuel cell in the direction of the lamination.

In more inside section than a peripheral plane of the cooling plate 3300 in which plane these holes 3301, 3303, 3305, 3306, 3307, 3308 are formed, a stepped surface 3311 one step lower than the above peripheral plane is formed. On the stepped surface 3311, projections 3313 which are a rectangular parallelepiped with 2 mm wide, 2 mm long and 1 mm high and are regularly arranged lattice-like are formed in plural.

On the stepped surface 3311, two linear rib pieces 3355, 3356 arranged so as to divide the width of the stepped surface 3311 into three equal parts are formed. The rib pieces 3355, 3356 each have the same height of 1 mm as that of the projection 3313, a width of 1 mm and a length shorter than the side width of the stepped surface 3311. The rib pieces 3355, 3356 are formed such that directionally inverse ends 3355a, 3356a of the rib pieces 3355, 3356 respectively are connected to the peripheral plane of the cooling plate 3300 and the other ends 3355b, 3356b of the rib pieces 3355, 3356 respectively are positioned away from the peripheral plane at the given distance X. The distance X is narrower than the width Y of a passage formed by the rib pieces 3355, 3356 in this embodiment. As for the magnitude of the distance X and the width Y, though the width Y is not necessarily required to be larger, the difference of the both causes the difference in the cooling performance. The difference in the cooling performance will be described later.

The stepped surface 3311 is divided into three areas by the rib pieces 3355, 3356. These areas are communicated and, as a consequence, one large wavy (bent form) passage is formed on the stepped surface 3311. Both ends of the passage are connected to certain positions of the holes 3305 and 3303. Since no partitioned wall does not present between the ends of the passage and the holes 3305, 3308 respectively, the wavy passage is communicated with the holes 3305, 3308. As a result, cooling water from a passage for supplying and draining cooling water which passage comprises the holes 3305, 3308 is supplied to and exhausted from the above passage on the stepped surface 3501.

According to such a structure, in general, a combination of the rib pieces 3355, 3356, the stepped surface 3311, and the surface of the gas diffusion electrode which surface is opposite to the electrolyte film forms a wavy passage (large passage) for cooling water. In details, a combination of the projections 3313, the stepped surface 3311 and the surface of the gas diffusion electrode which surface is opposite to the electrolyte film forms passages (small passages) for cooling water which are branched in a plurality of directions.

Cooling water is branched in plural directions by plural projections 3313 formed on the cooling plate 3300 having the above structure to thereby improve the diffusibility of cooling water. Also, the width of entire passage is narrowed to increase the flow rate of cooling water by the rib pieces 3355, 3356.

In the fuel cell of this embodiment, the cooling (temperature regulation) performance can be more improved due to improved diffusibility and flow rate. This allows the performance of the cell to be improved.

Moreover, in the fuel cell of this embodiment, the distance X corresponding to the width of the turning section of the wavy passage of cooling water is narrower than the width Y of the passage. The diffusibility and flow rate of cooling water can be improved by this turning section. The cooling (temperature regulation) performance can be more improved due to improved diffusibility and flow rate. This allows the performance of the cell to be more improved.

The following explanations are made to compare the performances of fuel cells obtained by altering the width (which corresponds to the distance X and hereinafter the width of the turning section is also represented by X) of the turning section of the passage of cooling water. Here, for comparison, a first structure in which the width X of the turning section of the passage of cooling water is narrower than the width Y of the passage (this embodiment), a second structure in which the width X of the turning section is equal to the width Y of the passage and a third structure in which the width X of the turning section is larger than the width Y of the passage are prepared.

Figure 15:
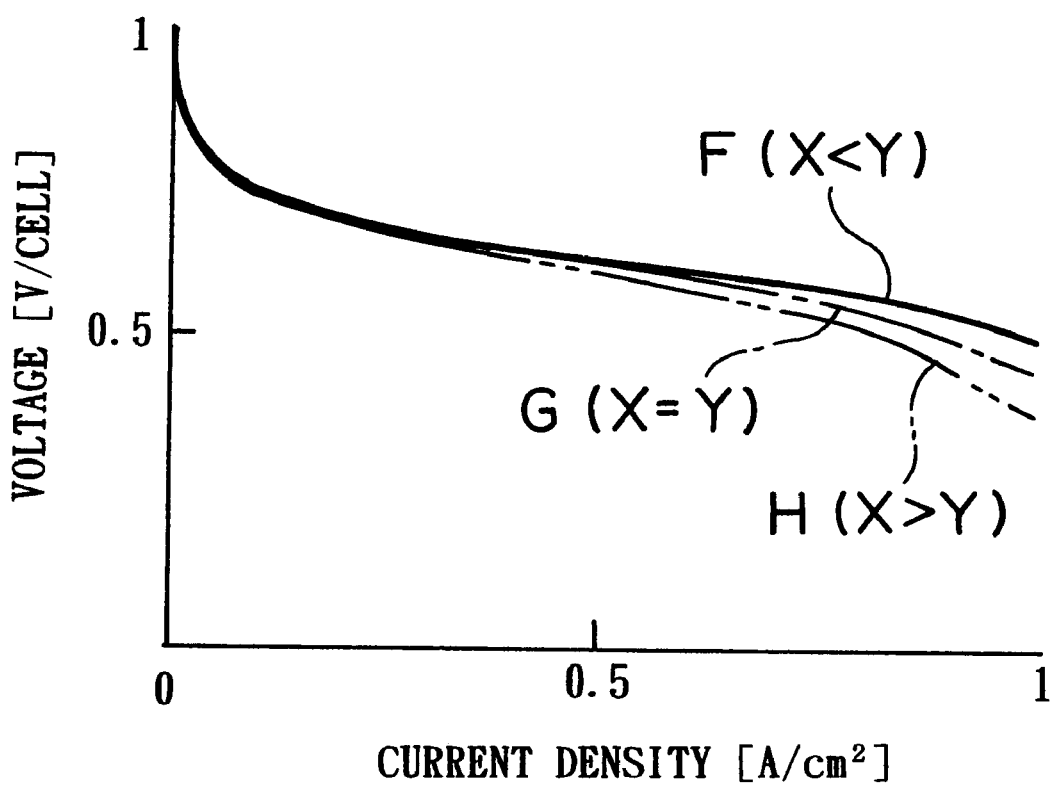
FIG. 15 is a graph showing the relation between voltage and current density of a fuel cell.

FIG. 15 is a graph showing the relation between voltage and current density for the fuel cells having the above structures. In the figure, the curves F, G and H correspond to the relations for the fuel cells having the first, second and third structures respectively.

As shown in FIG. 15, the fuel cell having the first structure in which the width X of the turning section of the passage of cooling water is narrower than the width Y of the passage, as shown FIG. 15, has superior characteristics compared to the fuel cells having other two structures over all current densities in a measurement range. It is confirmed that a voltage drop particularly at high current densities (above 0.5 A/cm$^2$) is small. The fuel cell having the second structure in which the width X is equal to the width Y has the second superior cell characteristics.

Therefore, it is also confirmed from the results shown in FIG. 15 that the performance of the fuel cell can be improved by making the width X of the turning section in the passage of cooling water narrower than the width Y of the passage like this embodiment.

Figure 16:
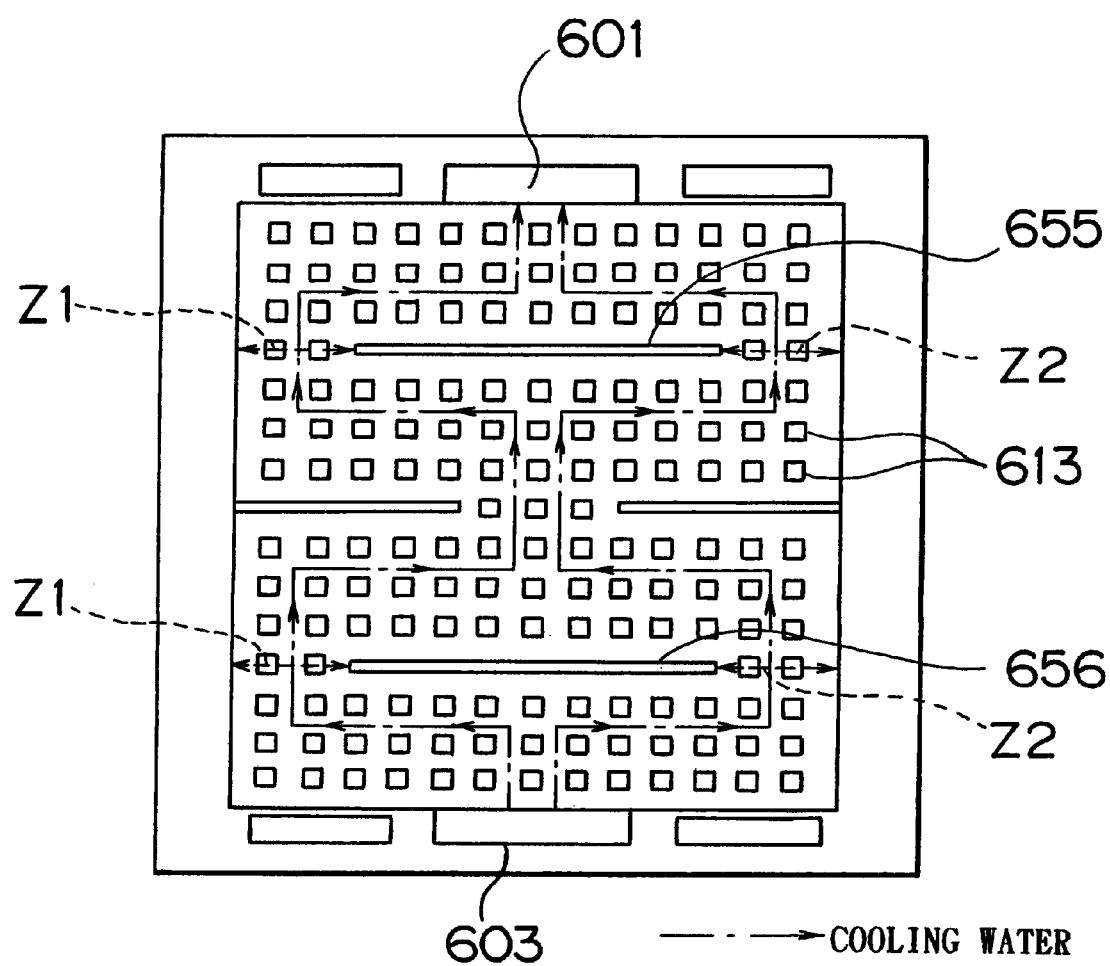
FIGS. 16 and 17 are plan views of a separator and a cooling plate used in an embodiment of the present invention.

The separator 300A and the cooling plate 2300 which are mounted on the third and fifth embodiments respectively form one continuous passage by using rib pieces 355, 356 (2355, 2356). A separator or cooling plate having the following shape may be used instead of the above separator and cooling plate. Specifically, as shown in FIG. 16, in the separator or cooling plate of this embodiment, rib pieces 655, 656 in which both ends of each of these rib pieces are designed to be away from the peripheral plane is formed on the bottom of a passage and a passage is branched through the gap between the rib pieces 655, 656 and both peripheral planes. This structure also makes it possible to form a large passage having bent portions between the inlet 601 and outlet 603 of cooling water. Like the third and fifth embodiments, the performance of the fuel cell can be improved.

Figure 17:
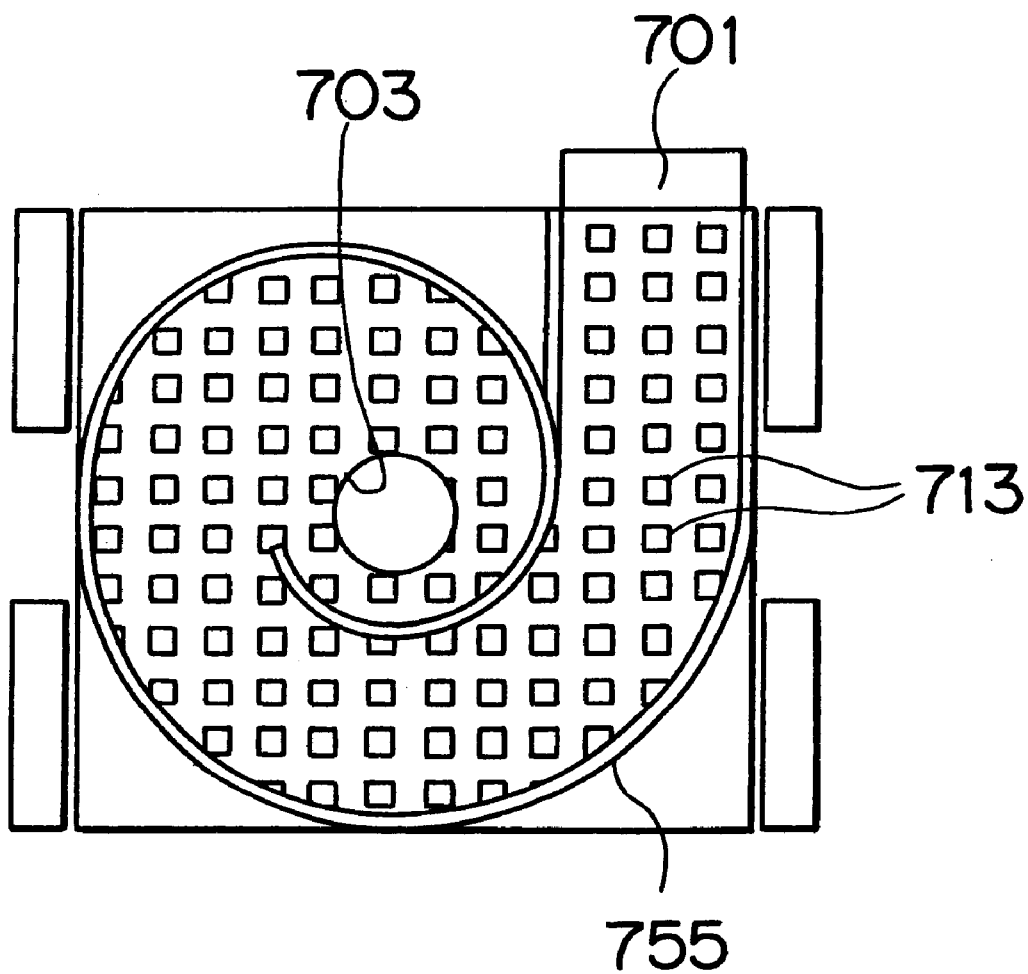

As the shape of the separator or cooling plate, as shown in FIG. 17, a structure in which plural projections 713 are disposed on the bottom of a passage and an eddy-like rib section 755 is also disposed on the bottom of the passage may be used. This structure also makes it possible to form a large passage having an eddy-like large passage between the inlet 701 and outlet 703 of cooling water whereby the performance of the fuel cell can be improved.

Next, sixth to eighth embodiments will be explained with reference to FIGS. 18 to 26. The sixth to eighth embodiments are characterized by a structure in which a separator holds a reaction electrode layer (a joint body which is constituted by interposing an electrolyte film 22 between an anode 24 and a cathode 25).

Figure 18:
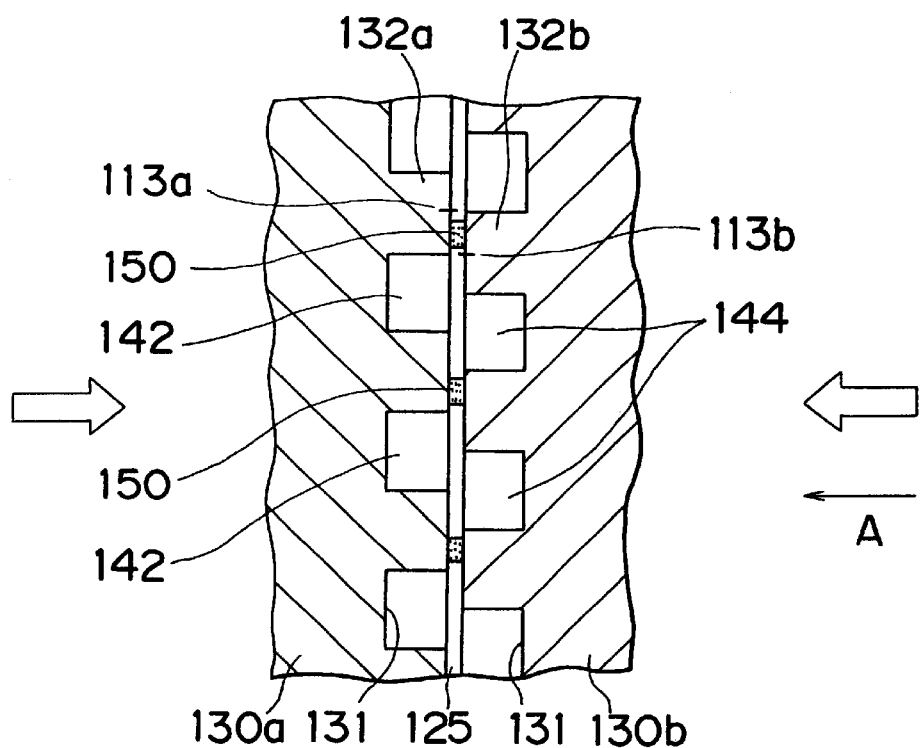
FIG. 18 is a sectional view typically showing the state where a gas separator of a sixth embodiment of the present invention sandwiches a joint body.

FIG. 18 is a sectional view typically showing the condition that a separator holds a reaction electrode layer in which an electrolyte film is held between an anode and a cathode. In the sixth to eighth embodiments, the electrolyte film, the anode and the cathode are not separated and a combination of these components is shown as a joint body (reaction electrode layer) 125.

As shown in FIG. 18, separators 130a, 130b are formed with ribs 132a, 132b respectively. Specifically, each rib 132a of the separator 130a and each rib 132b of the separator 130b, when these separators 130a, 130b are incorporated into a fuel cell as a material forming a unit cell, are formed such that respective centers 133a, 133b of ends of these ribs 132a, 132b facing each other are deviated from each other and about one-fourth the respective surfaces of the ribs 132a, 132b overlap each other when viewed from the direction of the arrow A (a direction perpendicular to a rib-forming surface 131).

Figure 19:
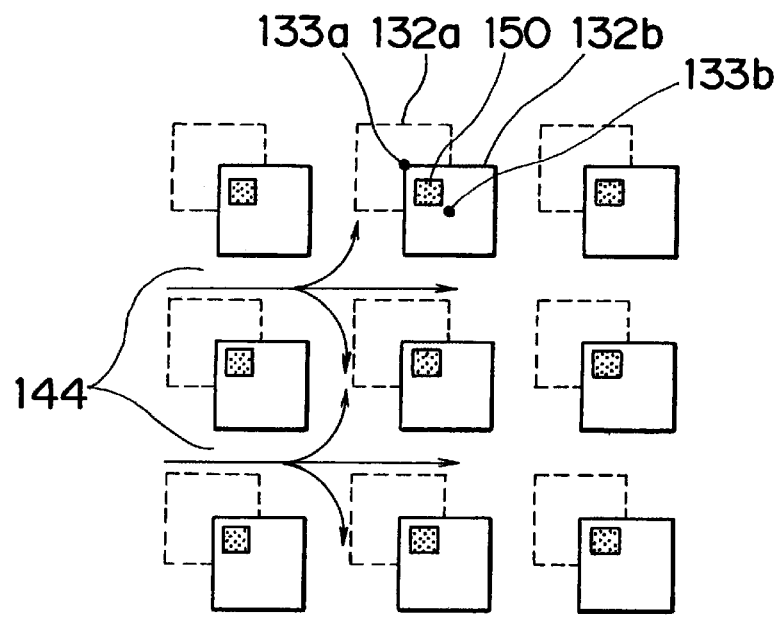
FIG. 19 is an explanatory view of the end of a rib in FIG. 18 when viewed from the direction of the arrow A.

FIG. 19 is an explanatory view when the ends of the ribs 132a, 132b are viewed from the direction of the arrow A. The ribs 132a, 132a facing each other are formed in such a manner whereby the end of the rib 132a overlaps the end of the rib 132b with a prescribed offset as shown in FIG. 18.

The surfaces of the ends of the ribs each have a square shape.

When the separators 130a, 130b are incorporated into the fuel cell, pressure due to force pushing the unit cell in the direction of the lamination is applied to the separators 130a, 130b in the direction of the non relief arrow whereby the separators 130a, 132b hold the reaction electrode layer 125 by the end of each of the ribs 132a, 132b. At this time, the direction of the pressure applied to the separators 130a, 130b coincides with the direction of the arrow A (specifically, a direction perpendicular to the rib-forming surface 131).

At this time, as shown in FIGS. 18, 19, the entire surface of the end of each of the ribs 132a, 132b is in contact with the reaction electrode layer 125. However, the ribs 132a, 132b facing each other are formed so that only about one-fourth the opposite surfaces overlap each other (a direction perpendicular to a rib-forming surface 131). Hence the pressure applied to the reaction electrode layer from both sides by the ribs 132a, 132b is not applied to the entirety of the part (specifically, the part corresponding to the entirety of the end surfaces of the ribs 132a, 132b) at which the reaction electrode layer is in contact with the end surfaces of the ribs 132a, 132b, but to only the part corresponding to the overlapped portion.

In the reaction electrode layer 125, among the aforementioned contact part, pressure is applied to the part corresponding to the overlapped portion from both sides. The corresponding part is made into a crushed form and the permeability of gas at the corresponding part is thereby significantly reduced. Therefore, oxidizing gas and fuel gas from an oxidizing gas passage 142 and a fuel gas passage 144 respectively are not diffused to a part 150 shown by the scattered dots and the part 150 resultantly becomes an unreacted part in which no electrochemical reaction takes place. However, among the aforementioned contact part, a part other than the part corresponding to the overlapped portion receives no pressure from the ribs 132a, 132b. Because of this, the permeability of gas at the part other than the part corresponding to the overlapped portion is not damaged and a sufficient electrochemical reaction takes place at this part.

As is clear from FIG. 19, the area of the part corresponding to the overlapped portion is smaller than the contact portion and the area of the unreacted part 50 is also smaller than the corresponding portion corresponding to the overlapped portion. According to this embodiment, therefore, even if each area of the end surfaces of the ribs 132a, 132b is not made small, the area of the unreacted part 150 can be sufficiently made small. The amount of an electrochemical reaction which can be caused in the reaction electrode layer 125 can be increased by an amount corresponding to a decrease in the area of the unreacted part and the amount of the power which can be produced in the entire reaction electrode layer can be thereby increased. In the case where such separators 130a, 130b are incorporated into the fuel cell, the amount of the power which can be produced in the entire fuel cell can be increased. Even if a load applied to the fuel cell is made larger to some extents, output voltage does not rapidly drop.

Figure 20:
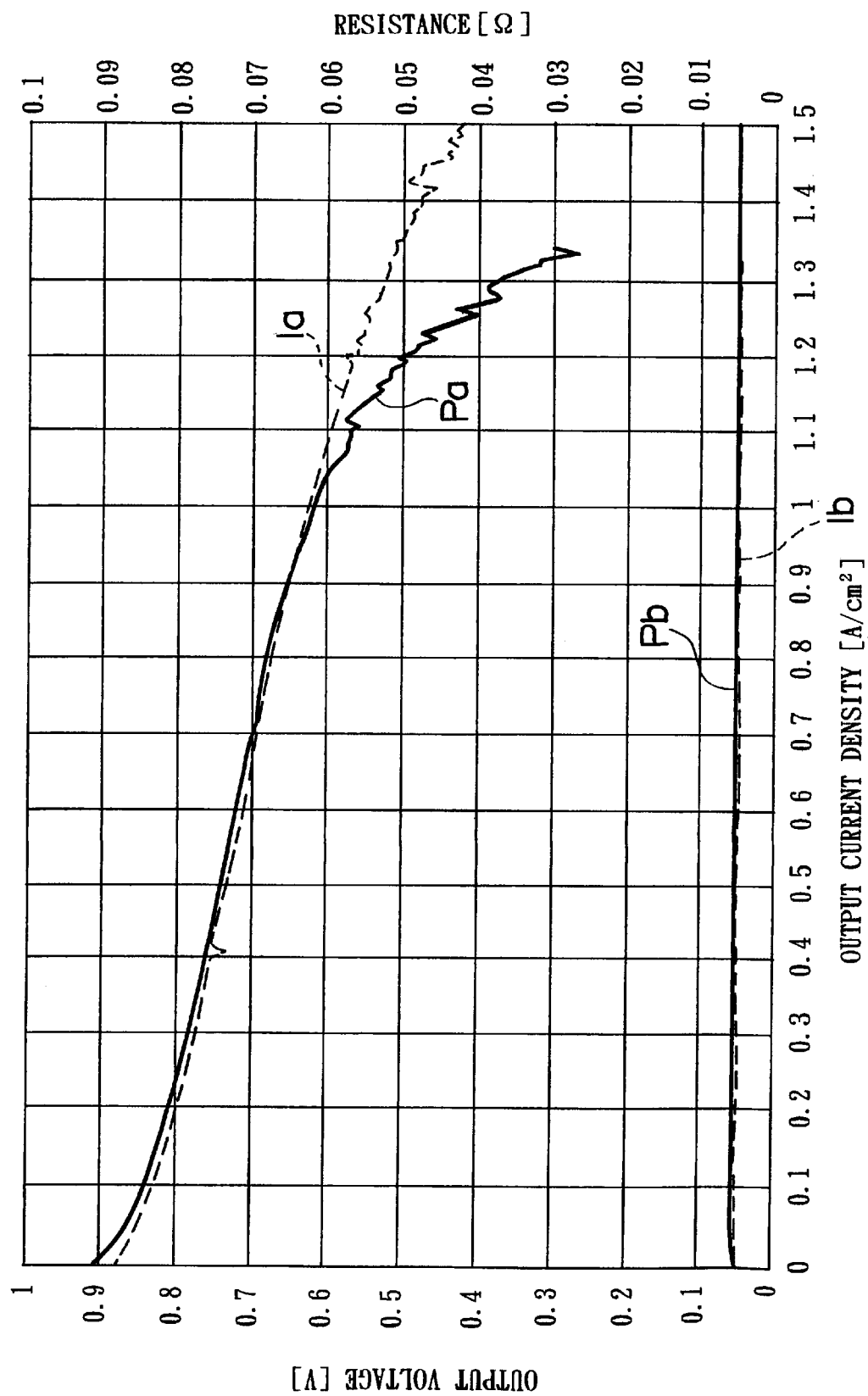
FIG. 20 is a graph for comparison with respect to the output voltage characteristic and resistance characteristic of a fuel cell as a function of output current density.

FIG. 20 is a graph comparing the case where the separator of this embodiment is incorporated into a fuel cell with the case where a separator with no offset (all surfaces of the ribs facing each other overlap each other) is incorporated into a fuel cell) with respect to the output voltage characteristic and resistance characteristic of a fuel cell as a function of output current density. In FIG. 20, Ia and Ib shown by the dotted line are the output voltage characteristic and resistance characteristic as a function of output current density when the separator of this embodiment is incorporated into a fuel cell. Pa and Pb shown by the solid line are the output voltage characteristic and resistance characteristic as a function of output current density when the separator with no offset is incorporated into a fuel cell.

In FIG. 20, as is clear from a comparison between the output voltage characteristics Ia, Ib, when a load applied to the fuel cell is large and the output current density of the fuel cell is high, output voltage rapidly drops (characteristic Pa) in the fuel cell into which the separator with no offset is incorporated. On the other hand, output voltage does not rapidly drop in the fuel cell into which the separator of this embodiment is incorporated, even if a load is made large to some extents (characteristic Ia).

Methods in which the area of the end surface of each rib is made small have been proposed to reduce the area of an unreacted region. However, if a contact area between the reaction electrode layer and the end surface of the rib is small, contact resistance in the contact portion increases. Because of this, the amount of current flowing through the reaction electrode layer and the separator is reduced. This sometimes prevents the generation of an electrochemical reaction. In this embodiment, as aforementioned, when the reaction electrode layer 125 is held between the ends of the ribs 132a, 132b, each end surface of the ribs 132a, 132b is contact with the reaction electrode layer on its entire surface. Hence a sufficient contact area is secured and unlike the case where the area of the end surface of each rib is made small, the contact resistance of the contact portion never increases.

When the separators 130a, 130b are incorporated into the fuel cell, the resistance of the fuel cell is almost constant irrespective of the output current density as shown by the resistance characteristic Ib shown in FIG. 20. Also, the resistance can be designed to be the same as that of the fuel cell into which the separator with no offset is incorporated as is clear from a comparison with the resistance characteristic shown in FIG. 20.

Moreover, an idea of increasing the number of ribs per unit area is proposed to prevent a reduction in the amount of current which is caused by an increased resistance of the contact portion. However, in order to manufacture such a separator actually considerably high processing accuracy is required. Supposing such a separator can be made, high accuracy of alignment is required when it is incorporated into the fuel cell. As aforementioned, in this embodiment, the contact resistance of the contact part is not enlarged, the amount of current flowing through the reaction electrode layer 125 and the separators 130a, 130b is not reduced such that a sufficient electrochemical reaction can be caused. It is therefore unnecessary to increase the number of ribs per unit area which is formed on the rib-forming surface 131.

In this embodiment, since it is unnecessary to decrease the area of the end surface of each of the ribs 132a, 132b and to increase the number of ribs per unit area in the rib-forming surface 131, high accuracy is not required in the production of the separators 130a, 130b. Thus the production step can be simplified and the production cost can be restrained.

Meanwhile, as aforementioned, the ribs 132a, 132b facing each other are formed such that one-fourth of each end surface overlap each other. In this embodiment, the area of the overlapped portion is determined in consideration of the strength of the reaction electrode layer 125, pressure applied in the direction of the lamination of the unit cell and the area of the end surface of each rib. If the area of the overlapped portion is reduced, the area of the unreacted part 150 can be reduced. However, as mentioned above, because pressure is applied to the reaction electrode portion at only the part corresponding to the overlapped portion. If the area of the overlapped portion is made too small, the pressure applied to the part corresponding to the overlapped portion is made large, thereby causing the reaction electrode layer to be broken. Therefore the area of the overlapped portion must be designed to secure a size such that the reaction electrode layer is not broken by the applied pressure. These points are also the same as in the following seventh and eighth embodiments.

Figure 25A:
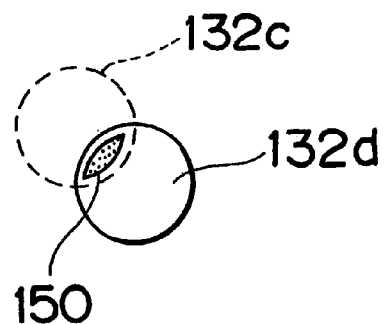
FIGS. 25A and 25B are explanatory views showing another embodiment of the rib of the sixth embodiment of the present invention.

In the above embodiment, though the end of the rib has a square shape, it may have a circular shape as shown in FIG. 25A. In this case, ribs are formed so that each center of the ends of the ribs is deviated like the above when viewed from the direction of the arrow A (a direction perpendicular to the rib-forming surface) shown in FIG. 18 and the parts of the end surfaces of the ribs overlap each other.

Even if the end of the rib is formed into a circular shape instead of square shape in this manner, the same effect as in the seventh embodiment can be obtained if the end surfaces are designed to overlap each other. The shape of the end surface of the rib is not limited to a rectangle and circle and any one of various shapes such as a triangular, rectangular, elliptic, or polygonal shape may be used.

Figure 25B:
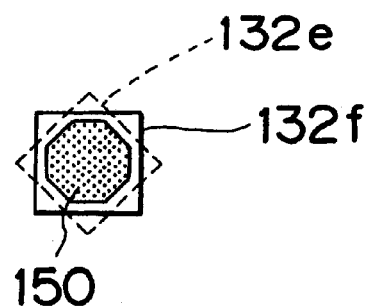

As shown in FIG. 25B, the centers of ribs 132e, 132f facing each other coincide with each other when viewed from the direction of the arrow A (a direction perpendicular to the rib-forming surface) shown in FIG. 18. In this case, the ribs may be formed so that the end faces cross each other at about 45 degrees.

Even if the centers of ribs 132e, 132f facing each other coincide with each other when viewed from the direction of the arrow A, only parts of the end surfaces overlap by crossing the end surfaces of the ribs with each other. The part corresponding to the overlapped portion is smaller than the contact area with each of the ribs 132e, 132f in the reaction electrode layer. Hence the area of the unreacted part 150 can be reduced. Thus this structure has the same effect as in the eighth embodiment. Incidentally, in the present invention, only the parts of the ends of the ribs 132e, 132f may overlap and the angle at which both end surfaces cross each other may be optional.

Figure 21:
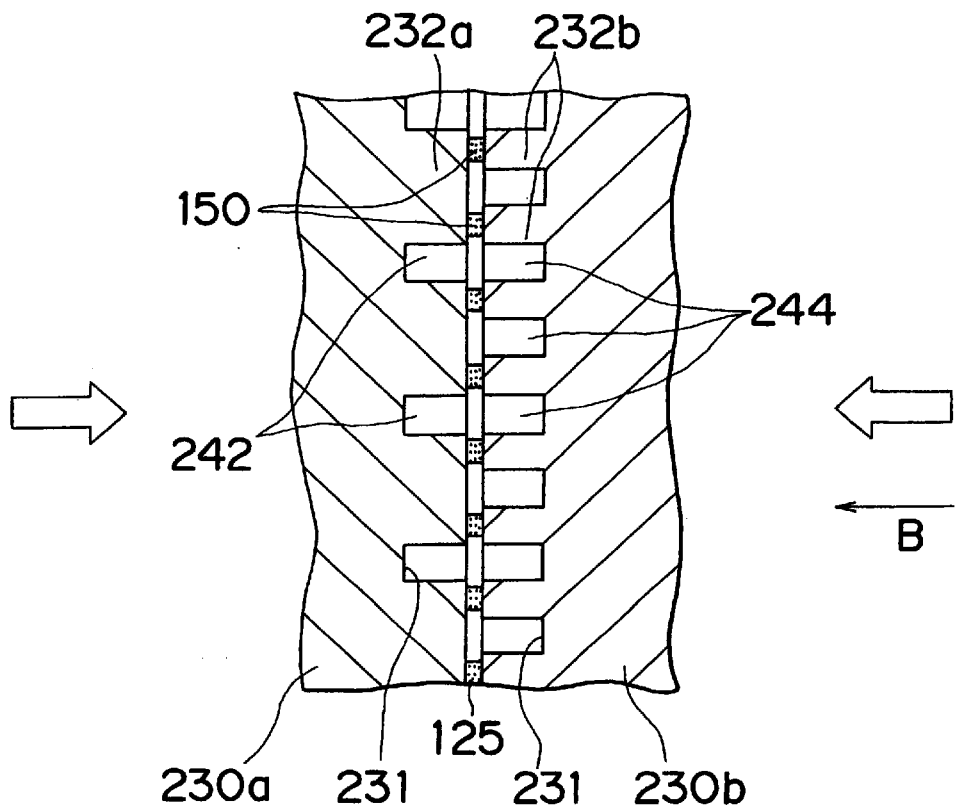
FIG. 21 is a sectional view typically showing the state where a gas separator of a seventh embodiment of the present invention sandwiches a joint body.
Figure 22:
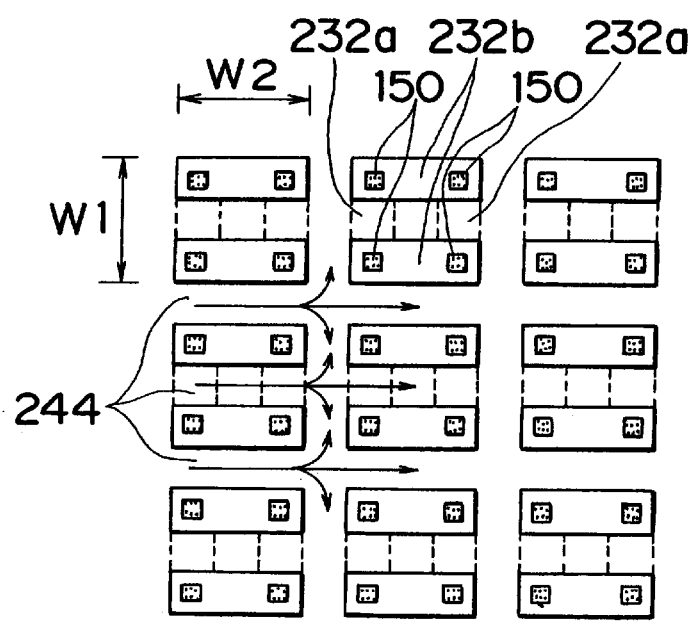
FIG. 22 is an explanatory view of the end of a rib in FIG. 21 when viewed from the direction of the arrow B.

FIG. 21 is a sectional view typically showing the condition in which a reaction electrode layer 125 is held by a separator corresponding to a ninth embodiment of the present invention and FIG. 22 is an explanatory view showing the end of a rib shown in FIG. 21 when viewed from the direction of the arrow B.

Separators 230a, 230b of this embodiment are formed with ribs 232a, 232b respectively as shown in FIGS. 21 and 22. Each rib 232a of the separator 230a and each rib 232b of the separator 230b are provided with end surfaces having a rectangular shape (strip-like shape) and are regularly arranged in lateral and longitudinal directions. Each of the ribs 232a, 232b is disposed so that, as shown in FIG. 5, the distance W1 of the outside of adjacent ribs in a lateral direction is equal to the length W2 of the long side of the end surface of the rib.

Moreover, each of the ribs 232a, 232b are, when the separators 230a, 230b is incorporated into the fuel cell as the material constituting the unit cell, formed so that, as shown in FIG. 21, the ends of a pair of ribs 232a which are adjacent to each other in a lateral direction on the separator 230a are disposed right in front of the ends of a pair of ribs 232b which are adjacent to each other in a lateral direction likewise on the separator 230b through the reaction electrode layer 125. Also, the pair of ribs 232a and the pair of the ribs 232b which face each other are formed such that the end surfaces of the pair of ribs 232a and the end surfaces of the pair of ribs 232b are seen to be perpendicular to each other when viewed from the direction of the arrow B (a direction perpendicular to the rib-forming surface 231). Specifically, as for one end surface, this one end surface is seen to overlap other two end surfaces (the end surfaces of a pair of ribs of the opposite side) of the opposite side in a range of one-third thereof)

When the separators 230a, 230b having such a structure are incorporated into the fuel cell, each rib 232a of the separator 230a constitutes an oxidizing gas passage 242 for supplying oxidizing gas to an anode (not shown) in the reaction electrode layer 125 and each rib 232b of the separator 230b constitutes an fuel gas passage 244 for supplying fuel gas to an anode (not shown) in the reaction electrode layer 125.

When the separator 230a, 230b are incorporated into the fuel cell, as shown in FIG. 21, pressure is applied to the separators 230a, 230b in the direction of the non-relief arrow, whereby the separators 230a, 230b hold the reaction electrode layer 125 between the ends of each of the ribs 232a, 232b. The direction in which pressure is applied coincides with the direction of the arrow B (a direction perpendicular to the rib-forming surface 231). At this time, the end surfaces of each of the ribs 232a, 232b are respectively in contact with the reaction electrode layer 125 on its whole surface.

As aforementioned, the pair of ribs 232a and the pair of ribs 232b, both opposite pairs, are disposed such that only about one-third of the area of each end surface overlaps with two other end surfaces of the opposite side when viewed from the direction of the arrow B. Therefore pressure applied to the reaction electrode layer 125 by the ribs 232a, 232b is not applied to the entire portion at which the reaction electrode layer 125 is in contact with the respective ends of the ribs 232a, 232b, but to only the part corresponding to the overlapped portion. Hence in the reaction electrode 125, a part 150 in the inside of the part corresponding to the overlapped portion becomes an unreacted part in which no electrochemical reaction takes place because it is reduced in the gas permeability whereby oxidizing gas and fuel gas from the oxidizing gas passage 242 and fuel gas passage 244 respectively are not diffused. However, because among the aforementioned contact part, a part other than the part corresponding to the overlapped portion receives no pressure from the ribs 232a, 232b, the permeability is not damaged and a sufficient electrochemical reaction can take place.

In this manner, according to this embodiment, as shown in FIG. 22, the pair of ribs 232a and the pair of ribs 232b which both opposite pairs, are formed such that the end surfaces cross with each other at a right angle and are seen to form a parallel cross-like pattern. This ensures that even if each area of the end surfaces of the ribs 232a, 232b is not made small, the area of the unreacted part 150 can be sufficiently made small. The amount of an electrochemical reaction which can be caused in the reaction electrode layer 125 can be increased by an amount corresponding to a decrease in the area of the unreacted part and hence the amount of the power which can be produced in the entire reaction electrode layer can be increased.

In this embodiment, also because it is not necessary to reduce each area of the end surfaces of the ribs 232a, 232b and the entire surface of each end surface of the ribs 232a, 232b are in contact with the reaction electrode layer 125, the area of the contact portion is sufficiently secured. For this, the contact resistance of the contact portion does not increase and hence it is not necessary to increase the number of ribs per unit area which are formed on the rib-forming surface 231.

In the present embodiment, there are no necessities of a reduction in the area of each end surface of the ribs 232a, 232b and of an in crease in the number of ribs per unit area. High processing accuracy is not hence required when producing the separator 230a, 230b in practice.

Figure 26A:
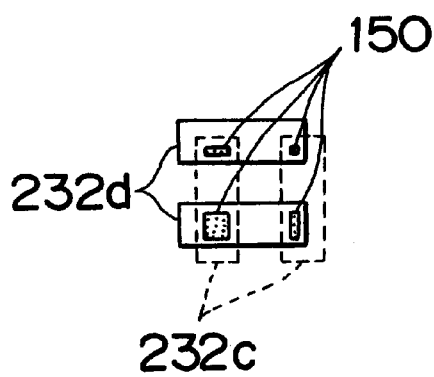
FIGS. 26A and 26B are explanatory views showing another embodiment of the rib of the seventh embodiment of the present invention.

As shown in FIG. 26A, the end surfaces of the ribs 232C, 232d facing each other may be formed so that they cross with each other at a right angle when viewed from the direction of the arrow B (a direction perpendicular to the rib-forming surface) and an offset is present between the former end surface and the latter end surface (specifically, so that the center of the former two end surfaces deviates from the center of the latter two end surfaces).

Such a retention of an offset contributes to a reduction in the area of the part corresponding to the overlapped portion in the reaction electrode layer resulting in a further reduced area of the unreacted part 150.

Figure 26B:
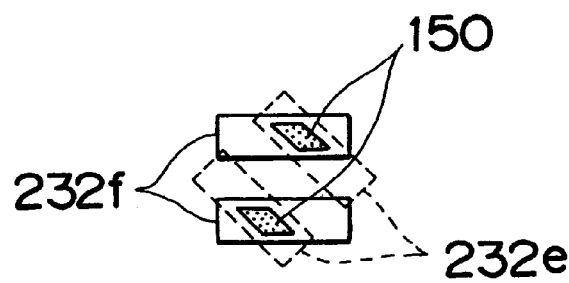

As shown in FIG. 26B, the end surfaces of each of pairs of ribs 232e, 232f facing each other may be formed so that both pairs cross with each other not at a right angle but at about 45 degrees when viewed from the direction of the arrow B (a direction perpendicular to the rib-forming surface).

In such a manner, even if the end surface of the pair of ribs 232e and the end surface of other pairs of ribs 232f are allowed to cross each other at about 45 degrees, the area of the part corresponding to the overlapped portion is smaller than the contact areas with each ribs 232e, 232f in the reaction electrode layer. The area of the unreacted part 150 can be reduced and the same effect as in the ninth embodiment can be obtained. In this case, also the angle at which the end surfaces of the pair of ribs 232e and the end surfaces of the pair of ribs 232d cross each other may be optional if only the parts of the former end surfaces and the latter end surfaces overlap.

Moreover, among pairs of ribs 232g and ribs 232h facing each other, the end surface of only one of the pair of ribs and the end surface of only one of another pair of ribs may be designed to cross each other at a right angle. Among the pair of ribs 232g and another pair of ribs 232h, each end surface of the remainder ribs does not overlap any end surface. Pressure applied to the reaction electrode layer is therefore is applied only by the ribs 232g, 232h whose end surfaces cross each other at a right angle but not by the ribs 232g, 232h whose end surfaces do not overlap each other. To state it differently, the ribs 232g, 232h of the sides whose end surfaces do not cross are only in contact with the reaction electrode layer.

In such a structure in which only the end surface of one rib among the pair of ribs 232g and only the end surface of one rib among the pair of ribs 232h are allowed to cross with each other, the part corresponding to the overlapped portion in the reaction electrode layer is further reduced thereby making the area of the unreacted part 150 smaller.

Figure 26C:
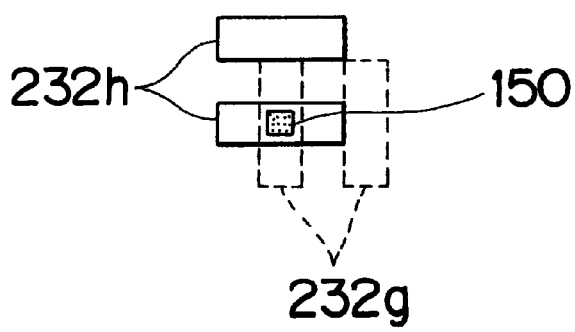

As is clear from a comparison of FIG. 26C with FIG. 22, in this case, the area of the part corresponding to the overlapped portion is reduced to about one-fourth that of the ninth embodiment and on the contrary the pressure applied to the reaction electrode layer is increased to four times that of the ninth embodiment. The reaction electrode layer therefore must possess the strength capable of withstanding such a pressure.

Next, an eighth embodiment of the present invention will be explained.

Figure 23:
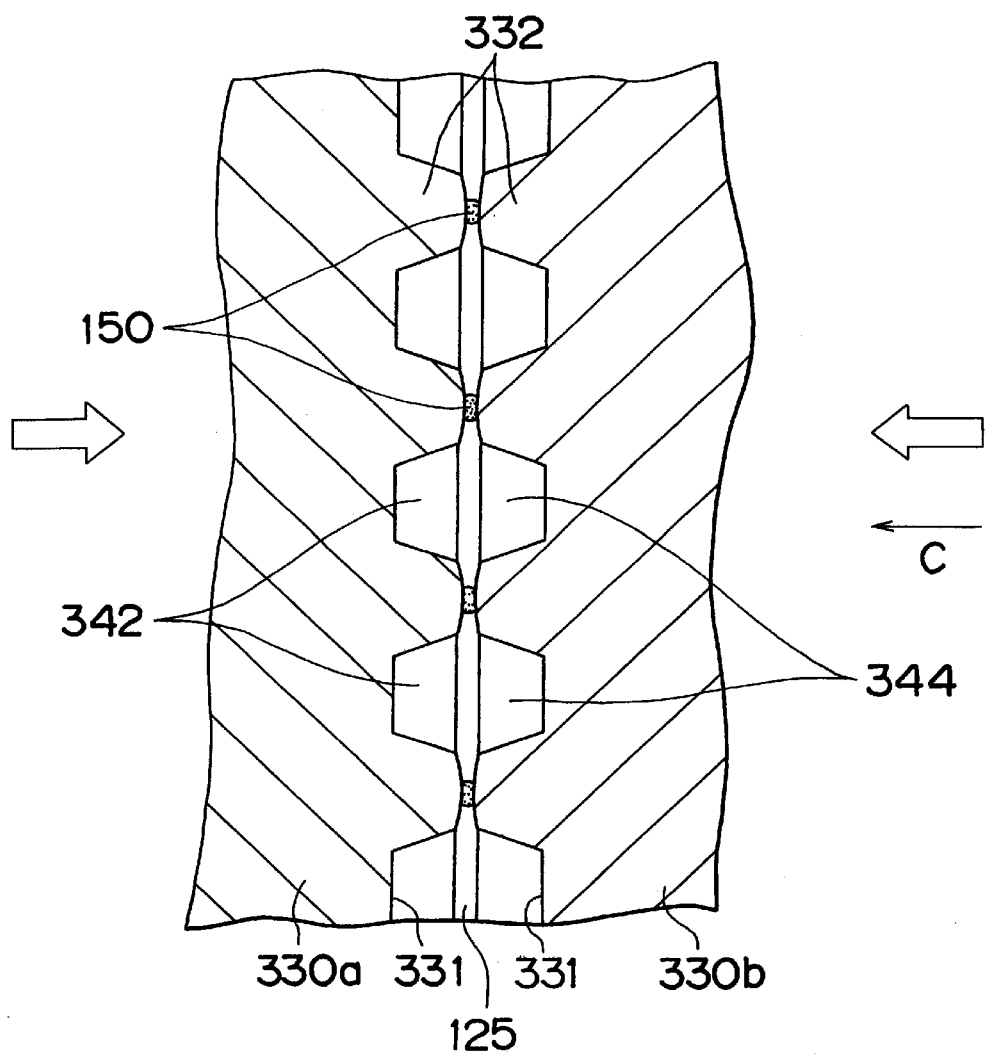
FIG. 23 is a sectional view typically showing the state where a gas separator of an eighth embodiment of the present invention sandwiches a joint body.
Figure 24:
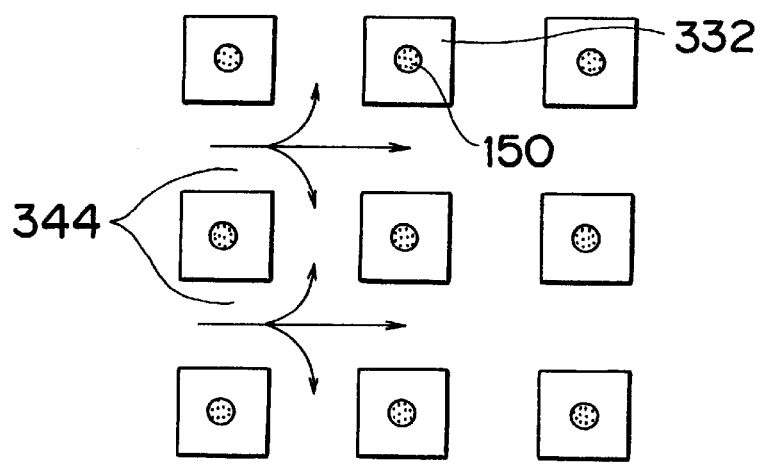
FIG. 24 is an explanatory view of the end of a rib in FIG. 23 when viewed from the direction of the arrow C.

FIG. 23 is a sectional view typically showing the condition that a reaction electrode layer 125 is held by a separator of the eighth embodiment and FIG. 24 is an explanatory view showing the end portion of a rib when viewed from the direction of the arrow C.

In separators 330a, 330b of this embodiment, the respective end of each rib 332 has a projecting spherical form as shown in FIG. 23. The shape of each rib which is viewed from the direction of the arrow C (a direction perpendicular to the rib-forming surface 331) is however square as shown in FIG. 24.

Each rib 332 of the separators 330a, 330b, when these separators are arranged in the fuel cell as a material constituting a unit cell, is formed such that, as shown in FIGS. 23 and 24, the end of each rib 332 of the separator 330a is disposed right in front of and at the same position (at almost the same position when viewed from the direction of the arrow C) as the end of each rib 332 of the separator 330b.

When the separators 330a, 330b structured in the above manner are arranged in the fuel cell, each rib 332 of the separator 330a forms an oxidizing gas passage 342 supplying oxidizing gas to a cathode (not shown) in the reaction electrode layer 125 and each rib 332 of the separator 330b forms a fuel gas passage 344 supplying fuel gas to an anode (not shown) in the reaction electrode layer 125.

Also when the separators 330a, 330b are incorporated into the fuel cell, as shown in FIG. 7, pressure is applied to the separators 330a, 330b in the direction of the non relief arrow whereby the separators 330a, 330b hold the reaction electrode layer 125 by the ends of each rib 332. The direction of the applied pressure coincides with the direction of the arrow C (a direction perpendicular to the rib-forming surface 331).

At this time, as shown in FIG. 6, all of the end surface of each rib 332 are in contact with the reaction electrode layer 125 on the whole surface of them. However, as stated above, the end of each rib 332 has a projecting spherical form and the ribs 332 facing each other are disposed right in front of each other and at almost the same position when viewed from the direction of the arrow C. So the pressure applied to the reaction electrode layer 125 by the rib 332 is not uniformly applied to the entire portion which is in contact with the end surface of the rib 332 but intensively to the part which is in contact with center of the end surface (that is, the top end section of the projecting sphere). In the reaction electrode layer 125, since the center contact portion is made into a crushed form and reduced in the gas permeability so that oxidizing gas and fuel gas from an oxidizing gas passage 342 and a fuel gas passage 344 respectively are not diffused, it is made into a unreacted part 150 in which no electrochemical reaction takes place. On the other hand, the pressure from the rib 332 is not so applied to a part other than the center contact portion among the contact portion which is in contact with the rib 332. Hence the gas permeability is not so damaged and an electrochemical reaction can take place.

As is clear from FIG. 24, the area of the unreacted part 150 can be considerably reduced in contrast to all area of the contact portion with the end surface of the rib 332. Accordingly, in this embodiment, even if the end surface of the rib 332 is not made small, the area of the unreacted portion can be reduced sufficiently. Therefore, the amount of an electrochemical reaction which can be caused in the reaction electrode layer 125 can be increased by an amount corresponding to a decrease in the area of the unreacted part and the amount of the power which can be produced in the entire reaction electrode layer 125 can be thereby increased.

In this embodiment, also it is not necessary to make the area of the end surface small and the whole end surfaces (sphere) of each rib 332 are in contact with the reaction electrode layer when the reaction electrode layer 125 is held by the ends of the rib 332. This results in security of a sufficient area of the contact portion. The contact resistance of the contact part is not made large. It is therefore unnecessary to increase the number of ribs per unit area which are formed on the rib-forming surface 231.

In this embodiment, as stated above, unlike the above related art technologies, there are no necessities of a reduction in the area of each end surface of the ribs and of an increase in the number of ribs per unit area on the rib-forming surface 331 only by designing the end surface of each rib 332 to have a projecting sphere shape. So high processing accuracy is not hence required when producing the separator 330a, 330b in practice.

In this embodiment, the radius of curvature of the projecting sphere formed on the end surface of each rib 322 is set in consideration of the strength of the reaction electrode layer 125, the pushed pressure applied in the direction of the lamination of the unit cells and the area of the end surface of each rib.

In this embodiment, though the shape of the end surface of each rib is a projecting sphere, the present invention is not limited to this shape and any aspheric surface may be acceptable insofar as it has a projecting form.

Next, a ninth embodiment of the present invention will be explained. A fuel cell of the ninth embodiment is the same type as in the first embodiment, but in detail a pattern of variation in the gas flow amount in an oxygen-containing gas passage is altered to a desired pattern by changing the design specification of the fuel cell. On that premise, special characteristics are imparted to the shape of the oxygen-containing gas passage corresponding to a variation in the gas flow amount in the oxygen-containing gas.

Figure 27A:
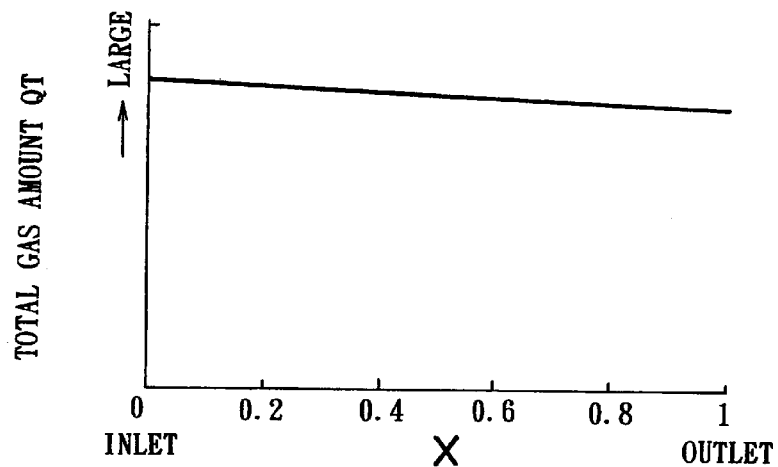
FIGS. 27A–27C are an explanatory view showing variation in the total gas amount at positions from the inlet to outlet of an oxygen gas passage.
Figure 27B:
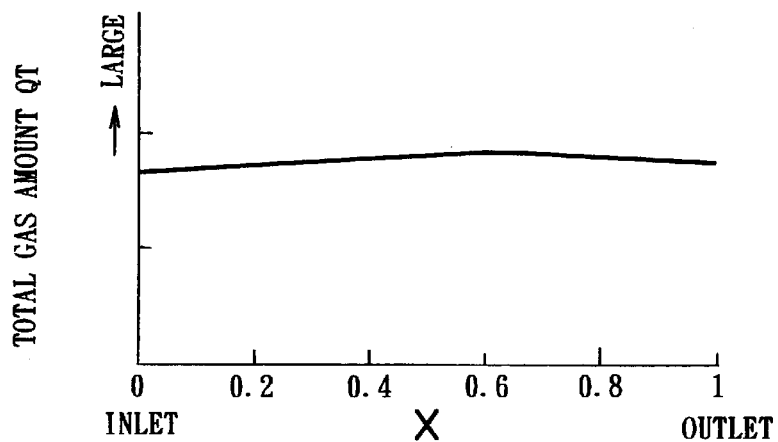
Figure 27C:
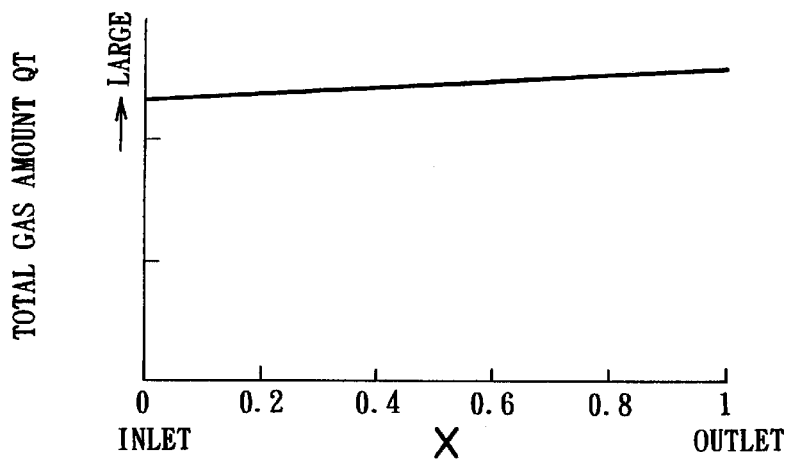

First, in fuel cells, available patterns of a variation in the gas flow amount in the oxygen-containing gas will be explained. The gas flow amount in the oxygen-containing gas means the amount of total gas (hereinafter called a "total gas amount") consisting of oxygen-containing gas and vapor created in the side of the cathode 23 at each position on the way from the inlet to outlet of the oxygen gas-containing passage. There are the following three patterns of a variation as shown in FIGS. 27A to 27C:

(A) a pattern in which the total gas amount decreases monotonously from the inlet to outlet of the gas passage as shown in FIG. 27A;

(B) a pattern in which the total gas amount shows a maximal at any position on the way from the inlet and the outlet. Specifically, the total gas amount changes sequentially such that it increases, reach a maximal and decreases as shown in FIG. 27B; and (C) a pattern in which the total gas amount increases monotonously from the inlet to outlet of the gas passage as shown in FIG. 27C.

Which pattern among these patterns of a variation shown by the foregoing (A) to (C) be applicable is determined depending on the design specification of a fuel cell. Then the parameters determining the pattern of a variation will be explained.

When an optional position is represented by a parameter x ($0 \leq x \leq 1$) provided that the inlet of the side of the cathode and the outlet of gas are represented by 0 and 1 respectively, the air flow amount QA(x) at a position x, the amount of humidification water (the amount of water contained in oxygen-containing gas at the inlet of the cathode), the amount of created water at positions 0 to x and the saturation amount WS(x) of vapor are represented by the following formulae respectively:

$$QA(x) = \frac{I \times A}{9.648 \times 10^4} \times \frac{R \times (273 + T)}{P_0} \times \frac{5}{4} \times E - \quad (4)$$
$$\frac{I \times A}{9.648 \times 10^4} \times \frac{R \times (273 + T)}{P_0} \times \frac{1}{4} \times x$$
$$= \frac{I \times A}{9.648 \times 10^4} \times \frac{R \times (273 + T)}{P_0} \times \frac{5}{4} \times (E - x) \quad (L/\sec)$$

$$WH = QA(0) \times \frac{PH \times \frac{H}{100}}{760 P_0 - PH \times \frac{H}{100}} \quad (L/\sec) \quad (5)$$

$$WG(x) = x \times \frac{I \times A}{9.648 \times 10^4} \times \frac{R \times (273 + T)}{P_0} \times \frac{1}{2} \quad (L/\sec) \quad (6)$$

$$WS(x) = QA(x) \times \frac{PV}{760 P_0 - PV} \quad (L/\sec) \quad (7)$$

wherein

I: current density (A/cm$^2$);

A: electrode area (cm$^2$);

E: excessive air ratio (magnification);

T: cell temperature (° C.);

PV: vapor pressure at a cell temperature T (mmHg)

P$_0$: working pressure (atm) at a cathode;

pH: saturation vapor pressure at the temperature TH of a humidification unit (mmHg);

H: relative humidity at the outlet of a humidification unit (%); and

R: gas constant (atm•L•mol$^{-1}$•deg$^{-1}$)

Here, considering the amount of water at a position x, when the total of the amount WH of humidification water and the amount WG(x) of created water does not exceed the saturation amount WS(x) of vapor, namely, WH+WG(x) <WS(x), the amount of vapor at a position x is WH+WG(x) and the total gas amount QT(x) is represented by the following formula (8):

$$QT(x)=QA(x)+WH+WG(x) \quad (8)$$

On the other hand, when the total of the amount WH of humidification water and the amount WG (x) of created water at a position x is larger and including the saturation amount WS(x) of vapor, namely, WH+WG(x)≧WS(x), the amount of vapor at a position x is WG(x) and the total gas amount QT(x) is represented by the following formula:

$$QT(x)=QA(x)+WS(x) \quad (9)$$

According to the formulae (8) and (9), when the total of the amount WH of humidification water and the amount WG(x) of created water reach the saturation amount WS(x) of vapor, the amount of water among the total gas amount QT(x) is limited to a maximal value. Specifically, the following is understood:

(i) when oxygen-containing gas containing water in an amount corresponding to saturation amount of vapor is supplied to the cathode, specifically, when x=0 and WH+WG(x)≦WS(x), the air flow amount QA(x) is consumed along the surface of the cathode electrode, showing that the total gas amount QT(x) in the cathode decreases monotonously from the inlet to the outlet. This corresponds to the aforementioned condition (A) as shown in FIG. 27A;

(ii) when vapor contained in oxygen-containing gas reaches the saturation amount of vapor, specifically, when, in a range of x: 0<x<1, xa satisfying WH+WG(x)=WS(x) is present, the total gas amount QT(x) increases monotonously until x reaches xa by a difference in amount between the amount WG(x) of created water on the surface of the cathode electrode and the amount consumed of the air flow amount QA(x), reaches a maximal at xa and decreases monotonously in a range of x exceeding xa because the amount of created water WG(x) at the cathode is affected by the amount consumed of the air flow amount QA(x). This corresponds to the aforementioned condition (B) as shown in FIG. 27B;

(iii) when the amount of vapor reaches the saturation amount of water, specifically, when x=1 and WH+WG(x)<WS(x), the gas amount decreases by a difference between the amount WG(x) of created water on the surface of the cathode electrode and the amount consumed of the air flow amount QA(x) and the total gas amount QT(x) in the cathode increases monotonously from the inlet to the outlet. This corresponds to the aforementioned condition (C) as shown in FIG. 27C.

In the fuel cell of this embodiment, the control parameters of a humidification unit, though not shown, which determines the amount WH of humidification water, parameters such as current density which determines the amount WG(x) of created water, and the like are defined in advance in a design stage whereby the total gas amount QT(x) of oxygen-containing gas and vapor contained in the oxygen-containing gas in the oxygen-containing gas passage varies according to the condition (B). On that premise, a separator arranged in the fuel cell is structured as follows.

Figure 28:
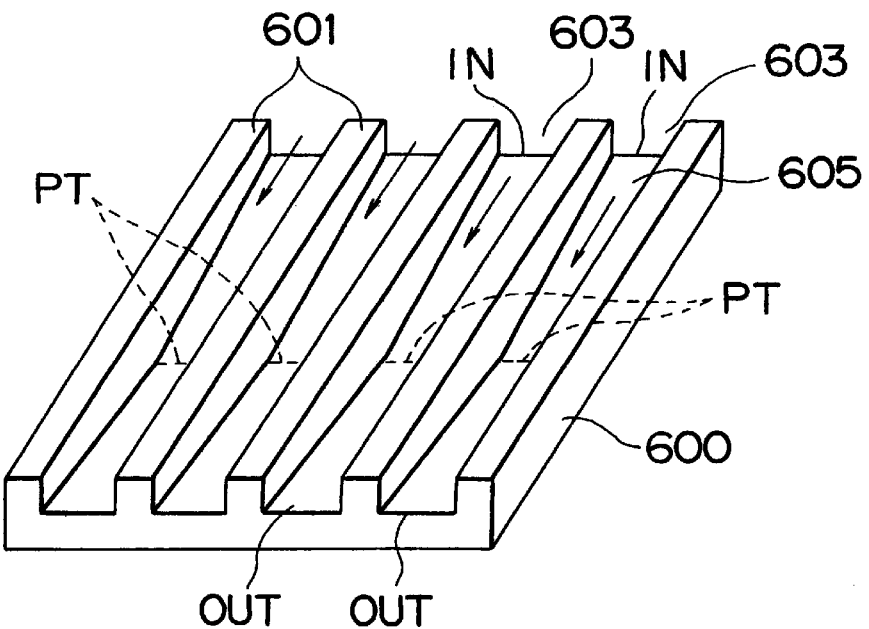
FIG. 28 is a schematic structural view of a separator used in a ninth embodiment of the present invention.

FIG. 28 is an explanatory view showing a typical structure of a separator 600 comprised of a fuel cell of this embodiment. As shown in the figure, a linear rib array 601 is formed in plural and at an equal pitch on the surface of the separator 600. An oxygen-containing gas passage 603 is thus formed.

A passage bottom 605 of the oxygen-containing gas passage 603 is not flat but, along the direction of flow of gas (the direction of the arrow in the figure), descends from an inlet IN and ascends from a position which is away at a prescribed distance from the inlet and reaches the outlet OUT. To state it differently, in the oxygen-containing gas passage 603, its depth increases monotonously along the direction of flow of gas from the inlet IN, reaches the deepest part PT at the position which is away at a prescribed distance from the inlet IN, decreases from the part PT to the outlet OUT. The deepest part PT corresponds to the position at which the total gas amount QT(x) reaches a maximal in the oxygen-containing gas passage 603. The shape of the passage including its deepest position and the deepest part PT corresponds to the variation curve of the total gas amount QT(x) as shown in FIG. 27B explained above. Specifically, the oxygen-containing gas passage 603 is designed to have such a shape that the sectional area of the passage determined by the rib array 601 and the passage bottom 605 is proportional to the variation curve of the total gas amount QT(x).

In FIG. 28, only the oxygen-containing gas passage in the separator 600 is shown and an inlet and an outlet for oxygen-containing gas, fuel gas and cooling water as well as fuel gas passage formed on the backface are not shown in the figure.

As stated above in detail, the fuel cell of this embodiment is designed so that the total gas amount QT(x) is made maximal on the way of the oxygen-containing gas passage and, on that premise, the sectional area of the passage is varied in proportion to the total gas amount QT(x) by varying the depth of the oxygen-containing gas passage 603. The partial pressure of gas is thus uniform along the oxygen-containing gas passage.

In the fuel cell of this embodiment, an electrode reaction is activated on the entire cathode surface along the oxygen-containing gas passage 603 and, as a result, the performance of the cell can be improved.

Next, a tenth embodiment of the present invention will be explained.

Figure 29:
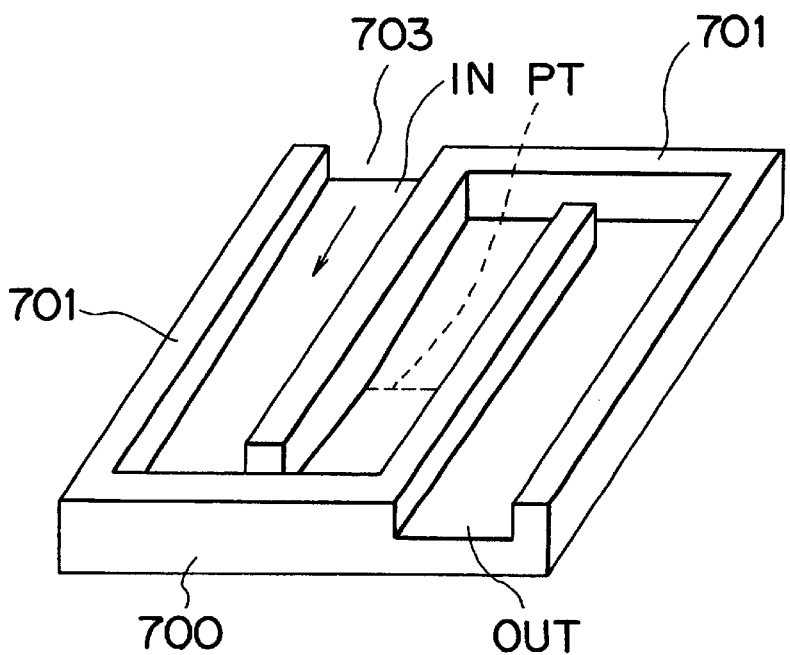
FIG. 29 is a schematic structural view of a separator used in a tenth embodiment of the present invention.

In the fuel cell of the ninth embodiment, a straight type oxygen-containing gas passage is adopted whereas, in this embodiment, a serpentine type oxygen-containing gas passage is adopted instead of the straight type. FIG. 29 is an explanatory view showing the schematic structure of a separator 700 arranged in a fuel cell of this embodiment. As shown in the figure, a key-like rib array 701 is formed in plural on the surface of the separator 700. An oxygen-containing gas passage 703 having a wavy form and a constant width is thus formed.

In the oxygen-containing gas passage 703, its depth increases monotonously along the direction of flow of gas (the direction of the arrow in the figure) from the inlet IN, reaches the deepest part PT at the position which is away at a prescribed distance from the inlet IN, decreases from the part PT to the outlet OUT. The shape of the passage including its deepest position and the deepest part PT corresponds to the variation curve of the total gas amount QT(x) as shown in FIG. 27B explained above. Specifically, it is designed to have such a shape that the sectional area of the passage determined by the rib array 701 and the passage bottom is proportional to the variation curve of the total gas amount QT(x). The structure other than the oxygen-containing gas passage is the same as in the ninth embodiment.

As stated above in detail, the fuel cell of this embodiment is designed so that the total gas amount QT(x) is made maximal on the way of the serpentine type oxygen-containing gas passage and, on that premise, the sectional area of the passage is varied in proportion to the total gas amount QT(x) by varying the depth of the oxygen-containing gas passage 703. The partial pressure of gas is thus uniform along the oxygen-containing gas passage.

In the fuel cell of this embodiment, like the ninth embodiment, an electrode reaction is activated on the entire cathode surface along the oxygen-containing gas passage 703 and, as a result, the performance of the cell can be improved.

Next, an eleventh embodiment of the present invention will be explained. A fuel cell of this embodiment differs from that of the tenth embodiment in the shape of the oxygen-containing gas passage and is the same in other structure. This embodiment has the structure in which, in the same serpentine type oxygen-containing gas passage, the sectional area of the passage is varied by changing the width of the passage.

Figure 30:
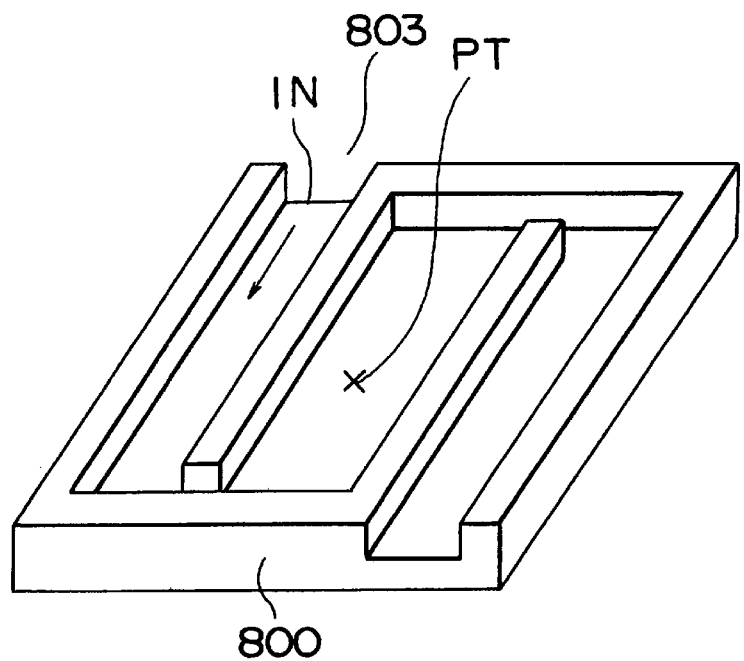
FIG. 30 is a schematic structural view of a separator used in an eleventh embodiment of the present invention.

FIG. 30 is an explanatory view showing the schematic structure of a separator 800 comprised of the fuel cell of this embodiment. As shown in the figure, an oxygen-containing gas passage 803 has a wavy form with a constant depth and is designed such that the passage has the widest width in a linear section including a part PT (at the position shown by the symbol "X" in the figure) which is away at a predetermined distance from an inlet IN and is made narrower in a linear section positioned at a more increased distance from the part PT. The fuel cell of this embodiment is structured so that the total gas amount QT(x) reaches a maximal on the way of the oxygen-containing gas passage. The position at which the total gas amount reaches a maximal corresponds to the part PT.

In this manner, the structure of this embodiment is designed so that the total gas amount QT(x) is made maximal on the way of the serpentine type oxygen-containing gas passage and, on that premise, the width of the passage reaches a maximum in a prescribed range of the passage including at least the position at which the total gas amount QT(x) reaches a maximal. Even if the total amount of oxygen-containing gas and vapor contained in the oxygen-containing gas reaches a maximal on the way of the oxygen-containing gas passage, the sectional area of the passage is made maximum corresponding to its total amount. The partial pressure of gas is therefore uniform along the oxygen-containing gas passage.

In the fuel cell of this embodiment, an electrode reaction is activated on the entire cathode surface along the oxygen-containing gas passage 803 and, as a result, the performance of the cell can be improved.

Incidentally, in this embodiment, the width of the passage is altered using each linear section of the serpentine type passage as a unit, but, instead of this structure, another structure may be used in which, like the depth of the passage in the tenth embodiment, the width of the passage gradually increases as the distance from the inlet IN increases, reaches a maximal at the part PT and then gradually decreases with an increase in the distance. In this structure, the width of the passage varies in proportion to a variation in the total gas amount QT (x). This ensures that the partial pressure in the oxygen-containing gas passage can be made more uniform.

A twelfth embodiment of the present invention will be explained.

Figure 31:
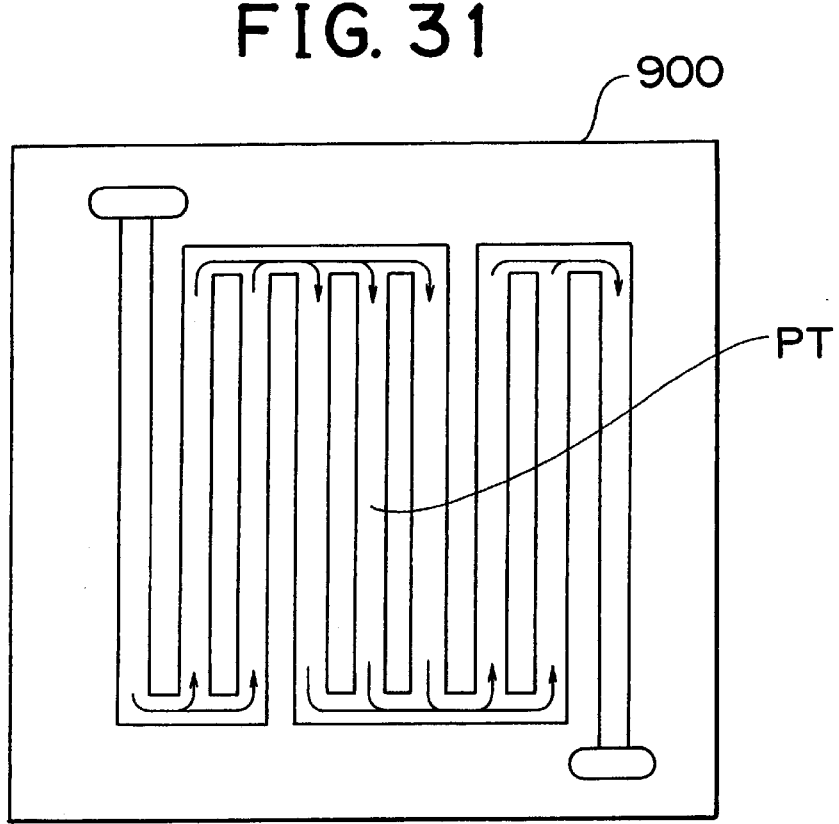
FIG. 31 is a plan view showing a schematic structure of a separator used in a twelfth embodiment of the present invention.

The eleventh embodiment is designed such that the width of the passage reaches a maximum at the part PT at which the total gas amount QT(x) reaches a maximal. On the other hand, in a separator 900 of this embodiment, the number of passages with a constant width (also with a constant depth) is a maximum (three passages in the figure) in a linear section including the part PT and more decreases in a linear section positioned at a more increased distance from the part PT (decreases to two passages and one passage in this order) as shown in FIG. 31.

In this embodiment, also an electrode reaction can be activated in the entire surface of the cathode along the oxygen-containing gas passage, which improves the performance of the cell.

Figure 32:
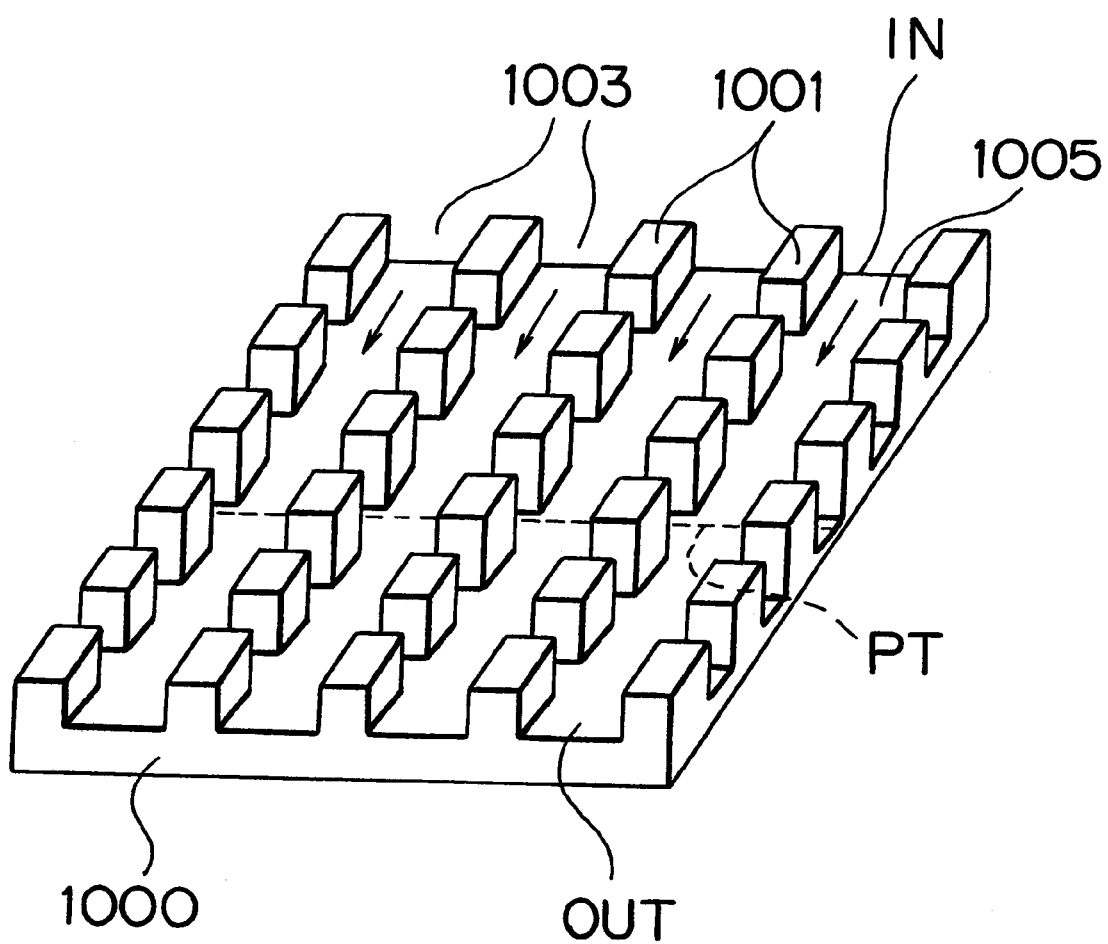
FIG. 32 is a perspective view showing a schematic structure of a separator used in a thirteenth embodiment of the present invention.

Next, a thirteenth embodiment of the present invention will be explained. FIG. 32 is an explanatory view showing the schematic structure of a separator 1000 comprised of a fuel cell of this embodiment. As shown in the figure, the separator 1000 is a so-called lattice type which comprises a plurality of projections 1001 to form an oxygen-containing gas passage 1003 by utilizing gaps between the plurality of projections. In the separator 1000, an inlet and an outlet(not shown) for the oxygen-containing gas passage are formed at the positions corresponding to a pair of edges of the cathode, these edges facing each other and oxygen-containing gas is allowed to flow in the direction of the arrow in the figure.

A passage bottom 1005 of the oxygen-containing gas passage 1003, along the direction of flow of gas descends along the direction of flow of gas from an inlet IN and ascends from the position which is away at a prescribed distance from the inlet and reaches the outlet OUT. To state it differently, in the oxygen-containing gas passage 1003, its depth increases monotonously along the direction of flow of gas from the inlet IN, reaches the deepest part PT at the position which is away at a predetermined distance from the inlet IN, decreases monotonously from the part PT to the outlet OUT. The position of the deepest part PT corresponds to the position at which the total gas amount QT(x) reaches a maximal in the oxygen-containing gas passage 1003. The shape of the passage bottom 1005 corresponds to the variation curve of the total gas amount QT(x) as shown in FIG. 27B explained above.

The separator 1000 of this embodiment structured in this manner is designed so that the total gas amount QT(x) is made maximal on the way of the oxygen-containing gas passage formed from plural arrays of projections and, on that premise, the sectional area of the passage is varied in proportion to the total gas amount QT(x) by varying the depth of the oxygen-containing gas passage 1003. The partial pressure of gas is thus uniform along the oxygen-containing gas passage.

In the fuel cell of this embodiment, an electrode reaction is activated on the entire cathode surface along the oxygen-containing gas passage 1003 and, as a result, the performance of the cell can be improved.

Figure 33:
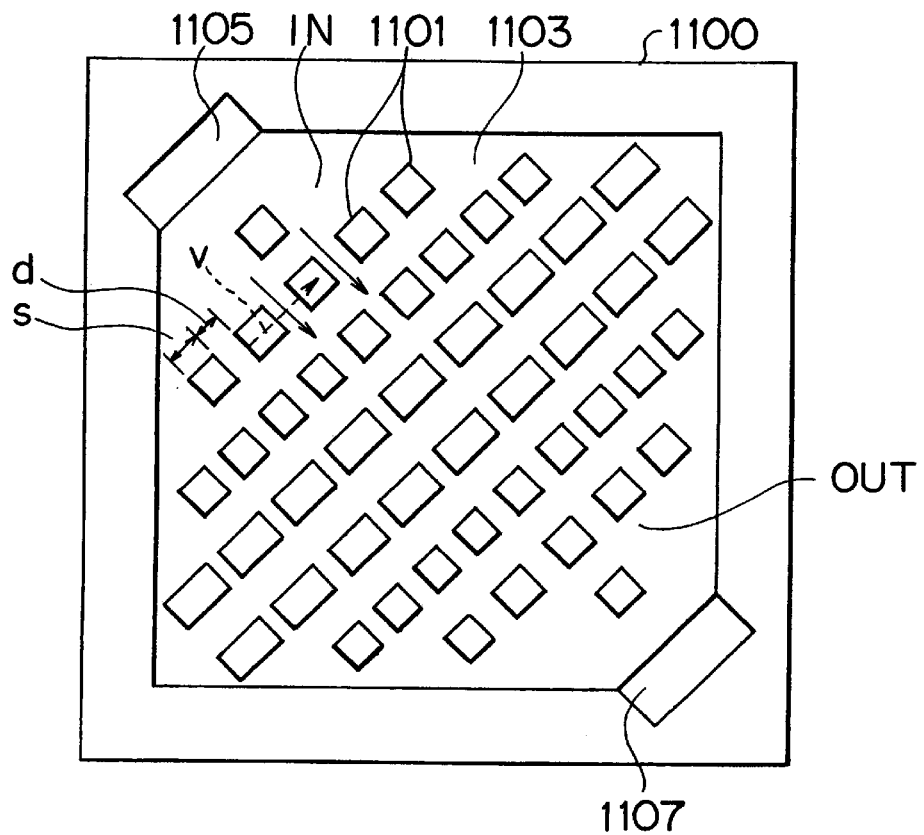
FIG. 33 is a plan view showing a schematic structure of a separator used in a fourteenth embodiment of the present invention.

Next, a fourteenth embodiment of the present invention will be explained. FIG. 33 is an explanatory plan view schematically showing a separator 1100 comprised of the fuel cell of this embodiment. As shown in the figure, the separator 1100 is a lattice type in which plural projections 1103 are arranged. The separator is designed so that, like the first embodiment, an inlet 1105 and an outlet 1107 for oxygen-containing gas are formed at the corners in the direction of a diagonal line on the bottom 1103 of the passage whereby oxygen-containing gas flows in the direction of a diagonal line on the rectangular bottom 1103 of the passage. On that premise, the separator 1100 is structured such that a dimension s of one side of the projection 1101 and a distance d between adjacent projections differ depending on the position in the direction of the flow of oxygen-containing gas.

In this embodiment, the dimension s of one side of the projection 1101 and the distance d between adjacent projections are defined to desired sizes corresponding to the position in the direction of the flow of oxygen-containing gas. As a consequence, the sectional area (the sum of each distance d between plural adjacent projections lined up in a direction v) of the passage in the direction v perpendicular to the direction of the flow of the oxygen-containing gas varies such that it increases, reaches a maximum value and decreases in the course from a gas inlet to outlet. The position at which the sectional area of the passage reaches a maximum corresponds to the position at which the aforementioned total gas amount QT(x) reaches a maximal. The ratio of an incremental or decremental variation in the sectional area of the passage corresponds to the variation curve of the total gas amount QT(x) as shown in FIG. 27B explained above.

In the separator 1100 having such a structure, the sectional area of the passage varies in proportion to the total gas amount QT(x) in the same manner as in the thirteenth embodiment. This ensures that the partial pressure of gas is uniform along the oxygen-containing gas passage. In the fuel cell of this embodiment, an electrode reaction is activated on the entire cathode surface along the oxygen-containing gas passage 1103 and, as a result, the performance of the cell can be improved.

Figure 34:
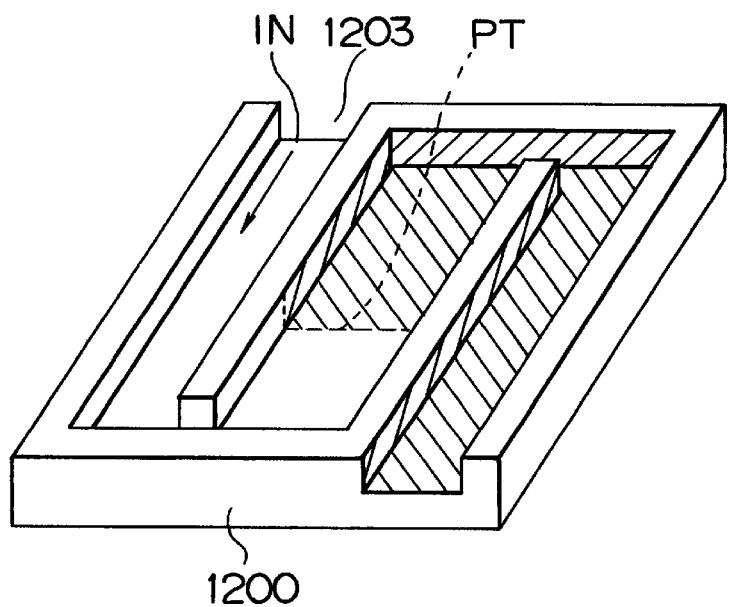
FIG. 34 is a perspective view showing a schematic structure of a separator used in a fifteenth embodiment of the present invention.

Next, a fifteenth embodiment of the present invention will be explained. FIG. 34 is an explanatory plan view schematically showing a separator 1200 comprised of the fuel cell of this embodiment. As shown in the figure, the fuel cell of this embodiment has almost the same structure as the eleventh embodiment except for the following points. In this embodiment, in an oxygen-containing gas passage 1203, the surface of a groove section (the hatching section in the figure) downstream of the part PT at which the total gas amount QT(x) reaches a maximal is treated hydrophilically.

In more detail, as a method for hydrophilically treating the surface of the groove section, the method is adopted in which a hydrophilic material (for example, polyacrylamide) is applied to the surface of the groove section. In such a section made hydrophilic, created water travels on the hydrophilic surface and is easily drained from the gas passage. In general, liquid water is created in a later section after the part PT at which the total gas amount reaches a maximal. In this embodiment, the later section after the part PT is hydrophilically treated and hence the created water can be drained in an efficient manner without using a large amount of a hydrophilic material.

Next, a sixteenth embodiment of the present invention will be explained. In this embodiment, the design specification of a fuel cell is designed so that the total gas amount QT (x) is made maximum at the inlet of an oxygen-containing passage. On that premise, the oxygen-containing gas passage is designed as follows.

Figure 35:
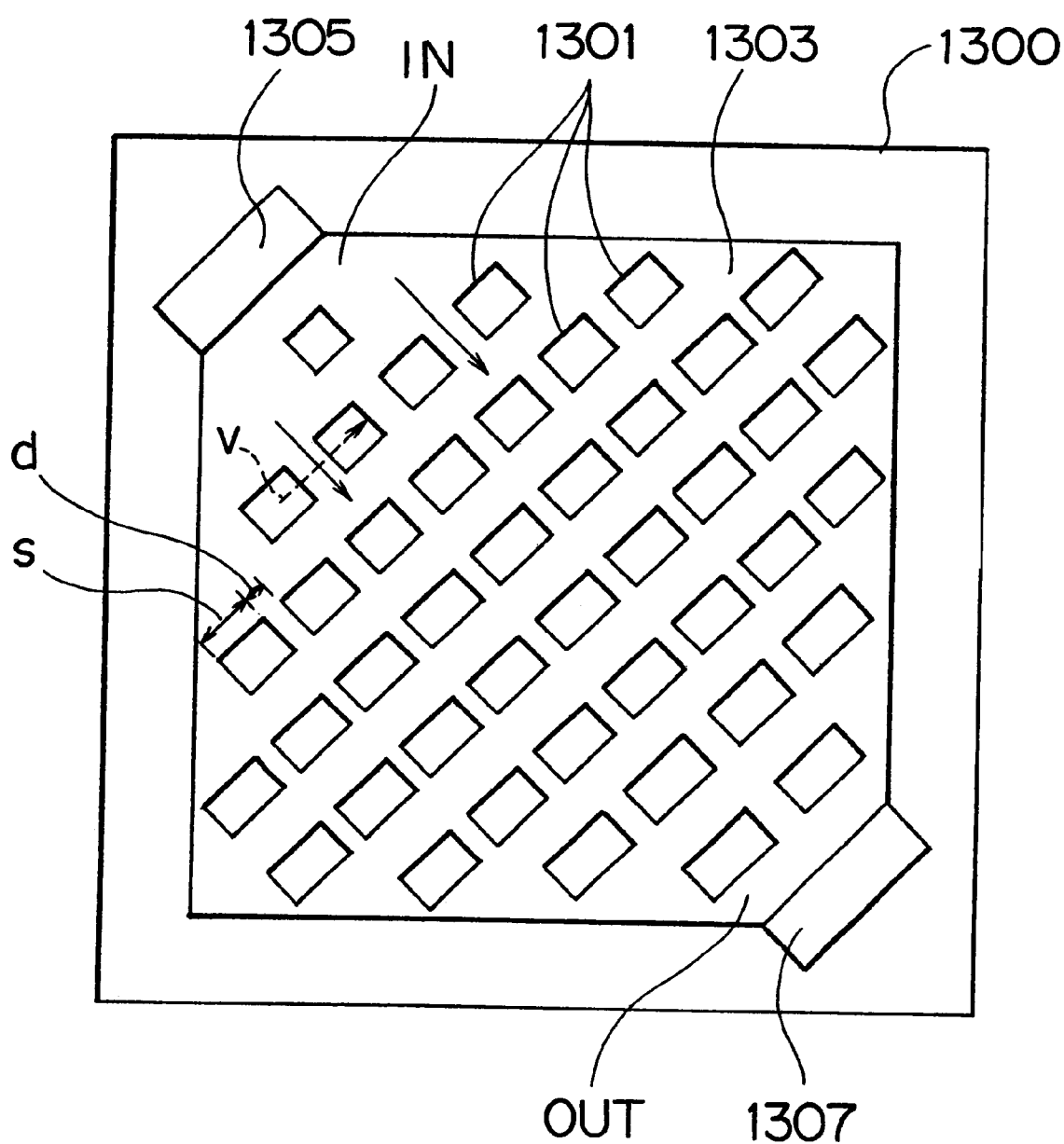
FIG. 35 is a plan view showing a schematic structure of a separator used in a sixteenth embodiment of the present invention.

FIG. 35 is an explanatory plan view schematically showing a separator 1300 comprised of the fuel cell of this embodiment. As shown in the figure, the separator 1300 has the structure in which plural projections 1301 are formed and oxygen-containing gas is allowed to flow in a direction of a diagonal line of the bottom 1303 of the passage from an inlet 1305 to an outlet 1307 for oxygen-containing gas. In addition to such a structure, the separator 1300 is structured such that a dimension s of one side of the projection 1301 and a distance d between adjacent projections differ depending on the position in the direction of the flow of oxygen-containing gas.

In this embodiment, the dimension s of one side of the projection 1301 and the distance d between adjacent projections are defined to desired sizes corresponding to the position in the direction of the flow of oxygen-containing gas. As a consequence, the sectional area (the sum of each distance d between plural adjacent projections lined up in a direction v) of the passage in the direction v perpendicular to the direction of the flow of the oxygen-containing gas reaches a maximum at an inlet IN. The sectional area of the passage decreases monotonously from the inlet IN to an outlet OUT and the ratio of a decremental variation in the sectional area of the passage corresponds to the variation curve of the total gas amount QT(x) as shown in FIG. 27A explained above.

In the separator 1300 having such a structure, the sectional area of the passage decreases monotonously from the inlet IN to outlet OUT of the oxygen-containing gas passage in proportion to a decrease in the total gas amount QT (x). This ensures that the partial pressure of gas is made uniform along the oxygen-containing gas passage. In the fuel cell of this embodiment, an electrode reaction is activated on the entire cathode surface along the oxygen-containing gas passage and, as a result, the performance of the cell can be improved.

Next, a seventeenth embodiment of the present invention will be explained. The fuel cell of the aforementioned sixteenth embodiment has the structure in which the total gas amount QT(x) in the oxygen-containing gas passage decreases monotonously from the inlet to the outlet. On the other hand, in this embodiment, the design specification of a fuel cell is designed so that the total gas amount QT(x) increases monotonously from the inlet to the outlet and is made maximum at the outlet of an oxygen-containing passage. On that premise, the oxygen-containing gas passage is designed as follows.

Figure 36:
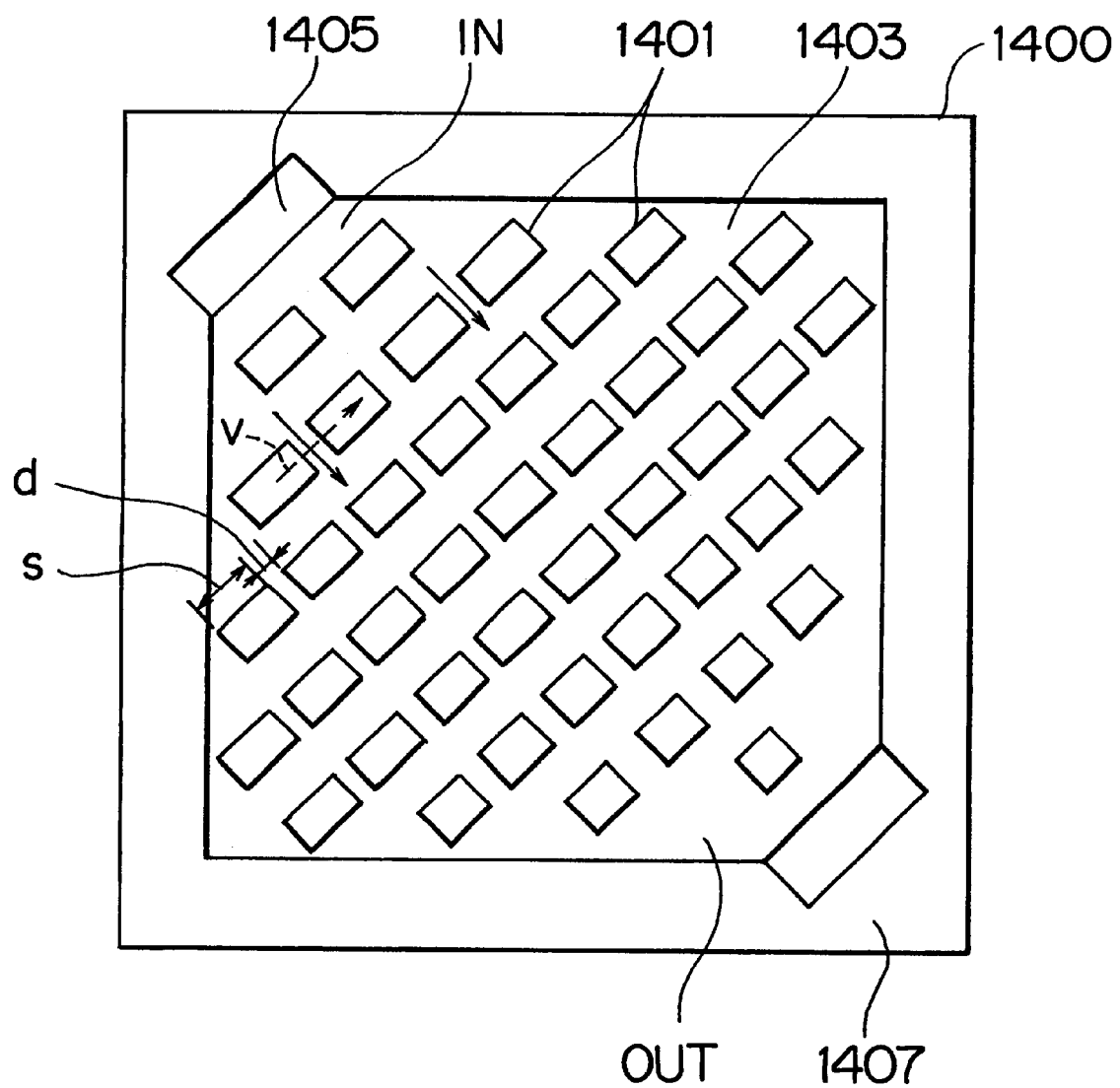
FIG. 36 is a plan view showing a schematic structure of a separator used in a seventeenth embodiment of the present invention.

FIG. 36 is an explanatory plan view schematically showing a separator 1400 comprised of the fuel cell of this embodiment. As shown in the figure, the separator 1400 has the structure in which plural projections 1401 are formed and oxygen-containing gas is allowed to flow in a direction of a diagonal line of the bottom 1403 of the passage through an inlet 1405 and an outlet 1407 for oxygen-containing gas. In addition to such a structure, the separator 1400 is structured such that a dimension s of one side of the projection 1401 and a distance d between adjacent projections differ depending on the position in the direction of the flow of oxygen-containing gas.

In this embodiment, the dimension s of one side of the projection 1301 and the distance d between adjacent projections are defined to desired sizes corresponding to the position in the direction of the flow of oxygen-containing gas. As a consequence, the sectional area (the sum of each distance d between plural adjacent projections lined up in a direction v) of the passage in the direction v perpendicular to the direction of the flow of the oxygen-containing gas is made maximum at an outlet OUT. The sectional area of the passage increases monotonously from the inlet IN to an outlet OUT and the ratio of variation in the sectional area of the passage corresponds to the variation curve of the total gas amount QT(x) as shown in FIG. 27C explained above.

In the separator 1400 having such a structure, the sectional area of the passage increases monotonously from the inlet IN to outlet OUT of the oxygen-containing gas passage in proportion to a variation in the total gas amount QT (x). This ensures that the partial pressure of gas is uniform along the oxygen-containing gas passage. In the fuel cell of this embodiment, like the eighteenth embodiment, an electrode reaction is activated on the entire cathode surface along the oxygen-containing gas passage and, as a result, the performance of the cell can be improved.

Figure 37:
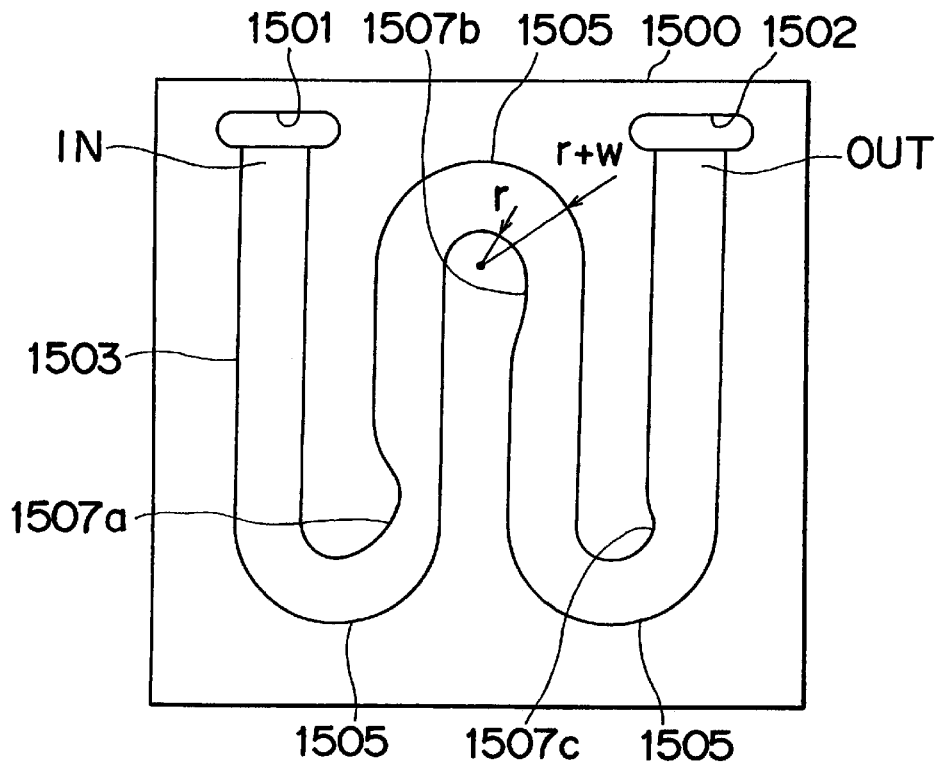
FIG. 37 is a plan view showing a schematic structure of a separator used in an eighteenth embodiment of the present invention.

Next, an eighteenth embodiment of the present invention will be explained. A fuel cell of this embodiment comprises a serpentine type separator having a bent form. FIG. 37 is an explanatory plan view schematically showing a separator 1500 used in this embodiment. As shown in the figure, the separator 1500 is formed with one oxygen-containing gas passage 1503 having a concave form in section, the gas passage being communicated with holes 1501, 1502 for supplying and exhausting oxygen-containing gas.

Figure 40:
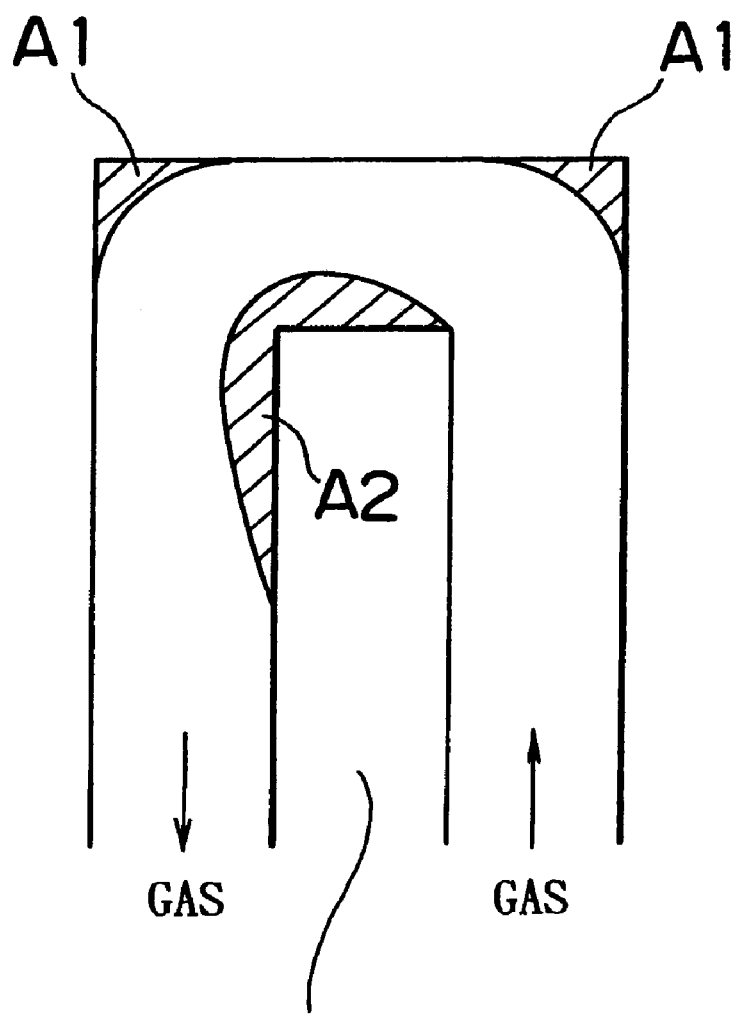
FIG. 40 is an explanatory view showing a dead water region in the serpentine type separator.
Figure 41:
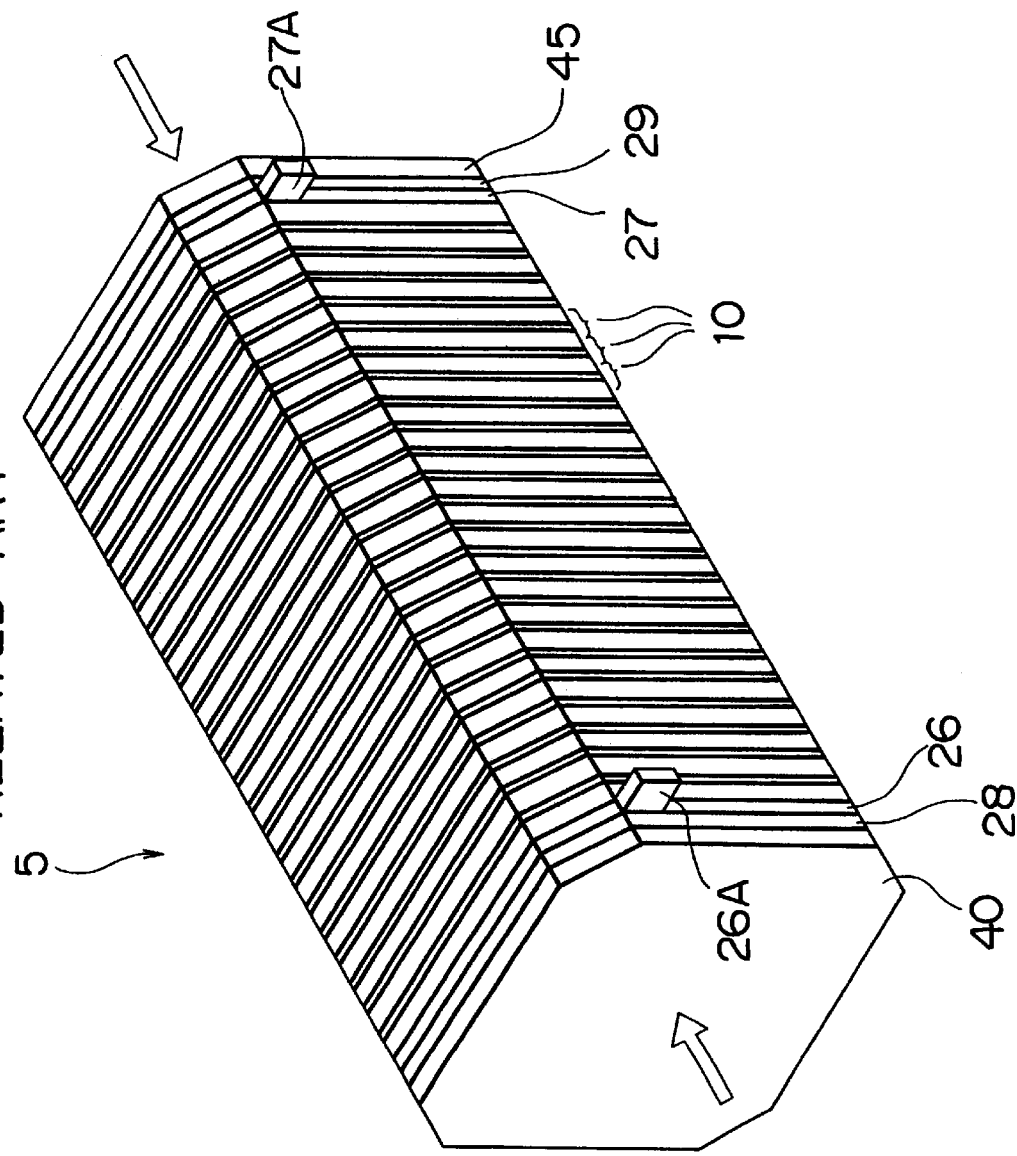
FIG. 41 is a perspective view showing the configuration of a stack structure constituting a conventional fuel cell.
Figure 42:
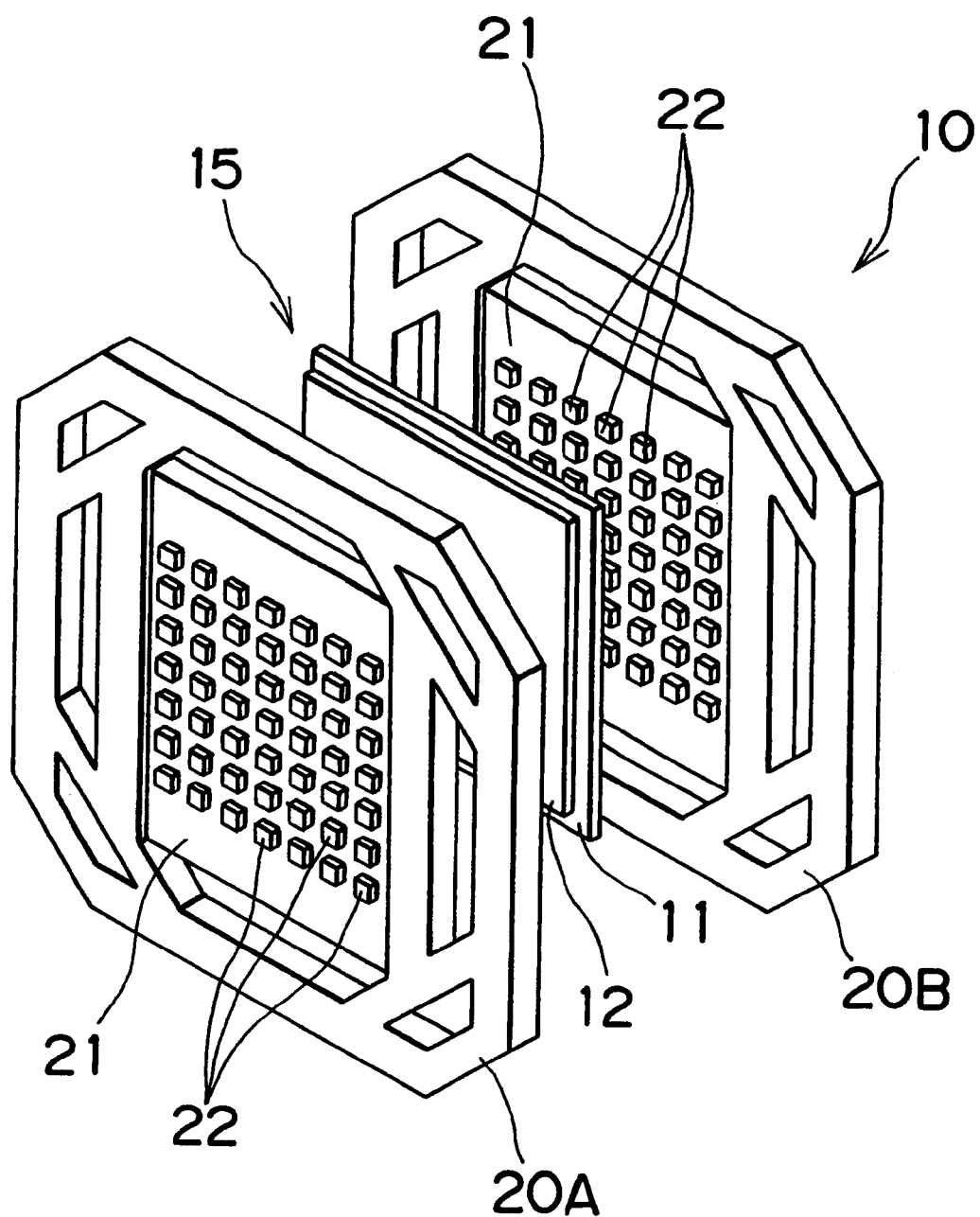
FIG. 42 is an exploded view showing a unit cell as a basic unit of FIG. 41.

The oxygen-containing gas passage 1503 has a wavy form which is bent at plural positions (three positions in the figure). The bent portion 1505 is formed with an inwardly curved sections 1507 (1507a, 1507b, 1507c) Since the outside wall surface of a passage groove 1505 has a semicircular shape, oxygen-containing gas flows along the outside wall surface, allowing gas to flow easily also in the inside. This structure ensures that an inside dead water region (see A2 in FIG. 40) which is probably produced in a key-like passage groove is reduced and an outside dead region (see A1 in FIG. 40) can be eliminated. It is noted that, in this embodiment, the shape of the inwardly curved section 1507 is designed to coincide with the shape of an inside dead water region (A2 in FIG. 40) which is experimentally determined and expected to be produced at an optional flow rate when a passage groove with the same size is folded key-like as shown in FIG. 40. In the separator having such a structure, the outside and inside water dead regions produced at the bent portion can be almost eliminated by using an outside wall surface having a semicircular shape and an inside wall surface formed with an inwardly curved section. Generally, in a passage groove in the side of oxygen-containing gas, created water produced in the side of the cathode 23 is settled as droplets. This causes clogging in the passage which reduces the performance of the cell. However, because the settlement of droplets can be reduced in this embodiment, a reduction in the performance of the cell can be prevented. Moreover, in this embodiment, the size of the inwardly curved section 1507 is designed to differ depending on the position in the oxygen-containing gas passage 1503.

As previously explained, in the fuel cell, the variation pattern of the total gas amount QT(x) varies corresponding to the design specification. The fuel cell of this embodiment is designed such that, in the oxygen-containing gas passage, the total gas amount QT(x) decreases monotonously from an inlet IN to an outlet OUT (see FIG. 27A). In the separator 1500, specifically the size of the inwardly curved section 1507 decreases from the inlet IN to the outlet OUT step by step in proportion to a reduction in the total gas amount QT(x). In more concrete, the inwardly curved section 1507a disposed at the bent section 1505 formed closest to the inlet IN has the largest size, the inwardly curved section 1507b disposed at the bent section 1505 formed at the intermediate between the inlet IN and the outlet OUT is slightly smaller in size and the inwardly curved section 1507c disposed at the bent section 1505 closest to the outlet OUT has the smallest size.

In a gas passage, generally, when the flow rate of gas decreases, the size of the dead water region explained previously decreases. However, in the separator 1500 of this embodiment, the size of the inwardly curved section 1507 is decreased in proportion to an decrease in the total gas amount QT(x). This results in the fact that the size of the inwardly curved section 1507 corresponds to the size of a dead water region which is possibly produced according to the flow rate of gas.

As is clear from the above explanations, in the fuel cell of this embodiment, the amount of settling water produced in the oxygen-containing gas flowing through the serpentine type oxygen-containing gas passage 1503 is reduced thereby activating an electrode reaction on the entire surface of the cathode. Hence the performance of the fuel cell can be improved.

Figure 38:
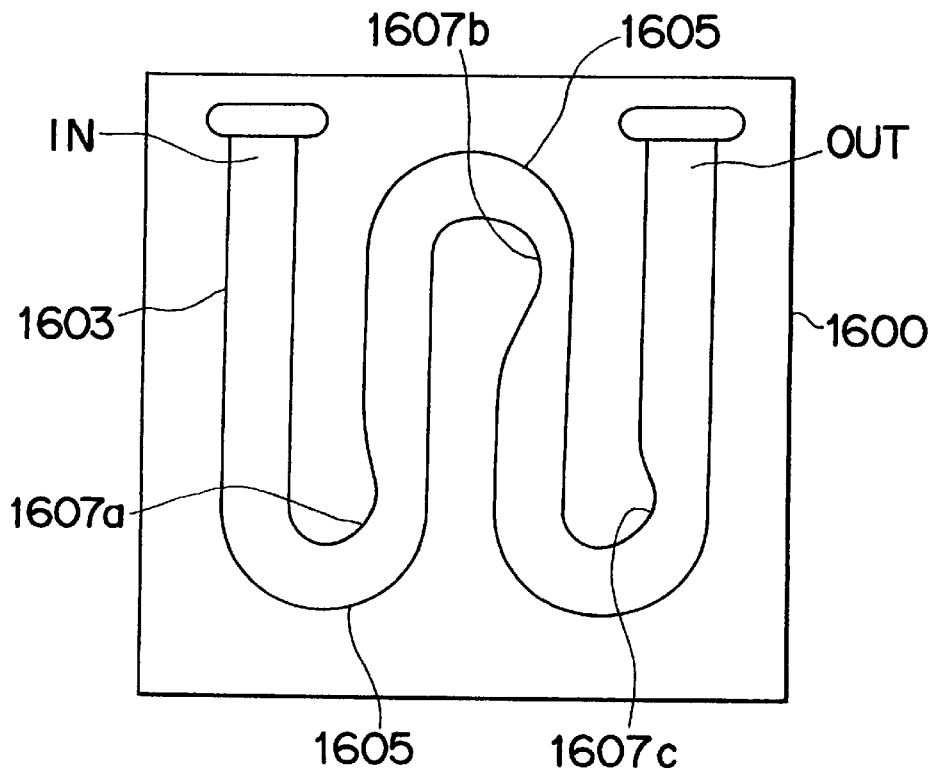
FIG. 38 is a plan view showing a schematic structure of a separator used in a nineteenth embodiment of the present invention.

Next, a nineteenth embodiment of the present invention will be explained. FIG. 38 is an explanatory plan view schematically showing a separator 1600 used in this embodiment. The separator 1600 of this embodiment is designed such that, among inwardly curved sections 1607 (1607a to 1607c) formed at bent sections 1605 of an oxygen-containing gas passage 1603, the inwardly curved section 1607 formed at the second bent section 1605 formed on the way between an inlet IN and an outlet OUT has the maximum size.

In the design specification of the fuel cell of this embodiment, the total gas amount QT(x) in a range from the inlet IN to outlet OUT of the oxygen-containing gas passage varies such that it increases, reaches a maximum and decreases (see FIG. 27c). The size of each inwardly curved section 1607 in the oxygen-containing gas passage 1603 is designed to be proportional to the magnitude of the total gas amount QT(x) at each position in the oxygen-containing gas passage 1603.

In the separator 1600 of the fuel cell of this embodiment in which the total gas amount QT(x) at each position in the oxygen-containing gas passage varies such that it increases, reaches a maximum and decreases, the size of the inwardly curved section 1607 varies in proportion to a variation of the total gas amount QT(x). This means that the size of the inwardly curved section 1607 corresponds to the size of a dead water region which is expected to be produced according to the flow rate of gas.

As a consequence, in the fuel cell deigned such that the total gas amount QT(x) reaches a maximal on the way of the oxygen-containing gas passage 1603, the amount of settling water produced in the oxygen-containing gas flowing through the oxygen-containing gas passage 1603 is reduced thereby activating an electrode reaction on the entire surface of the cathode. Hence the performance of the fuel cell can be improved.

Figure 39:
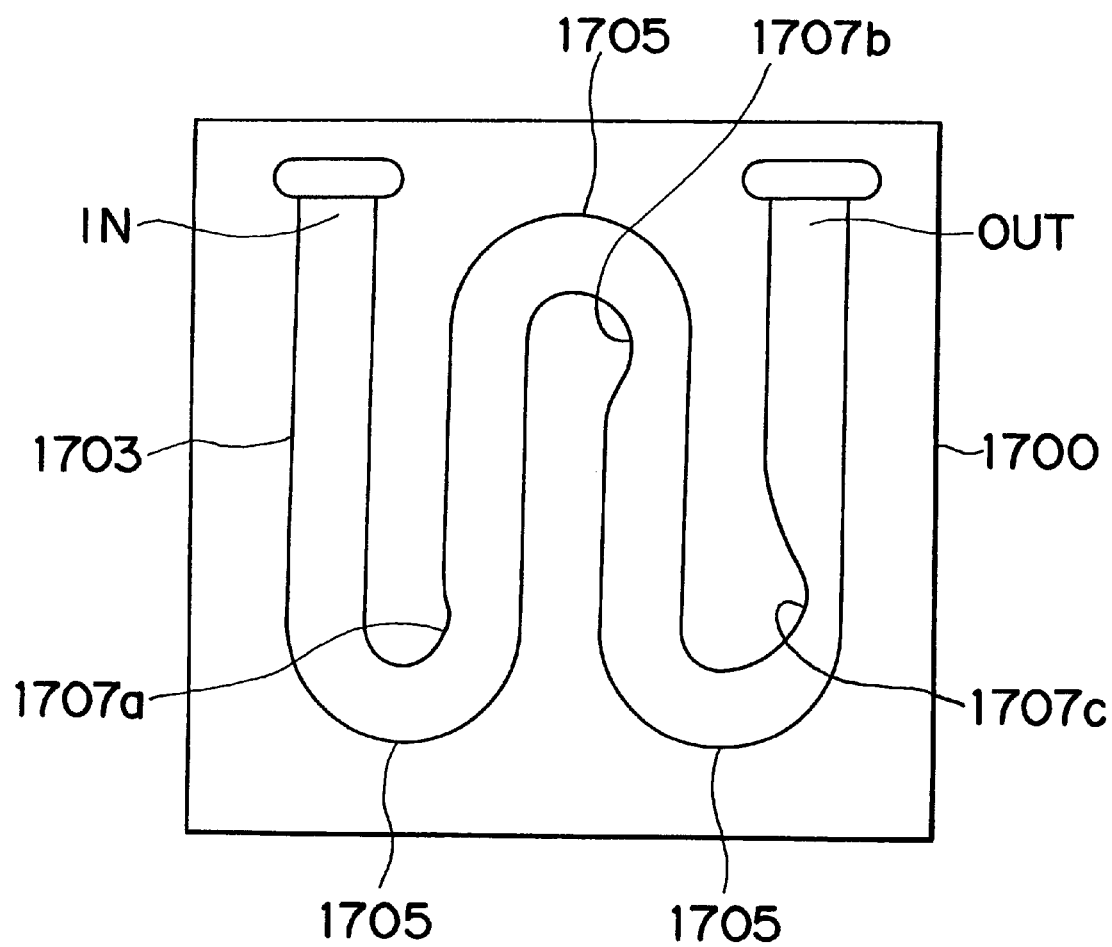
FIG. 39 is a plan view showing a schematic structure of a separator used in a twentieth embodiment of the present invention.

Next, a twentieth embodiment of the present invention will be explained. FIG. 39 is an explanatory plan view schematically showing a separator 1700 used in this embodiment. In the separator 1700 of this embodiment, the size of the inwardly curved section 1707 (1707a, 1707b, 1707c) formed at a bent section 1705 of an oxygen-containing gas passage 1703 increases from the inlet IN to the out let OUT step by step. In more concrete, the inwardly curved section 1707a disposed at the bent section 1705 formed closest to the inlet IN has the smallest size, the inwardly curved section 1707b disposed at the bent section 1705 formed at the intermediate between the inlet IN and the outlet OUT is slightly larger in size and the inwardly curved section 1707c disposed at the bent section 1705 closest to the outlet OUT has the largest size.

The fuel cell of this embodiment whose design specification is defined to a prescribed one, is structured such that the total gas amount QT(x) increases monotonously from the inlet IN to the outlet OUT (see FIG. 27c). The size of the inwardly curved section 1707 in the oxygen-containing gas passage 1703 is proportional to the magnitude of the total gas amount QT(x) at each position in the oxygen-containing gas passage 1703.

Therefore, in the separator 1700 of this embodiment in a fuel cell in which the total gas amount QT(x) at each position in the oxygen-containing gas passage increases monotonously, the size of the inwardly curved section 1707 is changed in proportion to a variation in the total gas amount QT(x). This results in the fact that the size of the inwardly curved section 1707 corresponds to the size of a dead water region which is possibly produced according to the flow rate of gas.

As a result, in a fuel cell designed such that the total gas amount QT(x) at each position in the oxygen-containing gas passage 1703 increases monotonously, the amount of settling water produced in the oxygen-containing gas flowing through the serpentine type oxygen-containing gas passage 1703 is reduced thereby activating an electrode reaction on the entire surface of the cathode. Hence the performance of the fuel cell can be improved.

In each embodiment mentioned above, as the material for forming the separator, fine carbon which is made impermeable by compressing carbon is used. Different materials may be used. For instance, the separator may be made from moulded carbon, burned carbon or a metal material. When a metal material is used to form the separator, it is desirable to select a metal having sufficient corrosion resistance. Alternatively, the surface of a metal may be coated with a material having sufficient corrosion resistance. Particularly when the separator is formed from a metal material, the production cost of a die greatly differ depending on the size, number and accuracy of the rib. If a rib having the form used in the aforementioned embodiments is used, the production cost of the die can be considerably lowered since the number of the ribs may be low and the ribs may not be small.

Moreover, in each of the aforementioned embodiments, the case where the present invention is applied to a polymer electrolyte fuel cell is explained. The present invention can be applied to different types of fuel cell such as a phosphoric acid type fuel cell and a solid electrolyte fuel cell.

What is claimed is:

1. A separator for a fuel cell, the separator being produced by bringing an electrolyte film into contact with a surface of a first electrode so that the electrolyte film is interposed between the first electrode and an adjacent electrode and by defining a gas passage for supplying gas to the fuel cell, the separator comprising:
   a first manifold for supplying gas, the first manifold extending thorough the separator at a first corner thereof;
   a second manifold for exhausting gas, the second manifold extending through the separator at a position on a diagonal line extending across the separator from the first corner; and
   a gas passage formed between the first manifold and the second manifold,
   wherein a width of the gas passage is wider at an intermediate position between the first and the second manifold than widths near the first manifold and near the second manifold, and wherein the gas passage has a branched portion, said branched portion including a plurality of passage branches and a plurality of cross passages, wherein the cross passages provide communication between two adjacent passage branches at a position other than at an inlet end and an outlet end of the passage branches, and further wherein an interval between at least one of pairs of adjacent passage branches and pairs of adjacent cross passages varies.

2. A separator according to claim 1, wherein the branched portion is defined by a plurality of projections arranged on the bottom of the gas passage.

3. A separator according to claim 2, wherein the projections are formed to face, when assembled in a fuel cell, the corresponding projections of an adjacent separator to contact one another with a joint body interposed therebetween and wherein, when so assembled, each of the opposite projections overlaps the corresponding projection when viewed from a direction perpendicular to a surface on which the projections are formed.

4. A separator according to claim 3, wherein the projections are arranged such that a center of a contact surface of each projection does not coincide with a center of a contact surface of the corresponding projection when viewed from a direction perpendicular to the surface on which the projections are formed.

5. A separator according to claim 3, wherein the projections are arranged such that a contact surface of each projection crosses the center of the corresponding projection when viewed from a direction perpendicular to the surface on which the projections are formed.

6. A separator according to claim 5, wherein the contact surface of each projection has a rectangular shape.

7. A separator according to claim 5, wherein the contact surface of each of the projections has the same shape.

8. A separator according to claim 5, wherein the contact surface of each projection has a circular shape.

9. A separator for a fuel cell, the separator being produced by bringing an electrolyte film into contact with the surface of a first electrode so that the electrolyte film is interposed between the first electrode and an adjacent electrode and by defining a gas passage for supplying gas to the fuel cell, the separator comprising:
   a passage bottom opposing the surface of the electrode;
   a plurality of projections projecting from the passage bottom to reach the surface of the electrode, thereby defining the gas passage with a branched portion, wherein said branched portion including a plurality of passage branches and a plurality of cross passages, wherein the cross passages provide communication between two adjacent passage branches at a position other than at an inlet end and an outlet end of the passage branches, and further wherein an interval between at least one of pairs of adjacent passage branches and pairs of adjacent cross passages varies; and
   a gas inlet and a gas outlet for supplying gas to and exhausting gas from the gas passage, the inlet and the outlet being formed at positions corresponding to corners on a diagonal line of the electrode,
   wherein the plurality of projections are designed such that the interval between adjacent projections increases as a distance from the diagonal line increases.

10. A fuel cell comprising:
   a separator for a fuel cell, the separator being produced by bringing an electrolyte film into contact with a surface of a first electrode so that the electrolyte film is interposed between the first electrode and an adjacent electrode and by defining a gas passage for supplying gas to the fuel cell, the separator including:
      a first manifold for supplying gas, the first manifold extending through the separator at a first corner thereof;
      a second manifold for exhausting gas, the second manifold extending through the separator at a position on a diagonal line extending across the separator from the first corner;
      a gas passage formed between the first manifold and the second manifold, wherein a width of the gas passage is wider at an intermediate position between the first and the second manifold than widths near the first manifold and near the second manifold, and wherein the gas passage has a branched portion, said branched portion including a plurality of passage branches and a plurality of cross passages, wherein the cross passages provide communication between two adjacent passage branches at a position other than at an inlet end and an outlet end of the passage branches, and further wherein an interval between at least one of pairs of adjacent passage branches and pairs of adjacent cross passages varies; and a cooling water passage-forming member which is in contact with the separator to form a cooling water passage through which cooling water may flow along the surface of a gas passage-forming member.

11. A fuel cell comprising:

a joint body produced by interposing an electrolyte film between a pair of electrodes; and a separator which is in contact with a surface of at least one of the electrodes of the joint body and forms a gas passage of supply gas by the surface of the at least one electrode, wherein the gas passage has a branched portion, said branched portion including a plurality of passage branches and a plurality of cross passages, wherein the cross passages provide communication between two adjacent passage branches at a position other than at an inlet end and an outlet end of the passage branches, and further wherein an interval between at least one of pairs of adjacent passage branches and pairs of adjacent cross passages varies, wherein a total gas amount, which is the sum of an amount of supply gas and an amount of vapor produced by the joint body and diffused in the gas passage, sequentially changes to increase to a maximal value and further decreases in a range from the inlet to outlet of the gas passage; and wherein a sectional area of the gas passage defined by the separator varies in accordance with the total gas amount at each position in the gas passage.

12. A fuel cell according to claim 11, wherein the sectional area of the gas passage reaches a maximal value at the position where the total gas amount reaches the maximal value.

13. A fuel cell comprising:

a joint body produced by interposing an electrolyte film between a pair of electrodes; and a separator which is in contact with a surface of one of the electrodes and forms a gas passage of supply gas by the surface of the electrode, wherein the gas passage has a branched portion, said branched portion including a plurality of passage branches and a plurality of cross passages, wherein the cross passages provide communication between two adjacent passage branches at a position other than at an inlet end and an outlet end of the passage branches, and further wherein an interval between at least one of pairs of adjacent passage branches and pairs of adjacent cross passages varies;

wherein a total gas amount, which is a sum of an amount of supply gas and an amount of vapor produced by the joint body and diffused in the gas passage, sequentially changes to increase to a maximal value and decreases in a region from an inlet to an outlet of the gas passage; and wherein a hydrophilic treatment is applied to a portion of a surface of the gas passage closer to the outlet than a position where the total gas amount reaches the maximal value.

14. A fuel cell comprising:

a joint body produced by interposing an electrolyte film between a pair of electrodes;

a separator in which a plurality of projections are formed; and a gas passage for supply gas, the passage being formed by bringing a surface of one of the electrodes into contact with the projections wherein the gas passage has a branched portion, said branched portion including a plurality of passage branches and a plurality of cross passages, wherein the cross passages provide communication between two adjacent passage branches at a position other than at an inlet end and an outlet end of the passage branches, and further wherein an interval between at least one of pairs of adjacent passage branches and pairs of adjacent cross passages varies, and wherein the projections are arranged such that a sectional area of the gas passage in a vicinity of an inlet of the gas passage reaches a maximal value.

15. A fuel cell comprising:

a joint body produced by interposing an electrolyte film between a pair of electrodes;

a separator in which a plurality of projections are formed; and a gas passage for supply gas, the passage being formed by bringing a surface of one of the electrodes into contact with the projections, wherein the gas passage has a branched portion, said branched portion including a plurality of passage branches and a plurality of cross passages, wherein the cross passages provide communication between two adjacent passage branches at a position other than at an inlet end and an outlet end of the passage branches, and further wherein an interval between at least one of pairs of adjacent passage branches and pairs of adjacent cross passages varies, and wherein the projections are arranged such that a sectional area of the gas passage in the vicinity of an outlet of the gas passage reaches a maximal value.

* * * * *